(12) United States Patent
Takada

(10) Patent No.: US 9,739,997 B2
(45) Date of Patent: Aug. 22, 2017

(54) OBJECTIVE LENS AND OBSERVATION APPARATUS HAVING THE SAME

(71) Applicant: OLYMPUS CORPORATION, Tokyo (JP)

(72) Inventor: Keisuke Takada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 69 days.

(21) Appl. No.: 14/733,328

(22) Filed: Jun. 8, 2015

(65) Prior Publication Data

US 2015/0268460 A1    Sep. 24, 2015

Related U.S. Application Data

(63) Continuation of application No. PCT/JP2013/082876, filed on Dec. 6, 2013.

(30) Foreign Application Priority Data

Dec. 7, 2012    (JP) ................................. 2012-268496

(51) Int. Cl.
*G02B 9/12*    (2006.01)
*G02B 23/24*    (2006.01)
(Continued)

(52) U.S. Cl.
CPC ........... *G02B 23/243* (2013.01); *G02B 13/04* (2013.01); *G02B 15/177* (2013.01); *G02B 23/2438* (2013.01)

(58) Field of Classification Search
CPC .............. G02B 23/243; G02B 23/2438; G02B 15/177; G02B 13/04; G02B 9/12; G02B 13/00035
See application file for complete search history.

(56) References Cited

U.S. PATENT DOCUMENTS

2007/0206293 A1    9/2007    Takato
2011/0211267 A1    9/2011    Takato
(Continued)

FOREIGN PATENT DOCUMENTS

JP    02-047615    2/1990
JP    11-316339    11/1999
(Continued)

*Primary Examiner* — Joseph P Martinez
(74) *Attorney, Agent, or Firm* — Andrews Kurth Kenyon LLP

(57) ABSTRACT

An objective lens including a first lens group immovable in changing magnification from a normal observation state to a close-up observation state, a second lens group arranged nearer to the image side than the first lens group and moving along the optical axis in the change of magnification, a third lens group arranged nearer to the image side than the second lens group and immovable in the change of magnification, and an aperture stop arranged between the second lens group and an image plane and immovable in the change of magnification, and the objective lens satisfying the following condition:

$1.24 < |F_{1f}/F_n| < 1.8$ where $F_{1f}$ denotes the focal length of a lens that is placed nearest to the object side in the first lens group and $F_n$ denotes the focal length of the whole system in the normal observation state.

18 Claims, 27 Drawing Sheets

(51) Int. Cl.
*G02B 13/04* (2006.01)
*G02B 15/177* (2006.01)

(56) References Cited

U.S. PATENT DOCUMENTS

| | | |
|---|---|---|
| 2011/0317282 A1 | 12/2011 | Kimura |
| 2012/0057251 A1* | 3/2012 | Takato ................ G02B 23/243 359/749 |
| 2012/0147254 A1 | 6/2012 | Adachi et al. |
| 2013/0217965 A1 | 8/2013 | Sasamoto |

FOREIGN PATENT DOCUMENTS

| | | |
|---|---|---|
| JP | 2008-170720 | 7/2008 |
| JP | 2010-032680 | 2/2010 |

* cited by examiner

EMBODIMENT 1

EMBODIMENT 1
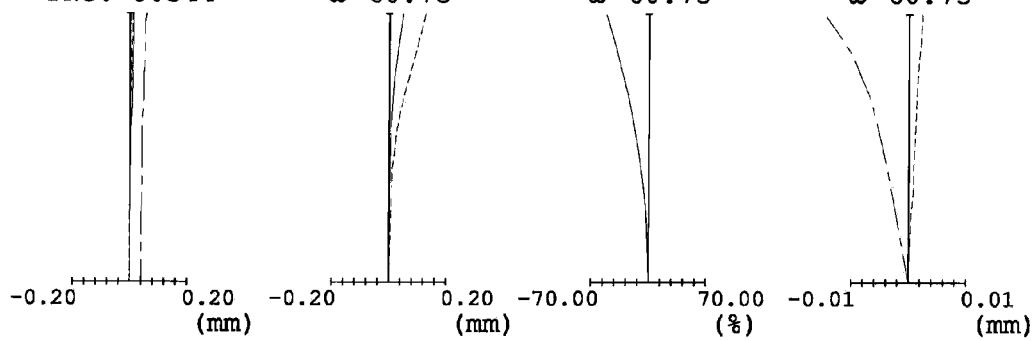
FIG.2A SPHERICAL ABERRATION FNO. 8.344
FIG.2B ASTIGMATISM ω 60.73
FIG.2C DISTORTION ω 60.73
FIG.2D CHROMATIC ABERRATION OF MAGNIFICATION ω 60.73
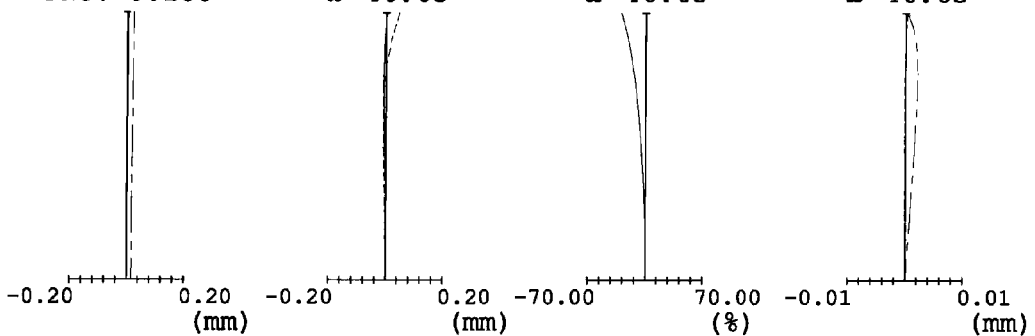
FIG.2E SPHERICAL ABERRATION FNO. 8.158
FIG.2F ASTIGMATISM ω 46.63
FIG.2G DISTORTION ω 46.63
FIG.2H CHROMATIC ABERRATION OF MAGNIFICATION ω 46.63
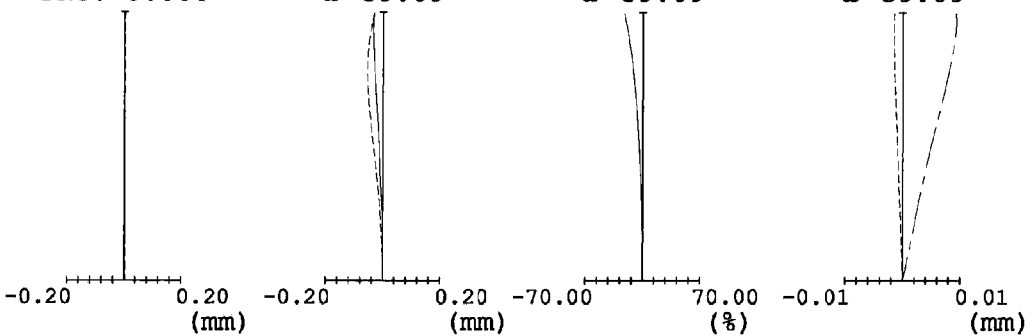
FIG.2I SPHERICAL ABERRATION FNO. 8.000
FIG.2J ASTIGMATISM ω 39.09
FIG.2K DISTORTION ω 39.09
FIG.2L CHROMATIC ABERRATION OF MAGNIFICATION ω 39.09
435.84 — · —
656.27 - - - - -
587.56 ———

EMBODIMENT 2

EMBODIMENT 2
FIG.4A
SPHERICAL ABERRATION
FNO. 8.359
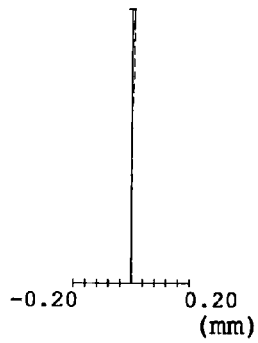
-0.20    0.20
(mm)
FIG.4B
ASTIGMATISM
ω 60.03
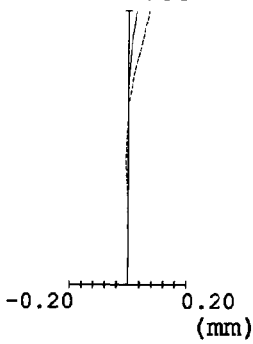
-0.20    0.20
(mm)
FIG.4C
DISTORTION
ω 60.03
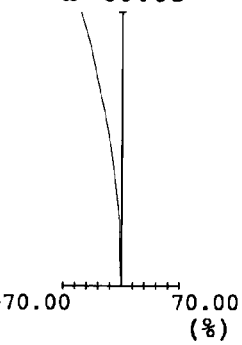
-70.00    70.00
(%)
FIG.4D
CHROMATIC ABERRATION OF MAGNIFICATION
ω 60.03
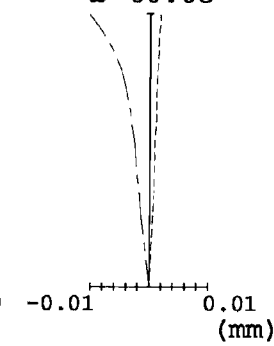
-0.01    0.01
(mm)
FIG.4E
SPHERICAL ABERRATION
FNO. 8.171
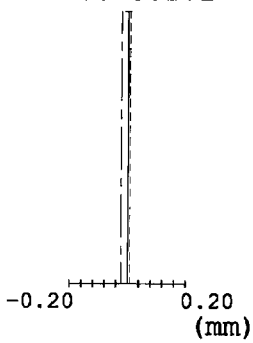
-0.20    0.20
(mm)
FIG.4F
ASTIGMATISM
ω 46.20
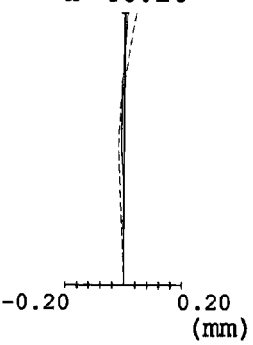
-0.20    0.20
(mm)
FIG.4G
DISTORTION
ω 46.20
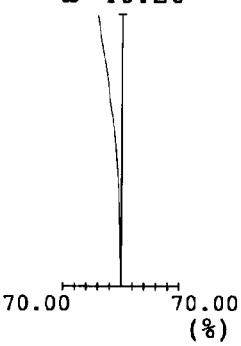
-70.00    70.00
(%)
FIG.4H
CHROMATIC ABERRATION OF MAGNIFICATION
ω 46.20
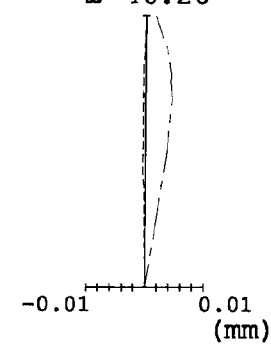
-0.01    0.01
(mm)
FIG.4I
SPHERICAL ABERRATION
FNO. 8.000
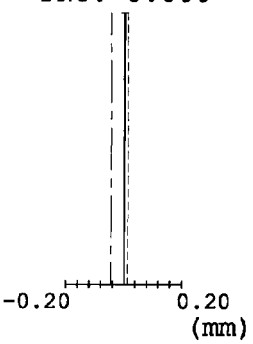
-0.20    0.20
(mm)
FIG.4J
ASTIGMATISM
ω 38.66
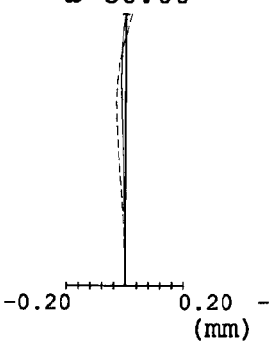
-0.20    0.20
(mm)
FIG.4K
DISTORTION
ω 38.66
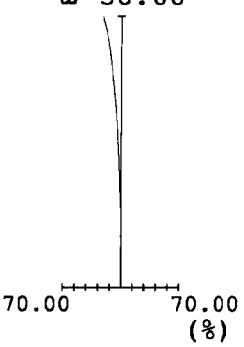
-70.00    70.00
(%)
FIG.4L
CHROMATIC ABERRATION OF MAGNIFICATION
ω 38.66
-0.01    0.01
(mm)
435.84 — · —
656.27 - - - - -
587.56

EMBODIMENT 3

EMBODIMENT 3
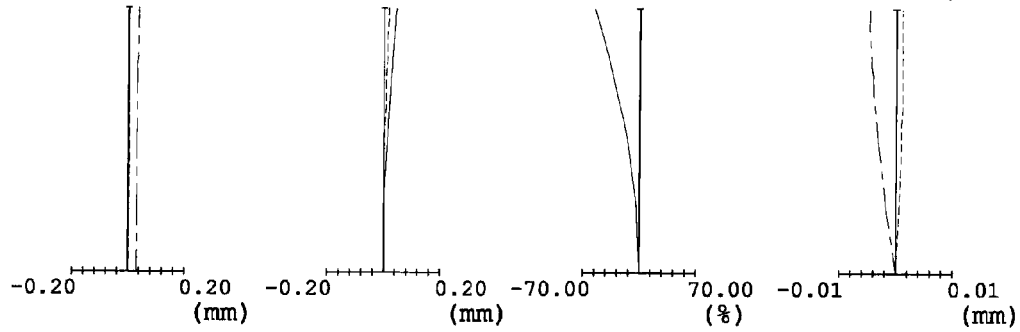
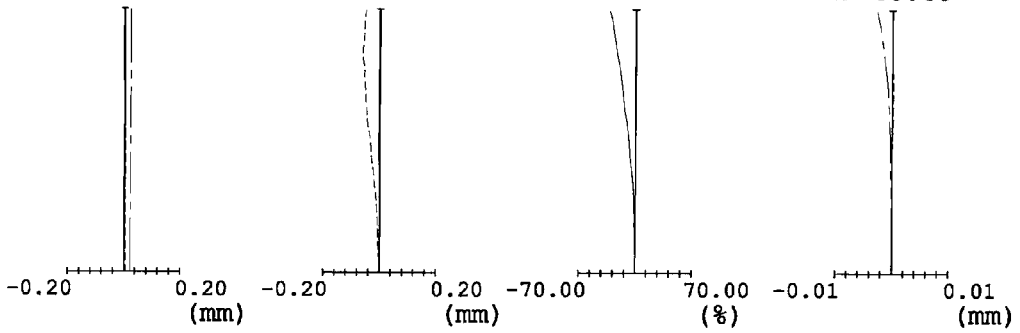
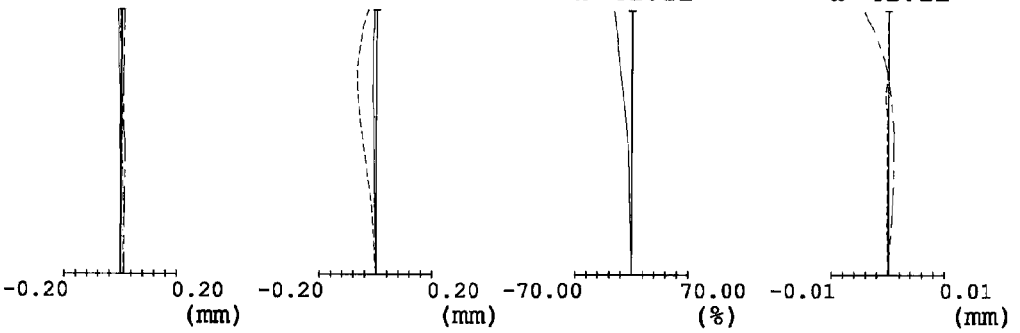
435.84 — · —
656.27 - - - - - -
587.56 —— · ——

EMBODIMENT 4

EMBODIMENT 4

SPHERICAL ABERRATION
FNO. 8.855

-0.20　　0.20
(mm)

ASTIGMATISM
ω 61.56

-0.20　　0.20
(mm)

DISTORTION
ω 61.56

-70.00　　70.00
(%)

CHROMATIC ABERRATION OF MAGNIFICATION
ω 61.56

-0.01　　0.01
(mm)

SPHERICAL ABERRATION
FNO. 8.356

-0.20　　0.20
(mm)

ASTIGMATISM
ω 44.42

-0.20　　0.20
(mm)

DISTORTION
ω 44.42

-70.00　　70.00
(%)

CHROMATIC ABERRATION OF MAGNIFICATION
ω 44.42

-0.01　　0.01
(mm)

SPHERICAL ABERRATION
FNO. 8.000

-0.20　　0.20
(mm)

ASTIGMATISM
ω 38.32

-0.20　　0.20
(mm)

DISTORTION
ω 38.32

-70.00　　70.00
(%)

CHROMATIC ABERRATION OF MAGNIFICATION
ω 38.32

-0.01　　0.01
(mm)

435.84 ── ── ──
656.27 ── ── ── ──
587.56 ─────────

EMBODIMENT 5

EMBODIMENT 5

EMBODIMENT 6

EMBODIMENT 6
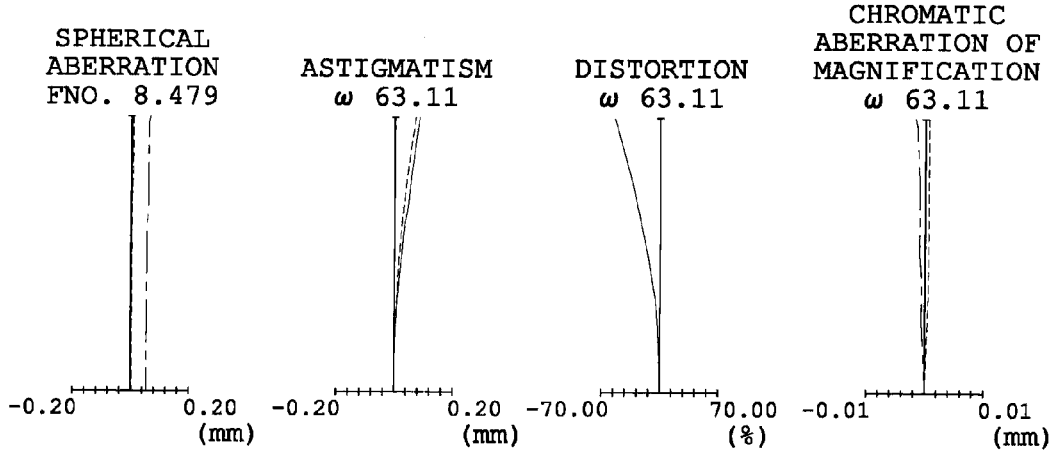
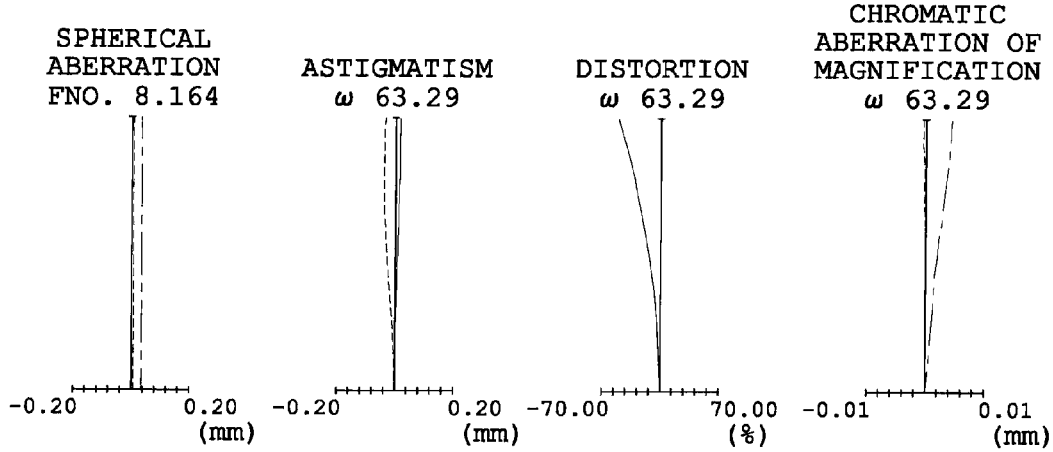
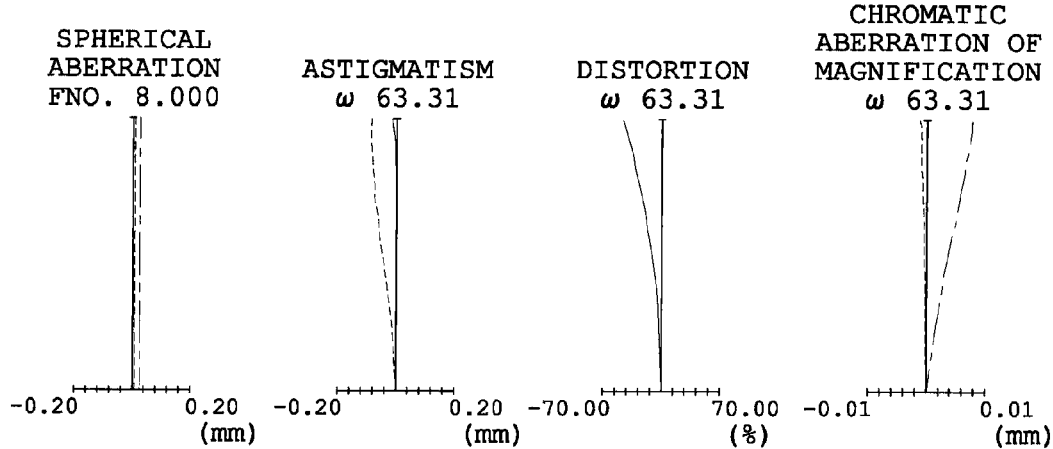

EMBODIMENT 7

EMBODIMENT 7

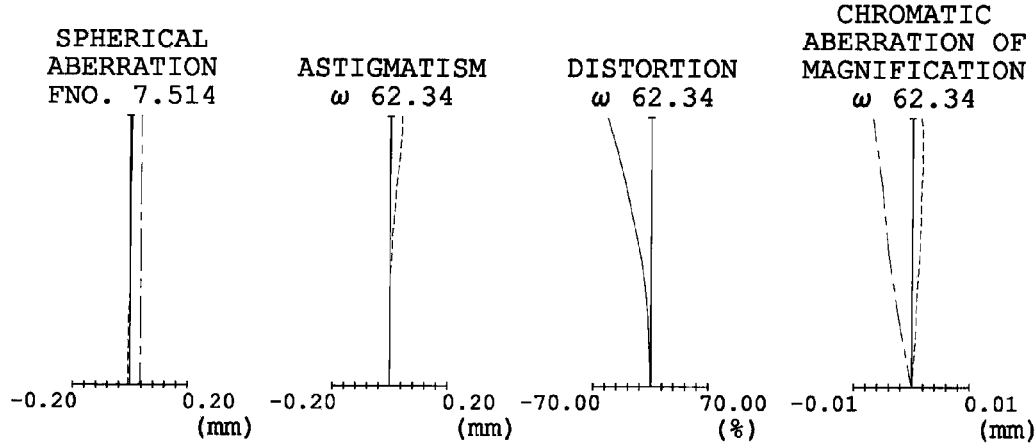

FIG.14A SPHERICAL ABERRATION FNO. 7.514
FIG.14B ASTIGMATISM ω 62.34
FIG.14C DISTORTION ω 62.34
FIG.14D CHROMATIC ABERRATION OF MAGNIFICATION ω 62.34

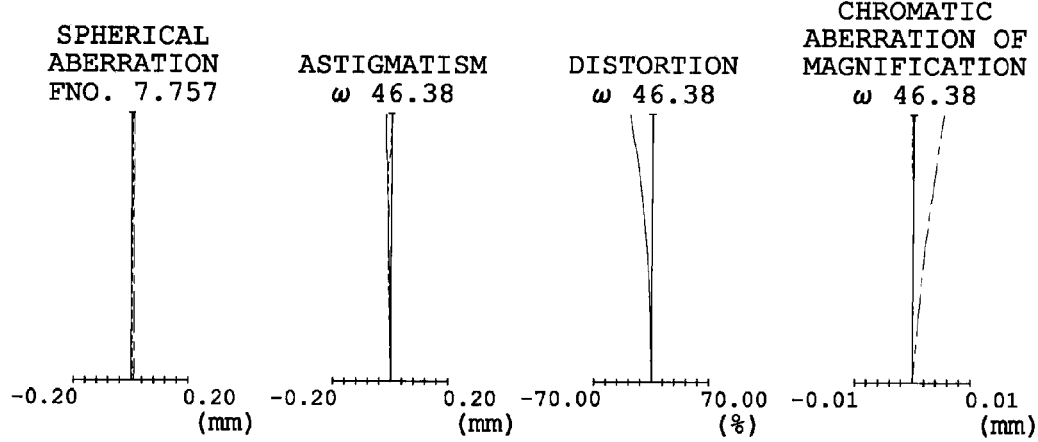

FIG.14E SPHERICAL ABERRATION FNO. 7.757
FIG.14F ASTIGMATISM ω 46.38
FIG.14G DISTORTION ω 46.38
FIG.14H CHROMATIC ABERRATION OF MAGNIFICATION ω 46.38

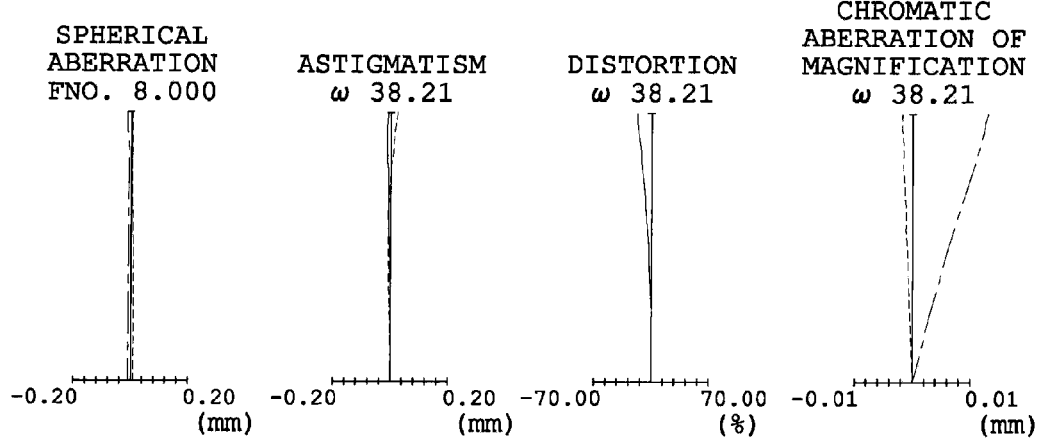

FIG.14I SPHERICAL ABERRATION FNO. 8.000
FIG.14J ASTIGMATISM ω 38.21
FIG.14K DISTORTION ω 38.21
FIG.14L CHROMATIC ABERRATION OF MAGNIFICATION ω 38.21

435.84 — · · —
656.27 — — —
587.56 ———

EMBODIMENT 8

EMBODIMENT 8
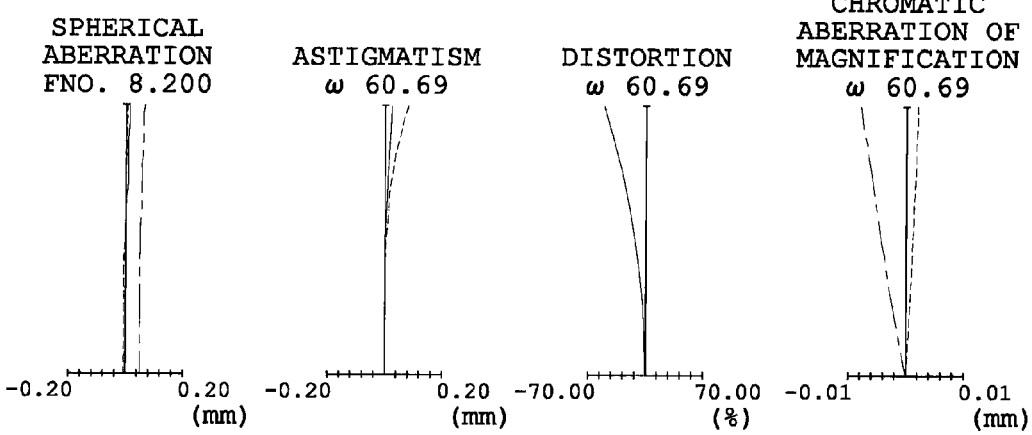
FIG.16A SPHERICAL ABERRATION FNO. 8.200
FIG.16B ASTIGMATISM ω 60.69
FIG.16C DISTORTION ω 60.69
FIG.16D CHROMATIC ABERRATION OF MAGNIFICATION ω 60.69
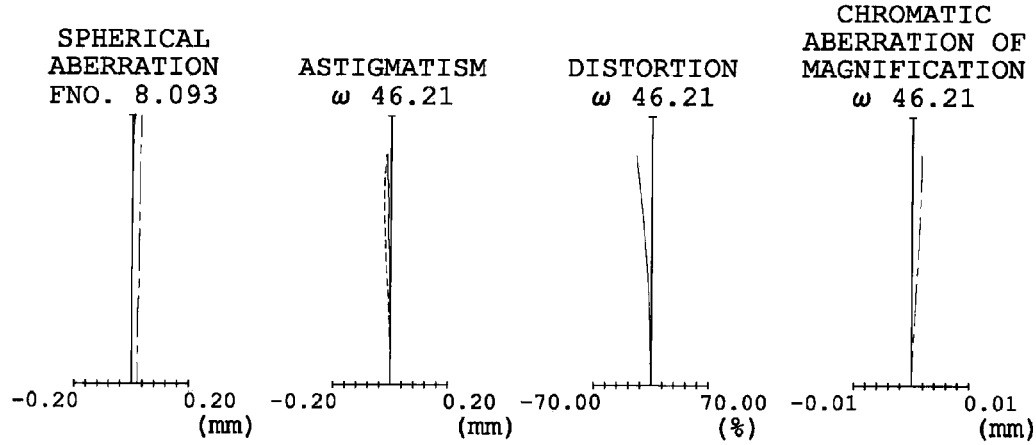
FIG.16E SPHERICAL ABERRATION FNO. 8.093
FIG.16F ASTIGMATISM ω 46.21
FIG.16G DISTORTION ω 46.21
FIG.16H CHROMATIC ABERRATION OF MAGNIFICATION ω 46.21
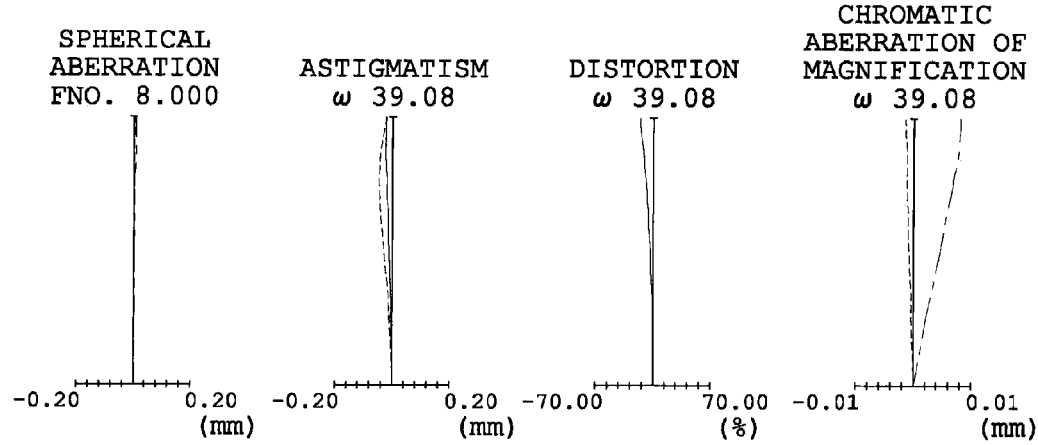
FIG.16I SPHERICAL ABERRATION FNO. 8.000
FIG.16J ASTIGMATISM ω 39.08
FIG.16K DISTORTION ω 39.08
FIG.16L CHROMATIC ABERRATION OF MAGNIFICATION ω 39.08
435.84 — - —
656.27 - - - - - -
587.56 ———

EMBODIMENT 9

EMBODIMENT 9

435.84 —·—
656.27 -------
587.56 ———

EMBODIMENT 10

EMBODIMENT 10
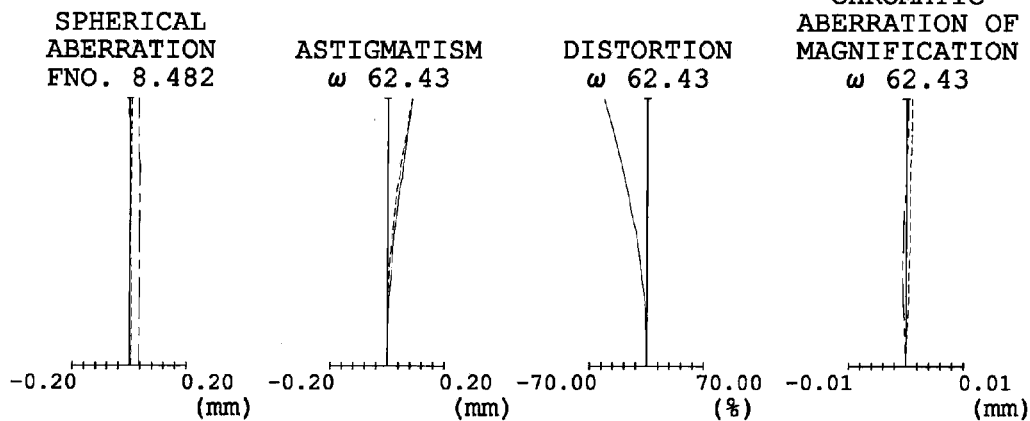
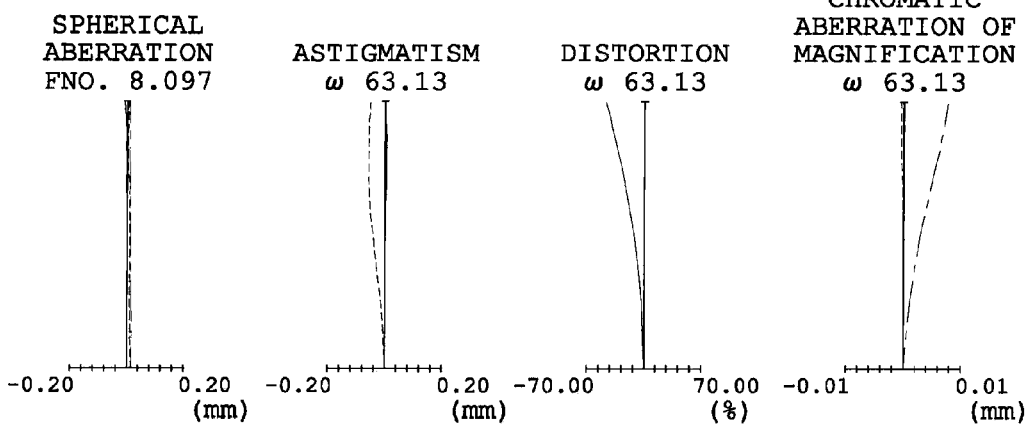
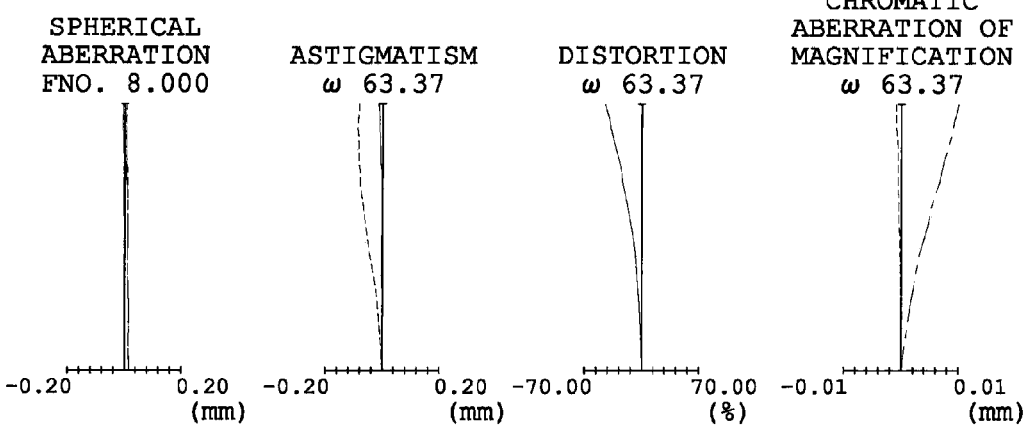

EMBODIMENT 11

EMBODIMENT 11
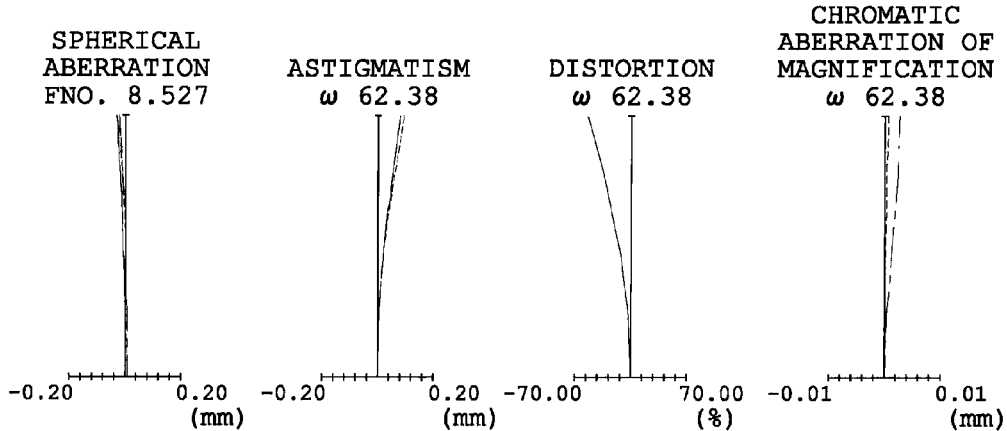
FIG.22A Spherical Aberration FNO. 8.527
FIG.22B Astigmatism ω 62.38
FIG.22C Distortion ω 62.38
FIG.22D Chromatic Aberration of Magnification ω 62.38
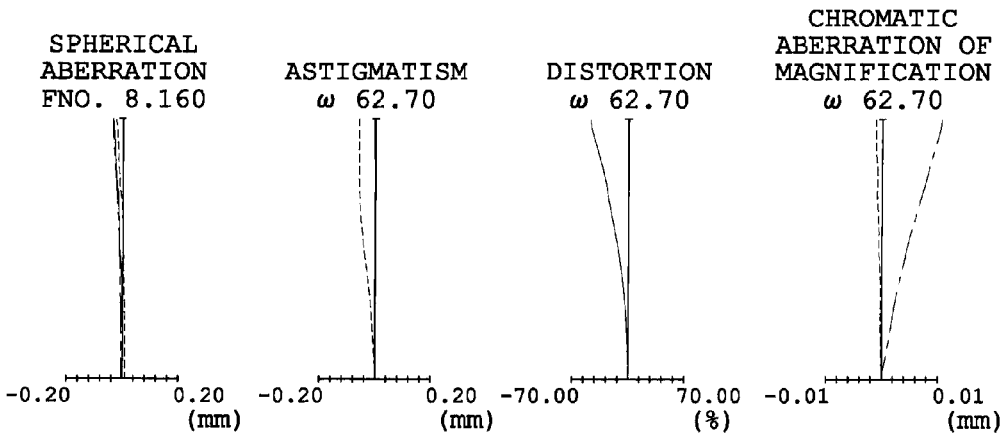
FIG.22E Spherical Aberration FNO. 8.160
FIG.22F Astigmatism ω 62.70
FIG.22G Distortion ω 62.70
FIG.22H Chromatic Aberration of Magnification ω 62.70
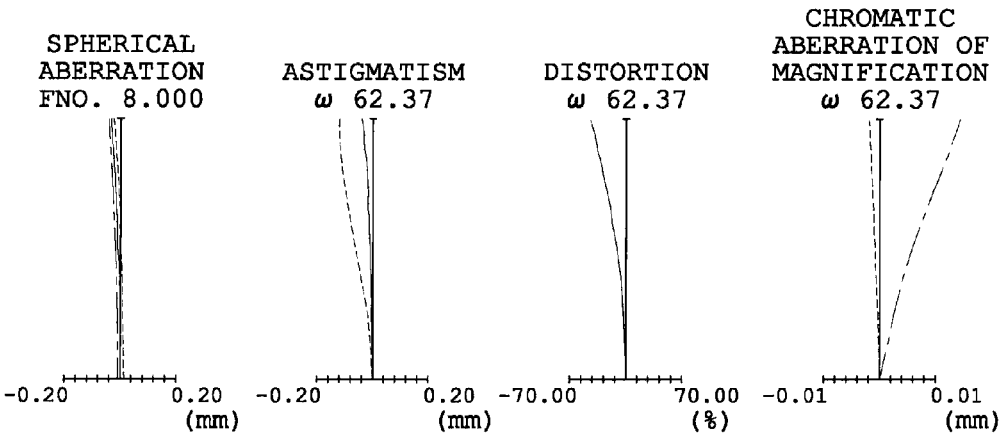
FIG.22I Spherical Aberration FNO. 8.000
FIG.22J Astigmatism ω 62.37
FIG.22K Distortion ω 62.37
FIG.22L Chromatic Aberration of Magnification ω 62.37
435.84 —·—
656.27 --------
587.56 ——

EMBODIMENT 12

EMBODIMENT 12

435.84 — · —
656.27 - - - - -
587.56 ———

EMBODIMENT 13

EMBODIMENT 13
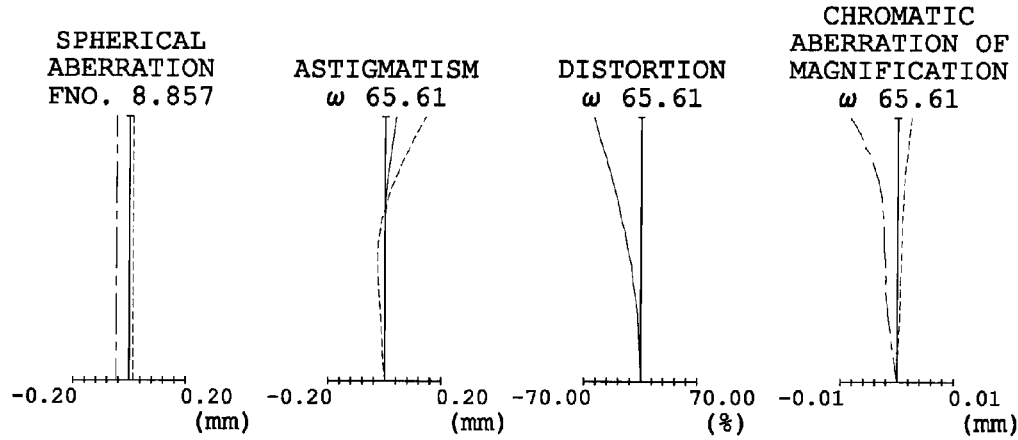
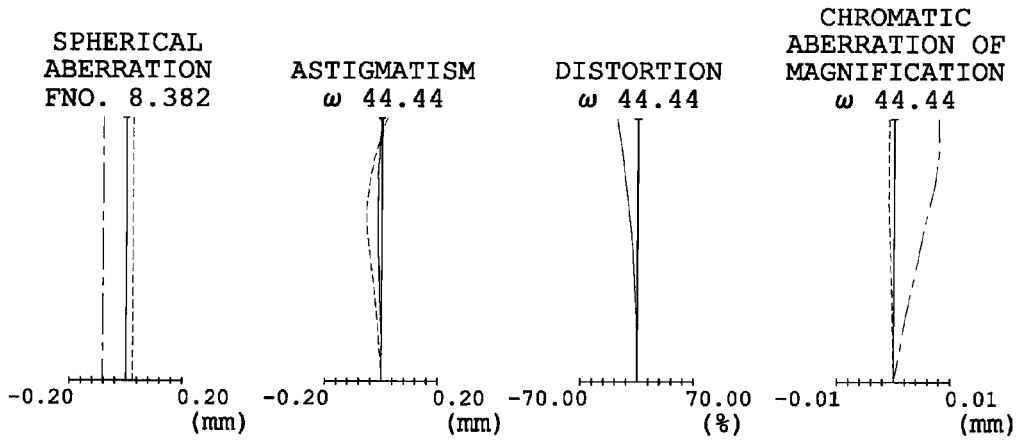
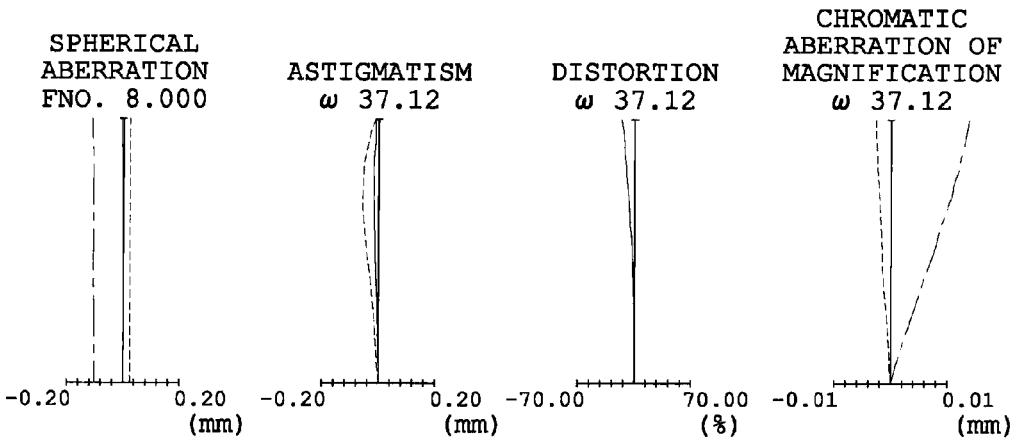

OBJECTIVE LENS AND OBSERVATION APPARATUS HAVING THE SAME

This application is a continuation of International Application No. PCT/JP2013/082876, filed on Dec. 6, 2013, which claims priority from Japanese Patent Application No. 2012-268496 filed in Japan on Dec. 7, 2012, the contents of which are incorporated by reference

FIELD OF THE INVENTION

This invention relates to an objective lens which is provided with a movable lens group moving along the optical axis, and relates to an observation apparatus having the same.

DESCRIPTION OF THE RELATED ART

Objective lenses having known up to now include an objective lens in which a lens group is moved to reversibly and continuously change magnification to change a state of the objective lens suitable for normal observation (which is called "normal observation state" below) into a state of the objective lens suitable for close-up observation (which is called "close-up observation state" below) so that a particular object optionally selected from a plurality of objects that are present in an observation area by an observer can be observed in detail.

An example of such an objective lens is, for example, an objective lens: which consists of a first lens group with positive power, a second lens group with negative power, and a third lens group with positive power, these lens group being arranged in that order from the object side; and in which a magnification is changed by moving the second lens group along the optical axis (refer to Japanese Patent Kokai No. 2010-32680 and Japanese Patent Kokai No. Hei 11-316339).

SUMMARY OF THE INVENTION

An objective lens according to the present invention is characterized in that the objective lens includes: a first lens group in which a lens arranged nearest to the object side has negative power and which is immovable in changing magnification from the normal observation state to the close-up observation state; a second lens group which is arranged nearer to the image side than the first lens group is and which moves along the optical axis in the change of magnification from the normal observation state to the close-up observation state; a third lens group which is arranged nearer to the image side than the second lens group is and which is immovable in the change of magnification from the normal observation state to the close-up observation state; and an aperture stop which is arranged between the second lens group and an image plane and which is immovable in the change of magnification from the normal observation state to the close-up observation state.

Also, an observation apparatus according to the present invention is characterized in that the observation apparatus includes the above-described objective lens and an autofocus mechanism for moving the second lens group so that focusing is performed by the second lens group.

The present invention can offer: an objective lens in which an amount of a change in aberration is small in changing magnification and a sufficient amount of peripheral light can be acquired; and an observation apparatus.

These features and advantages of the present invention will become apparent from the following detailed description of the present embodiments carried out in conjunction with the accompanying drawings.

BRIEF DESCRIPTION OF DRAWINGS

FIG. 1A is a sectional view showing the normal observation state of the optical systems, FIG. 1B is a sectional view showing the middle observation state of the optical systems, and FIG. 1C is a sectional view showing the close-up observation state of the optical systems.

FIGS. 2A to 2L are aberration diagrams showing spherical aberration, astigmatism, distortion, and chromatic aberration of magnification in the optical systems shown in FIGS. 1A to 1C, FIGS. 2A to 2D are aberration diagrams in the normal observation state of the optical systems, FIGS. 2E to 2H are aberration diagrams in the middle observation state of the optical systems, and FIGS. 2I to 2L are aberration diagrams in the close-up observation state of the optical systems.

FIG. 3A is a sectional view showing the normal observation state of the optical systems, FIG. 3B is a sectional view showing the middle observation state of the optical systems, and FIG. 3C is a sectional view showing the close-up observation state of the optical systems.

FIGS. 4A to 4L are aberration diagrams showing spherical aberration, astigmatism, distortion, and chromatic aberration of magnification in the optical systems shown in FIGS. 3A to 3C, FIGS. 4A to 4D are aberration diagrams in the normal observation state of the optical systems, FIGS. 4E to 4H are aberration diagrams in the middle observation state of the optical systems, and FIGS. 4I to 4L are aberration diagrams in the close-up observation state of the optical systems.

FIG. 5A is a sectional view showing the normal observation state of the optical systems, FIG. 5B is a sectional view showing the middle observation state of the optical systems, and FIG. 5C is a sectional view showing the close-up observation state of the optical systems.

FIGS. 6A to 6L are aberration diagrams showing spherical aberration, astigmatism, distortion, and chromatic aberration of magnification in the optical systems shown in FIGS. 5A to 5C, FIGS. 6A to 6D are aberration diagrams in the normal observation state of the optical systems, FIGS. 6E to 6H are aberration diagrams in the middle observation state of the optical systems, and FIGS. 6I to 6L are aberration diagrams in the close-up observation state of the optical systems.

FIG. 7A is a sectional view showing the normal observation state of the optical systems, FIG. 7B is a sectional view showing the middle observation state of the optical systems, and FIG. 7C is a sectional view showing the close-up observation state of the optical systems.

FIGS. 8E to 8H are aberration diagrams in the middle observation state of the optical systems, and FIGS. 8I to 8L are aberration diagrams in the close-up observation state of the optical systems.

FIG. 9A is a sectional view showing the normal observation state of the optical systems, FIG. 9B is a sectional view showing the middle observation state of the optical systems, and FIG. 9C is a sectional view showing the close-up observation state of the optical systems.

FIGS. 10E to 10H are aberration diagrams in the middle observation state of the optical systems, and FIGS. 10I to 10L are aberration diagrams in the close-up observation state of the optical systems.

FIG. 11A is a sectional view showing the normal observation state of the optical systems, FIG. 11B is a sectional view showing the middle observation state of the optical systems, and FIG. 11C is a sectional view showing the close-up observation state of the optical systems.

FIGS. 12A to 12L are aberration diagrams showing spherical aberration, astigmatism, distortion, and chromatic aberration of magnification in the optical systems shown in FIGS. 11 to 11C, FIGS. 12A to 12D are aberration diagrams in the normal observation state of the optical systems, FIGS. 12E to 12H are aberration diagrams in the middle observation state of the optical systems, and FIGS. 12I to 12L are aberration diagrams in the close-up observation state of the optical systems.

FIG. 13A is a sectional view showing the normal observation state of the optical systems, FIG. 13B is a sectional view showing the middle observation state of the optical systems, and FIG. 13C is a sectional view showing the close-up observation state of the optical systems.

FIGS. 14A to 14L are aberration diagrams showing spherical aberration, astigmatism, distortion, and chromatic aberration of magnification in the optical systems shown in FIGS. 13A to 13C, FIGS. 14A to 14D are aberration diagrams in the normal observation state of the optical systems, FIGS. 14E to 14H are aberration diagrams in the middle observation state of the optical systems, and FIGS. 14I to 14L are aberration diagrams in the close-up observation state of the optical systems.

FIG. 15A is a sectional view showing the normal observation state of the optical systems, FIG. 15B is a sectional view showing the middle observation state of the optical systems, and FIG. 15C is a sectional view showing the close-up observation state of the optical systems.

FIGS. 16A to 16L are aberration diagrams showing spherical aberration, astigmatism, distortion, and chromatic aberration of magnification in the optical systems shown in FIGS. 15A to 15C, FIGS. 16A to 16D are aberration diagrams in the normal observation state of the optical systems, FIGS. 16E to 16H are aberration diagrams in the middle observation state of the optical systems, and FIGS. 16I to 16L are aberration diagrams in the close-up observation state of the optical systems.

FIG. 17A is a sectional view showing the normal observation state of the optical systems, FIG. 17B is a sectional view showing the middle observation state of the optical systems, and FIG. 17C is a sectional view showing the close-up observation state of the optical systems.

FIGS. 18E to 18H are aberration diagrams in the middle observation state of the optical systems, and FIGS. 18I to 18L are aberration diagrams in the close-up observation state of the optical systems.

FIG. 19A is a sectional view showing the normal observation state of the optical systems, FIG. 19B is a sectional view showing the middle observation state of the optical systems, and FIG. 19C is a sectional view showing the close-up observation state of the optical systems.

FIGS. 20A to 20L are aberration diagrams showing spherical aberration, astigmatism, distortion, and chromatic aberration of magnification in the optical systems shown in FIGS. 19A to 19C, FIGS. 20A to 20D are aberration diagrams in the normal observation state of the optical systems, FIGS. 20E to 20H are aberration diagrams in the middle observation state of the optical systems, and FIGS. 20I to 20L are aberration diagrams in the close-up observation state of the optical systems.

FIG. 21A is a sectional view showing the normal observation state of the optical systems, FIG. 21B is a sectional view showing the middle observation state of the optical systems, and FIG. 21C is a sectional view showing the close-up observation state of the optical systems.

FIGS. 22A to 22L are aberration diagrams showing spherical aberration, astigmatism, distortion, and chromatic aberration of magnification in the optical systems shown in FIGS. 21A to 21C, FIGS. 22A to 22D are aberration diagrams in the normal observation state of the optical systems, FIGS. 22E to 22H are aberration diagrams in the middle observation state of the optical systems, and FIGS. 22I to 22L are aberration diagrams in the close-up observation state of the optical systems.

FIG. 23A is a sectional view showing the normal observation state of the optical systems, FIG. 23B is a sectional view showing the middle observation state of the optical systems, and FIG. 23C is a sectional view showing the close-up observation state of the optical systems.

FIGS. 24E to 24H are aberration diagrams in the middle observation state of the optical systems, and FIGS. 24I to 24L are aberration diagrams in the close-up observation state of the optical systems.

FIG. 25A is a sectional view showing the normal observation state of the optical systems, FIG. 25B is a sectional view showing the middle observation state of the optical systems, and FIG. 25C is a sectional view showing the close-up observation state of the optical systems.

FIGS. 26A to 26L are aberration diagrams showing spherical aberration, astigmatism, distortion, and chromatic aberration of magnification in the optical systems shown in FIGS. 25A to 25C, FIGS. 26A to 26D are aberration diagrams in the normal observation state of the optical systems, FIGS. 26E to 26H are aberration diagrams in the middle observation state of the optical systems, and FIGS. 26I to 26L are aberration diagrams in the close-up observation state of the optical systems.

DETAILED DESCRIPTION OF THE PREFERRED EMBODIMENTS

Figure 1A:
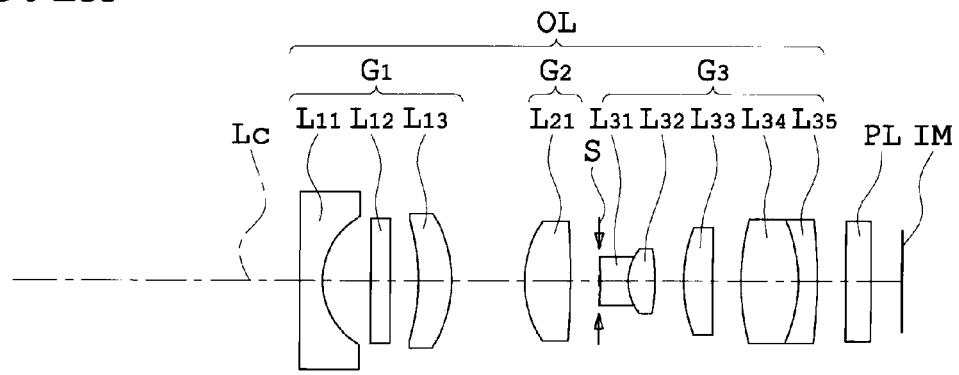
FIGS. 1A to 1C are sectional views showing a structure of optical systems provided for an observation apparatus according to an Embodiment 1 and directions in which the optical systems move respectively, taken along with the optical axis.

Prior to explanations about the Embodiments, operation effects in embodiments of the present invention will be explained. Besides, when the operation effects in the embodiments are specifically explained, the operation effects are to be explained while specific examples are being shown. However, the illustrated embodiments are insistently merely a part of embodiments included by the present invention, like the below-illustrated Embodiments 1 to 13, and the embodiments included by the present invention include numerous variations. Accordingly, the present invention is not limited to the illustrated embodiments.

Besides, a state in which a magnification of an objective lens according to the present invention has the minimum value is called "normal observation" state, a state in which a magnification of the objective lens has the maximum value is called "close-up observation" state, and a state in which a magnification of the objective lens has a value between the values of magnification in the normal observation state and in the close-up observation state is called "middle observation" state, below.

An objective lens of an embodiment according to the present invention is characterized in that the objective lens includes: a first lens group in which a lens arranged nearest to the object side has negative power and which is immovable in changing magnification from the normal observation state to the close-up observation state; a second lens group which is arranged nearer to the image side than the first lens group is and which moves along the optical axis in the change of magnification from the normal observation state to the close-up observation state; a third lens group which is arranged nearer to the image side than the second lens group is and which is immovable in the change of magnification from the normal observation state to the close-up observation state; and an aperture stop which is arranged between the second lens group and an image plane and which is immovable in the change of magnification from the normal observation state to the close-up observation state.

As described above, in the objective lens of the present embodiment, the lens arranged nearest to the object side in the first lens group is a lens having negative power.

As a result, the objective lens of the present embodiment has a wide angle of view and makes it easy to observe an object with an apparatus with the object lens close to the object, or makes it easy to perform close-up observation, because of such a structure of the objective lens of the present embodiment. Also, the objective lens of the present embodiment makes it possible to widen a field of view.

Also, as described above, the objective lens of the present embodiment changes magnification from the normal observation state to the close-up observation state by moving the second lens group along the optical axis while the first and third lens groups are staying immovable, the second lens group being arranged nearer to the object side than the aperture stop is and at a position at which the heights of light beams are relatively low.

Such a constitution provided for the objective lens of the present embodiment makes it possible to make variation in astigmatism small.

As described above, the objective lens of the present embodiment further includes an aperture stop which is arranged between the movable second lens group and the image plane, the aperture stop being immovable in changing magnification.

Such a constitution provided for the objective lens of the present embodiment makes it possible to prevent variation in positions of exit pupil in the second lens group, that is to say, makes it possible to prevent change in angle at which a light bundle enters the image plane, even though the second lens group as a movable lens group moves. As a result, it is easy to optimize an image-pickup element, and it is also possible to prevent deterioration of peripheral brightness in an observation apparatus provided with this objective lens.

Also, such a constitution of the objective lens of the present embodiment makes it possible to prevent astigmatism and coma in the close-up observation state. In general, the heights of light beams at the image-side surface of the first lens group are particularly high in the close-up observation state of an optical system having such a constitution of lenses as in the present embodiment. And, an amount of refraction of light becomes large in a part of a lens component in which the heights of light beams are high, so that field curvature, astigmatism, and coma inevitably occur. In the objective lens of the present embodiment, the aperture stop is arranged at the characteristic position, so that it is possible to prevent the heights of light beams from becoming unnecessarily high to prevent the occurrences of these aberrations.

Also, it is preferred that the objective lens of the present embodiment satisfies the following condition (1):

$$1.24 < |F_1/F_n| < 1.8 \quad (1)$$

where, $F_{1f}$ denotes the focal length of the lens that is placed nearest to the object side in the first lens group and $F_n$ denotes the focal length of the whole system in the normal observation state.

This condition (1) specifies power of the lens that is arranged nearest to the object side in the object lens. If the objective lens is configured in such a way that $|F_{1f}/F_n|$ is not below the lower limit of the condition (1), it is possible to increase the focal length of the lens, and the occurrence of various aberrations can be easily prevented. In addition, it is possible to decrease the focal length of the whole system of the objective lens, so that it is easy to secure a sufficient depth of field. On the other hand, if the objective lens is configured in such a way that $|F_{1f}/F_n|$ is not beyond the upper limit of the condition (1), it is possible to lower the heights of light beams in the lens, that is to say, it is possible to make the lens have a small diameter, so that the outer diameter of the whole of the objective lens can be easily downsized.

Besides, it is more preferred that the objective lens of the present embodiment is configured to satisfy one of the following conditions (1-1) and (1-2) instead of the condition (1):

$$1.25<|F_{1f}/F_n|<1.7 \quad (1\text{-}1)$$

$$1.27<|F_{1f}/F_n|<1.6 \quad (1\text{-}2)$$

Also, the upper limit of the condition (1-1) may be used as the upper limit of the condition (1) or (1-2). Also, the lower limit of the condition (1-1) may be used as the lower limit of the condition (1) or (1-2). Also, the upper limit of the condition (1-2) may be used as the upper limit of the condition (1) or (1-1). Also, the lower limit of the condition (1-2) may be used as or the lower limit of the condition (1) or (1-1).

Also, it is preferred that the objective lens of the present embodiment satisfies the following condition (2):

$$0.8<|F_{1f}/F_c|<1.7 \quad (2)$$

where, $F_{1f}$ denotes focal length of the lens that is arranged nearest to the object side in the first lens group and $F_c$ denotes focal length of the whole system in the close-up observation state.

This conditions (2) specifies power of the lens that is arranged nearest to the object side in the objective lens. If the objective lens is configured in such a way that $|F_{1f}/F_c|$ is not below the lower limit of the condition (2), it is possible to increase the focal length of the lens, and it is easy to prevent occurrences of various aberrations. In addition, it is possible to decrease the focal length of the whole system of the objective lens, so that it is easy to secure a sufficient depth of field. On the other hand, if the objective lens is configured in such a way that $|F_{1f}/F_c|$ is not beyond the upper limit of the condition (2), it is possible to lower the heights of light beams in the lens, that is to say, it is possible to make the lens have a small diameter, so that the outer diameter of the whole of the objective lens can be in turn downsized.

Besides, it is more preferred that the objective lens of the present embodiment is configured to satisfy one of the following conditions (2-1) and (2-2) instead of the condition (2):

$$0.9<|F_{1f}/F_c|<1.6 \quad (2\text{-}1)$$

$$0.95<|F_{1f}/F_c|<1.55 \quad (2\text{-}2)$$

Also, the upper limit of the condition (2-1) may be used as the upper limit of the condition (2) or (2-2). Also, the lower limit of the condition (2-1) may be used as the lower limit of the condition (2) or (2-2). Also, the upper limit of the condition (2-2) may be used as the upper limit of the condition (2) or (2-1). Also, the lower limit of the condition (2-2) may be used as the lower limit of the condition (2) or (2-1).

Also, it is preferred that the objective lens of the present embodiment satisfies the following condition (3):

$$0.7<|\theta_c/\theta_n|<1.5 \quad (3)$$

where, $\theta_c$ denotes an angle of incidence at which a principal ray enters the image plane in the close-up observation state, and $\theta_n$ denotes an angle of incidence at which the principal ray enters the image plane in the normal observation state.

In the case where an image-pickup element is placed in such a way that the light-receiving plane of the image-pickup element corresponds with the image plane, a loss of amount of light occurs in the light-receiving surface when a light bundle slantingly enters the image plane in general, and, particularly, peripheral brightness inevitably deteriorates. Accordingly, a structure of a micro lens or a color filter which is arranged between the objective lens and the image-pickup element is usually given a twist so that loss of peripheral brightness is lowered. However, in the case where an angle of incidence of light widely varies as in the objective lens of the present embodiment, it is not easy to optimize angle of incidence of light through such a manner. Accordingly, it is preferred that the objective lens of the present embodiment satisfies the condition (3).

This condition (3) specifies the relation between angles of incidence of light bundle entering the image plane in the normal observation state and in the close-up observation state. If the objective lens of the present embodiment is configured to satisfy this condition (3), variation in angle of incidence of light cannot become too wide, and it becomes easy to optimize angle of incidence of light even though an image-pickup element is placed, so that it is easy to prevent deterioration of peripheral brightness.

Besides, it is more preferred that the objective lens of the present embodiment is configured to satisfy one of the following conditions (3-1) and (3-2) instead of the condition (3):

$$0.8<|\theta_c/\theta_n|<1.4 \quad (3\text{-}1)$$

$$0.9<|\theta_c/\theta_n|<1.2 \quad (3\text{-}2)$$

Also, the upper limit of the condition (3-1) may be used as the upper limit of the condition (3) or (3-2). Also, the lower limit of the condition (3-1) may be used as the lower limit of the condition (3) or (3-2). Also, the upper limit of the condition (3-2) may be used as the upper limit of the condition (3) or (3-1). Also, the lower limit of the condition (3-2) may be used as the lower limit of the condition (3) or (3-1).

Also, it is preferred that the objective lens of the present embodiment satisfies the following condition (4):

$$\omega_{nP}/\omega_{nMax}<0.8 \quad (4)$$

where, $\omega_{nP}$ denotes a paraxial angle of view in the normal observation state, and $\omega_{nMax}$ denotes the largest angle of view in the normal observation state.

Besides, the paraxial angle of view in the normal observation state is a value determined by the following formula:

$$I_n=F_n\times\tan(\omega_{nP})$$

where $I_n$ denotes the height of the maximum image plane in the normal observation state, and $F_n$ denotes the focal length in the normal observation state.

This condition (4) specifies the ratio of the paraxial angle of view to the maximum angle of view in the normal observation state. If the objective lens is configured to satisfy this condition (4), it is easy to improve resolution in the vicinity of the center of an observation range and, in addition, it is easy to improve peripheral brightness, for example. As a result, it is possible to make a convenient optical system having a wide observation range.

Besides, it is more preferred that the objective lens is configured to satisfy the following condition (4-1) instead of the condition (4):

$$\omega_{nP}/\omega_{nMax} < 0.7 \quad (4\text{-}1)$$

Also, it is preferred that the objective lens of the present embodiment satisfies the following condition (5):

$$-4 < (r_{31f} + r_{31b})/(r_{31f} - r_{31b}) < 2 \quad (5)$$

where, $r_{31f}$ denotes a radius of curvature of the object-side surface of a lens that is arranged nearest to the image side in the third lens group, and $r_{31b}$ denotes a radius of curvature of the image-side surface of the lens that is arranged nearest to the image side in the third lens group This condition (5) specifies the shape of the lens that is arranged nearest to the image side in the third lens group, that is to say, in the objective lens. If the objective lens is configured to satisfy this condition (5), it is easy to correct astigmatism and chromatic aberration of magnification, and it becomes easy to secure favorable optical performance.

Besides, it is more preferred that the objective lens of the present embodiment is configured to satisfy one of the following conditions (5-1) and (5-2) instead of the condition (5):

$$-3.5 < (r_{31f} + r_{31b})/(r_{31f} - r_{31b}) < 1 \quad (5\text{-}1)$$

$$-2.7 < (r_{31f} + r_{31b})/(r_{31f} - r_{31b}) < 0.6 \quad (5\text{-}2)$$

Also, the upper limit of the condition (5-1) may be used as the upper limit of the condition (5) or (5-2). The lower limit of the condition (5-1) may be used as the lower limit of the condition (5) or (5-2). Also, the upper limit of the condition (5-2) may be used as the upper limit of the condition (5) or (5-1). Also, the lower limit of the condition (5-2) may be used as the lower limit of the condition (5) or (5-1)

Also, it is preferred that the objective lens of the present embodiment satisfies the following condition (6):

$$|\Delta DT_n| < 8 \quad (6)$$

where, $\Delta DT_n$ denotes variations in distortion when the second lens group moves minutely in the close-up observation state.

Besides, an amount of this minute movement of the second lens group denotes an amount of movement of the second lens group along the optical axis which is necessary for making the image plane move by $\pm(F \text{ number} \times 0.005)$ mm.

This condition (6) stands for variations in distortion when the second lens group or a movable lens group moves to make the image plane move minutely (or by (F number× 0.005) mm). If the objective lens is configured so that $|\Delta DT_n|$ is not beyond the upper limit of the condition (6), it is easy to lower variations in distortion, or variations in an observed image in observing an object to be imaged.

Besides, it is more preferred that the objective lens of the present embodiment is configured to satisfy one of the following conditions (6-1) and (6-2) instead of the condition (6):

$$|\Delta DT_n| < 6.5 \quad (6\text{-}1)$$

$$|\Delta DT_n| < 5 \quad (6\text{-}2)$$

Also, it is preferred that: the objective lens of the present embodiment satisfies the following condition (7):

$$0.15 < |(1-\beta_{c2} \cdot \beta_{c2}) \times \beta_{c3} \cdot \beta_{c3}| < 1.5 \quad (7)$$

where, $\beta_{c2}$ denotes transverse magnification of the second lens group in the close-up observation state, and $\beta_{c3}$ denotes transverse magnification of the third lens group in the close-up observation state.

This condition (7) specifies an amount of movement of the image plane in a movement of the second lens group or a movable lens group in the close-up observation state. If the objective lens is configured so that $|(1-\beta_{c2} \cdot \beta_{c2}) \times \beta_{c3} \cdot \beta_{c3}|$ is not below the lower limit of the condition (7), there is no situation where an amount of movement of the image plane becomes too small as compared with an amount of movement of the movable lens group. As a result, it is possible to make a necessary amount of movement of the movable lens group small, so that the whole of the optical system can be easily downsized. On the other hand, if the objective lens is configured so that $|(1-\beta_{2c} \cdot \beta_{2c}) \times \beta_{3c} \cdot \beta_{3c}|$ is not beyond the upper limit of the condition (7), there is no situation where an amount of movement of the image plane becomes too large as compared with an amount of movement of the movable lens group. As a result, it is possible to lower aberration variations in field curvature.

Besides, it is more preferred that the objective lens of the present embodiment is configured to satisfy one of the following conditions (7-1) and (7-2) instead of the condition (7):

$$0.2 < |(1-\beta_{c2} \cdot \beta_{c2}) \times \beta_{c3} \cdot \beta_{c3}| < 1.4 \quad (7\text{-}1)$$

$$0.25 < |(1-\beta_{c2} \cdot \beta_{c2}) \times \beta_{c3} \cdot \beta_{c3}| < 1.3 \quad (7\text{-}2)$$

Also, the upper limit of the condition (7-1) may be used as the upper limit of the condition (7) or (7-2). Also, the lower limit of the condition (7-1) may be used as the lower limit of the condition (7) or (7-2). Also, the upper limit of the condition (7-2) may be used as the upper limit of the condition (7) or (7-1). Also, the lower limit of the condition (7-2) may be used as the lower limit of the condition (7) or (7-1).

Also, it is preferred that the second lens group consists of a single lens component in the objective lens of the present embodiment.

When the objective lens of the present embodiment is configured in such a manner, the structure of the objective lens can be easily simplified and easily lightened. In addition, it is also easy to simplify and lighten the structure of an observation apparatus in which this objective lens is incorporated, because of simplicity of the structure of this objective lens. Besides, in this case, the above "lens element" denotes a single lens or a cemented lens.

Also, it is preferred that the third lens group has positive power in the objective lens of the present embodiment.

When the objective lens of the present embodiment is configured in such a manner, it is easy to reduce variations in field curvature, astigmatism, and coma. Also, when the objective lens of the present embodiment has not only a structure in which the aperture stop is fixed but also such a structure, it is possible to easily reduce a variation in angle of incidence of light bundle caused by movement of the second lens group of a movable lens group, and it becomes easy to prevent deterioration of peripheral brightness.

Also, it is preferred that the first lens group has negative power and the second lens group has negative power in the objective lens of the present embodiment.

In the case where the first lens group has negative power and the third lens group has positive power in the objective lens of the present embodiment, it is preferred that the second lens group has negative power.

Such a constitution of the objective lens makes the first lens group share an aberration occurring in the first lens group with the second lens group because both of the first and second lens groups can be made as a negative power group, so that it is easy to control field curvature and astigmatism. Also, it is easy to control a variation in distortion from the normal observation state to the close-up observation state.

Also, it is preferred that the first lens group has positive power and the second lens group has negative power in the objective lens of the present embodiment.

Such a constitution of the objective lens of the present embodiment makes it possible to correct an aberration occurring in the positive first lens group by the positive third lens group because the two positive lens groups are arranged symmetrically, so that it is easy to prevent chromatic aberration of magnification, astigmatism, and distortion.

Also, it is preferred that the objective lens of the present embodiment satisfies the following condition (8):

$$0.9 < Fno_n / Fno_c \quad (8)$$

where, $Fno_n$ denotes the F number of the whole system in the normal observation state and $Fno_c$ denotes the F number of the whole system in the close-up observation state.

If the objective lens of the present embodiment is configured to satisfy this condition (8), it is easy to secure a sufficient focal depth in each of states of the objective lens in the range from the normal observation state to the close-up observation state even though the objective lens is used in combination with an image-pickup element having a large number of pixels. It is because the F number in the normal observation state is approximately equal to the F number in the close-up observation state, so that there is no necessity that the F number in the normal observation state is decreased more than necessary even though the F number in the close-up observation state is decreased so that the objective lens is not affected by diffraction in the close-up observation state.

Also, an observation apparatus of an embodiment according to the present invention is characterized in that: the observation apparatus is provided with one of the above-described objective lenses and an autofocus mechanism for moving the second lens group; and focusing is performed by the second lens group.

Besides, for example, the autofocus mechanism is composed of: a drive mechanism which moves the movable lens group for focusing along the optical axis; and a control means which controls the drive mechanism on the basis of predetermined information (information on images formed on an image pickup element like CCD which is arranged on the image side of the objective lens, information on a distance between the top of the objective lens and an object to be observed, and so on).

Embodiments of an observation apparatus provided with an objective lens of the present invention respectively are explained while reference to the drawings is being made, below.

Besides, subscript numbers given to $r_1$, $r_2$, . . . and $d_1$, $d_2$, . . . in the sectional views along the optical axes of the respective optical systems correspond to surface numbers 1, 2, . . . in numerical data.

Also, in the numerical data, s denotes surface number, r denotes radius of curvature of each surface, d denotes surface distance, nd denotes refractive index at the d line, and vd denotes Abbe's number at the d line. Also, the position of the aperture stop S is clearly expressed by an arrow in the drawings for each of the Embodiments. Because the position of the aperture stop S is close to a position of a lens surface in the drawings, the diameter of the aperture stop that is drawn in the drawings is larger than the actual diameter of the aperture stop. However, those skilled in the art can properly calculate the actual diameter of the aperture stop using an F-number described in each of the Embodiments or the like.

Embodiment 1

An observation apparatus provided with an objective lens according to an Embodiment 1 is explained in detail using FIGS. 1A to 1C and 2A to 2L, below.

Figure 1B:
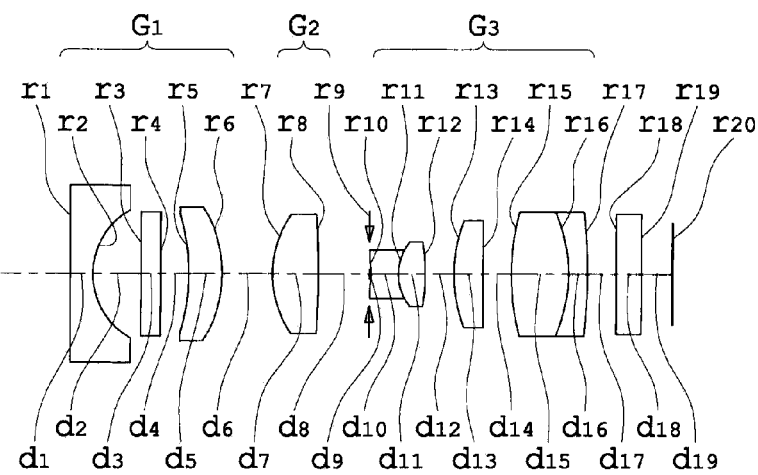
Figure 1C:
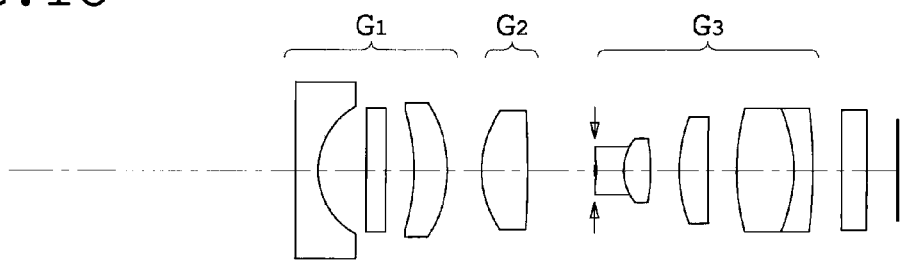

Besides, FIGS. 1A to 1C are sectional views showing a structure of optical systems provided for this observation apparatus according to an Embodiment 1 and directions in which the optical systems move respectively, taken along with the optical axis, FIG. 1A is a sectional view showing the normal observation state of the optical systems, FIG. 1B is a sectional view showing the middle observation state of the optical systems, and FIG. 1C is a sectional view showing the close-up observation state of the optical systems. FIGS. 2A to 2L are aberration diagrams showing spherical aberration, astigmatism, distortion, and chromatic aberration of magnification in the optical systems shown in FIGS. 1A to 1C, FIGS. 2A to 2D are aberration diagrams in the normal observation state of the optical systems, FIGS. 2E to 2H are aberration diagrams in the middle observation state of the optical systems, and FIGS. 2I to 2L are aberration diagrams in the close-up observation state of the optical systems.

As shown in FIGS. 1A to 1C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 1A to 1C. Besides, all of these components are arranged on the optical axis Lc.

The objective optical system OL consists of: a first lens group $G_1$ having negative power; a second lens group $G_2$ having positive power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a plano-concave lens which has negative power and the concave surface of which faces the image side; a lens $L_{12}$ that is a plano lens; and a lens $L_{13}$ that is a meniscus lens which has positive power and the convex surface of which faces the image side, these lenses being arranged in that order from the object side.

The second lens group $G_2$ consists of: a lens $L_{21}$ that is a biconvex lens which has positive power.

The third lens group $G_3$ consists of: a lens $L_{31}$ that is a biconcave lens which has negative power; a lens $L_{32}$ that is a biconvex lens which has positive power; a lens $L_{33}$ that is a meniscus lens which has positive power and the concave surface of which faces the image side; a lens $L_{34}$ that is a biconvex lens which has positive power; and a lens $L_{35}$ that is a meniscus lens which has negative power and the convex surface of which faces the image side, these lenses being arranged in that order from the object side. Besides, the lens $L_{31}$ and the lens $L_{32}$ are joined to each other, and the lens $L_{34}$ and the is lens $L_{35}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 1
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.78 | | |
| 3 | ∞ | 0.31 | 1.51400 | 73.43 |
| 4 | ∞ | 0.45 | | |
| 5 | −3.219 | 0.54 | 1.81600 | 46.62 |
| 6 | −1.949 | D6 | | |
| 7 | 1.633 | 0.74 | 1.58913 | 61.14 |
| 8 | −13.006 | D8 | | |
| 9 (Stop surface) | ∞ | 0.03 | | |
| 10 | −1.186 | 0.44 | 1.59270 | 35.31 |
| 11 | 0.800 | 0.43 | 1.48749 | 70.23 |
| 12 | −2.732 | 0.45 | | |
| 13 | 2.257 | 0.47 | 1.58913 | 61.14 |
| 14 | 47.501 | 0.45 | | |
| 15 | 3.795 | 0.92 | 1.88300 | 40.76 |
| 16 | −2.335 | 0.30 | 1.92286 | 18.90 |
| 17 | −8.306 | 0.45 | | |
| 18 | ∞ | 0.40 | 1.52300 | 58.50 |
| 19 | ∞ | 0.50 | | |
| 20 (Image plane) | ∞ | | | |

Various data on objective optical system
Zoom ratio: 1.36

| Observation state | Normal observation | Middle | Close-up observation |
|---|---|---|---|
| Focal length | 0.95 | 1.14 | 1.29 |
| F NUMBER | 8.34 | 8.16 | 8.00 |
| Angle of view (2ω) | 121.47 | 93.26 | 78.18 |
| Image height | 0.80 | 0.80 | 0.80 |
| Total length of lens (in air) | 9.44 | 9.18 | 8.97 |
| BF (in air) | 1.16 | 0.90 | 0.69 |

Surface distance

| Observation state | Normal observation | Middle | Close-up observation |
|---|---|---|---|
| D6 | 1.16 | 0.79 | 0.54 |
| D8 | 0.45 | 0.82 | 1.07 |

Data on lens group

| Group | The first surface of lens group | Focal length |
|---|---|---|
| 1 | 1 | −3.87 |
| 2 | 7 | 2.51 |
| 3 | 10 | 2.25 |

Numerical Data 1
Unit: mm

Data on conditions

Condition (1): $1.24 < |F_{lf}/F_n| < 1.8$: −1.368
Condition (2): $0.8 < |F_{lf}/F_c| < 1.7$ : −1.007
Condition (3): $0.7 < |\theta_c/\theta_n| < 1.5$: 1.00
Condition (4): $\omega_{nP}/\omega_{nMax} < 0.7$: 0.659
Condition (5): $-3 < (r_{3lf} + r_{3lb})/(r_{3lf} - r_{3lb}) < 2$: −1.78
Condition (6): $|ADT_n| < 8$: −4.543
Condition (7): $0.2 < |(1 - \beta_{c2} \cdot \beta_{c2}) \times \beta_{c3} \cdot \beta_{c3}| < 1.2$: 0.411
Condition (8): $0.9 < Fno_n/Fno_c$: 1.04

Embodiment 2

An observation apparatus provided with an objective lens according to an Embodiment 2 is explained in detail using FIGS. 3A to 3C and 4A to 4L, below.

Figure 3A:
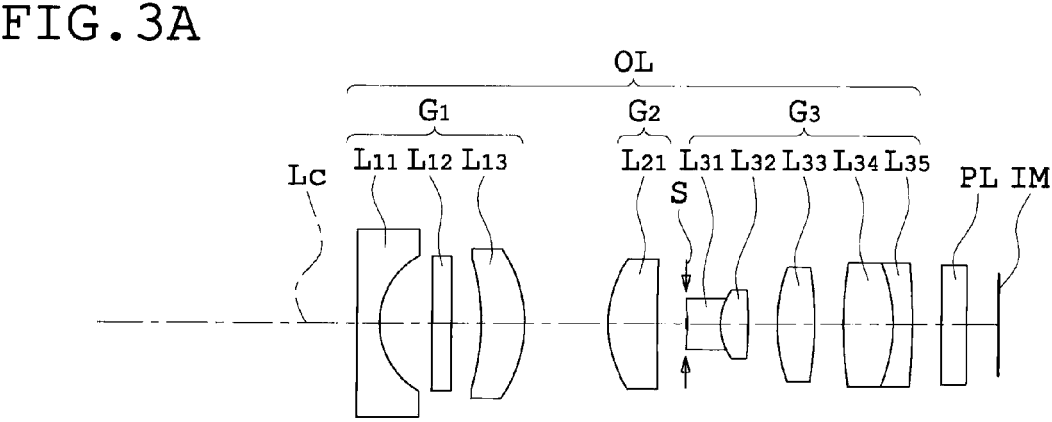
FIGS. 3A to 3C are sectional views showing a structure of optical systems provided for an observation apparatus according to an Embodiment 2 and directions in which the optical systems move respectively, taken along with the optical axis.
Figure 3B:
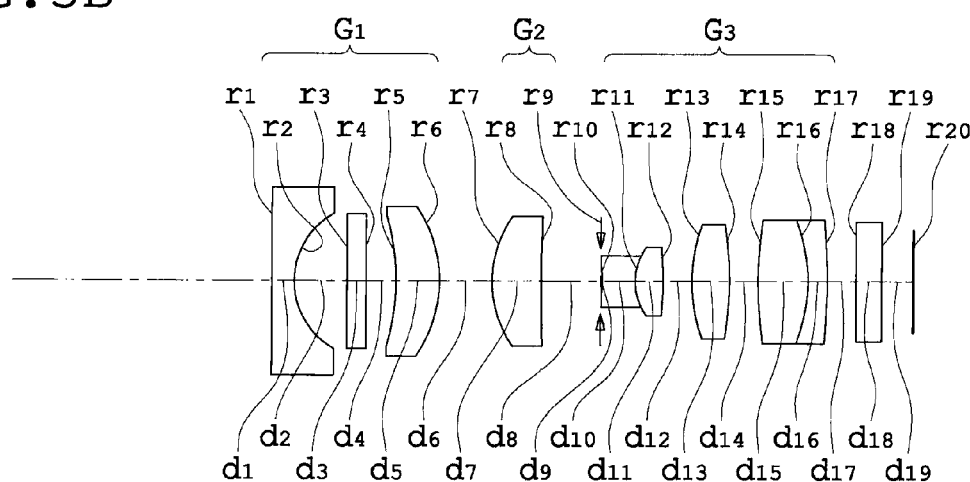
Figure 3C:
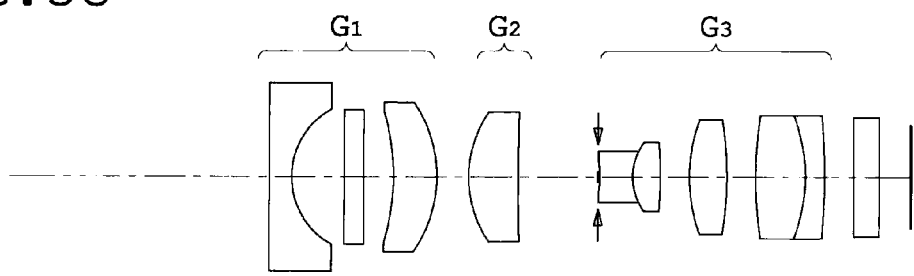

Besides, FIGS. 3A to 3C are sectional views showing a structure of optical systems provided for this observation apparatus according to an Embodiment 2 and directions in which the optical systems move respectively, taken along with the optical axis, FIG. 3A is a sectional view showing the normal observation state of the optical systems, FIG. 3B is a sectional view showing the middle observation state of the optical systems, and FIG. 3C is a sectional view showing the close-up observation state of the optical systems. FIGS. 4A to 4L are aberration diagrams showing spherical aberration, astigmatism, distortion, and chromatic aberration of magnification in the optical systems shown in FIGS. 3A to 3C, FIGS. 4A to 4D are aberration diagrams in the normal observation state of the optical systems, FIGS. 4E to 4H are aberration diagrams in the middle observation state of the optical systems, and FIGS. 4I to 4L are aberration diagrams in the close-up observation state of the optical systems.

As shown in FIGS. 3A to 3C, this observation apparatus includes: an objective optical system OL; a plano lens optical system PL which is arranged on the image side of the objective optical system OL and which substantially has no refractive power; an aperture stop S which is arranged in the objective optical system OL; and an image pickup element like CCD, only the image plane IM of the image pickup element being shown in FIGS. 3A to 3C. Besides, all of these components are arranged on the optical axis Lc.

The objective optical system OL consists of: a first lens group $G_1$ having negative power; a second lens group $G_2$ having positive power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a plano-concave lens which has negative power and the concave surface of which faces the image side; a lens $L_{12}$ that is a plano lens; and a lens $L_{13}$ that is a meniscus lens which has positive power and the convex surface of which faces the image side, these lenses being arranged in that order from the object side.

The second lens group $G_2$ consists of a lens $L_{21}$ that is a meniscus lens which has positive power and the concave surface of which faces the image side.

The third lens group $G_3$ consists of: a lens $L_{31}$ that is a biconcave lens which has negative power; a lens $L_{32}$ that is a biconvex lens which has positive power; a lens $L_{33}$ that is a biconvex lens which has positive power; a lens $L_{33}$ that is a biconvex lens which to has positive power; a lens $L_{34}$ that is a biconvex lens which has positive power; and a lens $L_{35}$ that is a meniscus lens which has negative power and the convex surface of which faces the image side, these lenses being arranged in that order from the object side. Besides, the lens $L_{31}$ and the lens $L_{32}$ are joined to each other, and the lens $L_{34}$ and the lens $L_{35}$ are joined to each other.

And, this observation apparatus is configured in such a way that movement of the second lens group $G_2$ to the object side along the optical axis can make an observation state of the objective optical system reversibly and continuously change: from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 2
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.200 | 0.83 | | |
| 3 | ∞ | 0.31 | 1.51400 | 73.43 |
| 4 | ∞ | 0.47 | | |
| 5 | −3.541 | 0.68 | 1.88300 | 40.76 |
| 6 | −2.056 | D6 | | |
| 7 | 1.753 | 0.78 | 1.58913 | 61.14 |
| 8 | 36.011 | D8 | | |
| 9 (Stop surface) | ∞ | 0.03 | | |
| 10 | −1.383 | 0.52 | 1.58144 | 40.75 |
| 11 | 0.900 | 0.44 | 1.48749 | 70.23 |
| 12 | −5.939 | 0.45 | | |
| 13 | 2.524 | 0.60 | 1.69680 | 55.53 |
| 14 | −5.573 | 0.45 | | |
| 15 | 6.380 | 0.79 | 1.88300 | 40.76 |
| 16 | −2.509 | 0.30 | 1.92286 | 18.90 |
| 17 | −10.370 | 0.45 | | |
| 18 | ∞ | 0.40 | 1.52300 | 58.50 |
| 19 | ∞ | 0.50 | | |
| 20 (Image plane) | ∞ | | | |

Various data on objective optical system
Zoom ratio: 1.40

| Observation state | Normal observation | Middle | Close-up observation |
|---|---|---|---|
| Focal length | 0.95 | 1.15 | 1.33 |
| F NUMBER | 8.36 | 8.17 | 8.00 |
| Angle of view (2ω) | 120.05 | 92.40 | 77.32 |
| Image height | 0.80 | 0.80 | 0.80 |
| Total length of lens (in air) | 9.92 | 9.66 | 9.43 |
| BF (in air) | 1.16 | 0.91 | 0.68 |

Surface distance

| Observation state | Normal observation | Middle | Close-up observation |
|---|---|---|---|
| D6 | 1.31 | 0.83 | 0.50 |
| D8 | 0.45 | 0.93 | 1.26 |

Numerical Data 2
Unit: mm

Data on lens group

| Group | The first surface of lens group | Focal length |
|---|---|---|
| 1 | 1 | −6.16 |
| 2 | 7 | 3.10 |
| 3 | 10 | 2.21 |

Data on conditions

Condition (1): $1.24 < |F_{tf}/F_n| < 1.8$: −1.428
Condition (2): $0.8 < |F_{tf}/F_c| < 1.7$: −1.021
Condition (3): $0.7 < |\theta_c/\theta_n| < 1.5$: 1.00
Condition (4): $\omega_{nP}/\omega_{nMax} < 0.7$: 0.667
Condition (5): $-3 < (r_{3lf} + r_{3lb})/(r_{3lf} - r_{3lb}) < 2$: −1.63
Condition (6): $|ADT_n| < 8$: −3.779
Condition (7): $0.2 < |(1 - \beta_{c2} \cdot \beta_{c2}) \times \beta_{c3} \cdot \beta_{c3}| < 1.2$: 0.321
Condition (8): $0.9 < Fno_n/Fno_c$: 1.04

Embodiment 3

An observation apparatus provided with an objective lens according to an Embodiment 3 is explained in detail using FIGS. 5A to 5C and 6A to 6L, below.

Figure 5A:
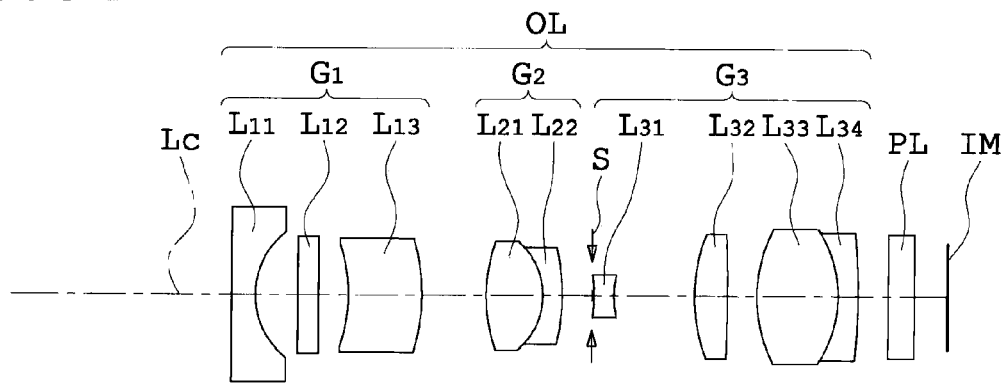
FIGS. 5A to 5C are sectional views showing a structure of optical systems provided for an observation apparatus according to an Embodiment 3 and directions in which the optical systems move respectively, taken along with the optical axis.
Figure 5B:
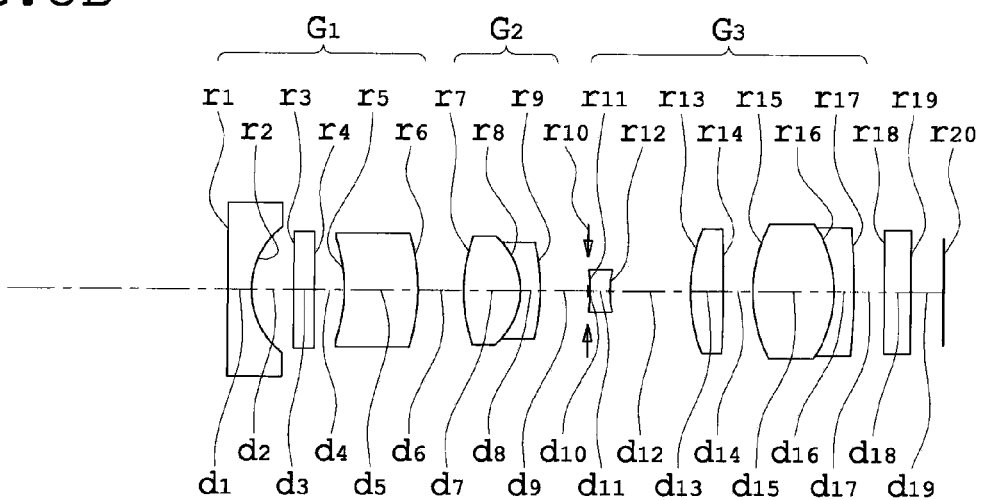
Figure 5C:
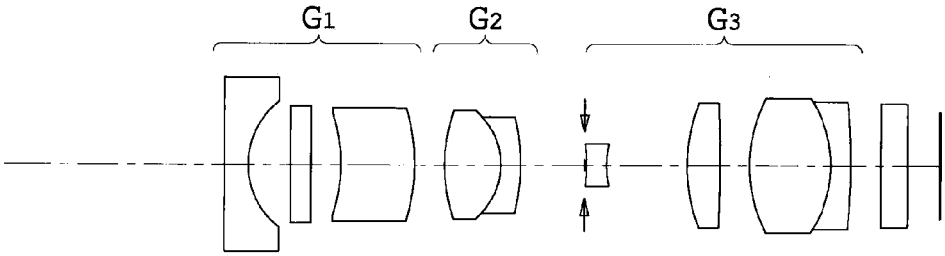

Besides, FIGS. 5A to 5C are sectional views showing a structure of optical systems provided for this observation apparatus according to an Embodiment 3 and directions in which the optical systems move respectively, taken along with the optical axis, FIG. 5A is a sectional view showing the normal observation state of the optical systems, FIG. 5B is a sectional view showing the middle observation state of the optical systems, and FIG. 5C is a sectional view showing the close-up observation state of the optical systems. FIGS. 6A to 6L are aberration diagrams showing spherical aberration, astigmatism, distortion, and chromatic aberration of magnification in the optical systems shown in FIGS. 5A to 5C, FIGS. 6A to 6D are aberration diagrams in the normal observation state of the optical systems, FIGS. 6E to 6H are aberration diagrams in the middle observation state of the optical systems, and FIGS. 6I to 6L are aberration diagrams in the close-up observation state of the optical systems.

As shown in FIGS. 5A to 5C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 5A to 5C. Besides, all of these components are arranged on the optical axis Lc.

The objective optical system OL consists of: a first lens group $G_1$ having negative power; a second lens group $G_2$ having positive power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a plano-concave lens which has negative power and the concave surface of which faces the image side; a lens $L_{12}$ that is a plano lens; and a lens $L_{13}$ that is a meniscus lens which has negative power and the convex surface of which faces the image side, these lenses being arranged in that order from the object side.

The second lens group $G_2$ consists of: a lens $L_{21}$ that is a biconvex lens which has positive power; and a lens $L_{22}$ that is a meniscus lens which has negative power and the convex surface of which faces the image side, these lenses being arranged in that order from the object side. Besides, the lens $L_{21}$ and the lens $L_{22}$ are joined to each other.

The third lens group $G_3$ consists of: a lens $L_{31}$ that is a biconcave lens which has negative power; a lens $L_{32}$ that is a biconvex lens which has positive power; a lens $L_{33}$ that is a biconvex lens which has positive power; and a lens $L_{34}$ that is a meniscus lens which has negative power and the convex surface of which faces the image side, these lenses being arranged in that order from the object side. Besides, the lens $L_{33}$ and the lens $L_{34}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 3
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.186 | 0.65 | | |
| 3 | ∞ | 0.31 | 1.51400 | 73.43 |
| 4 | ∞ | 0.45 | | |
| 5 | −2.347 | 1.12 | 1.92286 | 18.90 |
| 6 | −2.862 | D6 | | |
| 7 | 2.437 | 0.86 | 1.80100 | 34.97 |
| 8 | −1.065 | 0.30 | 1.92286 | 18.90 |
| 9 | −3.061 | D9 | | |
| 10 (Stop surface) | ∞ | 0.03 | | |
| 11 | −3.146 | 0.30 | 1.48749 | 70.23 |
| 12 | 1.331 | 1.23 | | |
| 13 | 2.556 | 0.50 | 1.65160 | 58.55 |
| 14 | −21.046 | 0.45 | | |
| 15 | 2.200 | 1.23 | 1.58913 | 61.14 |
| 16 | −1.800 | 0.30 | 1.92286 | 18.90 |
| 17 | −9.377 | 0.45 | | |
| 18 | ∞ | 0.40 | 1.52300 | 58.50 |
| 19 | ∞ | 0.50 | | |
| 20 (Image plane) | ∞ | | | |

Various data on objective optical system
Zoom ratio: 1.30

| Observation state | Normal observation | Middle | Close-up observation |
|---|---|---|---|
| Focal length | 0.94 | 1.09 | 1.22 |
| F NUMBER | 8.40 | 8.18 | 8.00 |
| Angle of view (2ω) | 125.06 | 97.78 | 82.25 |
| Image height | 0.80 | 0.80 | 0.80 |
| Total length of lens (in air) | 10.68 | 10.44 | 10.23 |
| BF (in air) | 1.16 | 0.92 | 0.72 |

-continued

Numerical Data 3
Unit: mm

Surface distance

| Observation state | Normal observation | Middle | Close-up observation |
|---|---|---|---|
| D6 | 0.98 | 0.69 | 0.45 |
| D9 | 0.45 | 0.74 | 0.98 |

Data on lens group

| Group | The first surface of lens group | Focal length |
|---|---|---|
| 1 | 1 | −1.67 |
| 2 | 7 | 2.10 |
| 3 | 11 | 3.44 |

Data on conditions

Condition (1): $1.24 < |F_{tf}/F_n| < 1.8$: −1.427
Condition (2): $0.8 < |F_{tf}/F_c| < 1.7$: −1.100
Condition (3): $0.7 < |\theta_c/\theta_n| < 1.5$: 1.00
Condition (4): $\omega_{nP}/\omega_{nMax} < 0.7$: 0.645
Condition (5): $-3 < (r_{3lf} + r_{3lb})/(r_{3lf} - r_{3lb}) < 2$: −1.47
Condition (6): $|\Delta DT_n| < 8$: −5.205
Condition (7): $0.2 < |(1 - \beta_{c2} \cdot \beta_{c2}) \times \beta_{c3} \cdot \beta_{c3}| < 1.2$: 0.373
Condition (8): $0.9 < Fno_n/Fno_c$: 1.05

Embodiment 4

An observation apparatus provided with an objective lens according to an Embodiment 4 is explained in detail using FIGS. 7A to 7C and 8A to 8L, below.

Figure 7A:
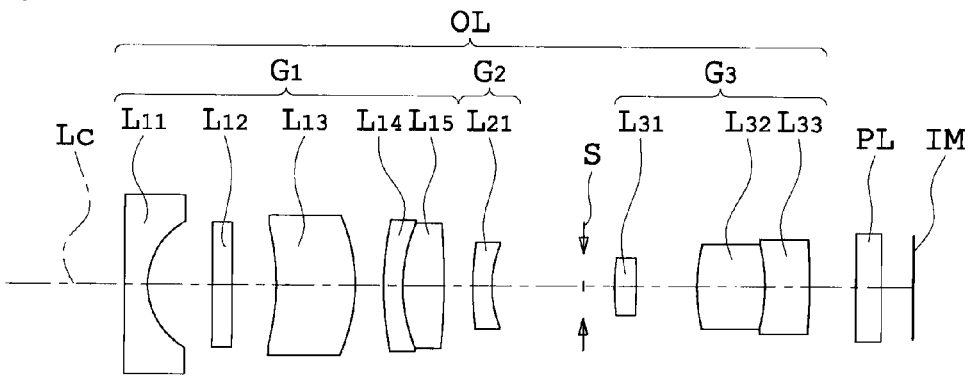
FIGS. 7A to 7C are sectional views showing a structure of optical systems provided for an observation apparatus according to an Embodiment 4 and directions in which the optical systems move respectively, taken along with the optical axis.
Figure 7B:
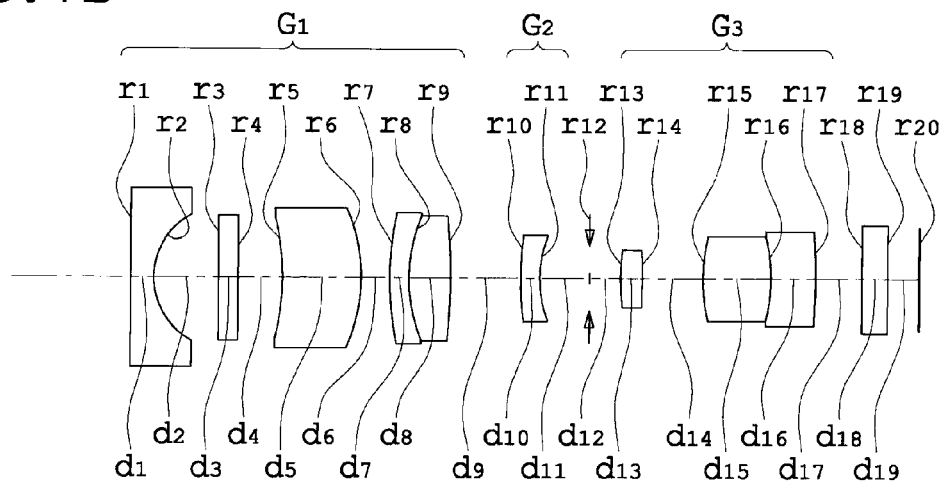
Figure 7C:
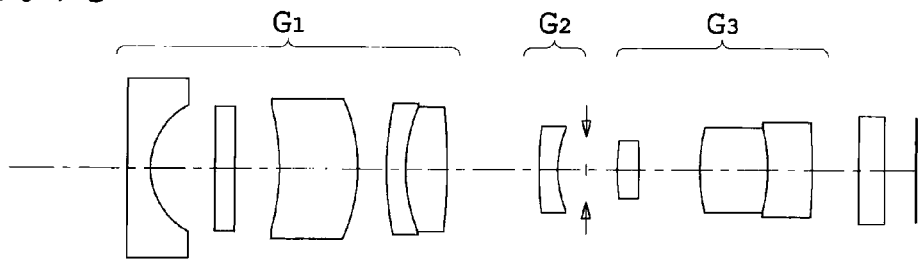
Figure 8A:
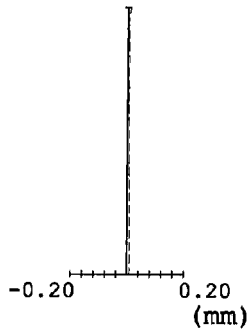
FIGS. 8A to 8L are aberration diagrams showing spherical aberration, astigmatism, distortion, and chromatic aberration of magnification in the optical systems shown in FIGS. 7A to 7C, FIGS. 8A to 8D are aberration diagrams in the normal observation state of the optical systems.
Figure 8B:
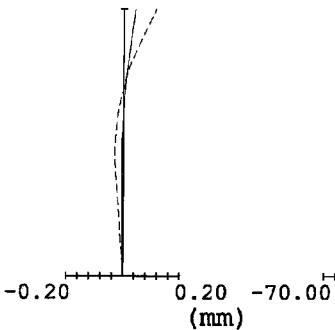
Figure 8C:
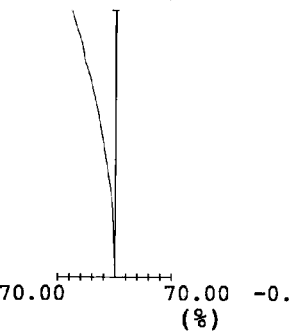
Figure 8D:
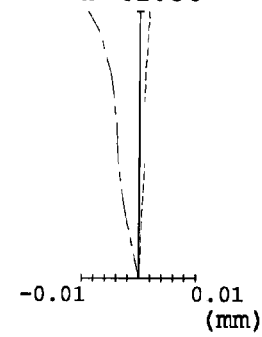
Figure 8E:
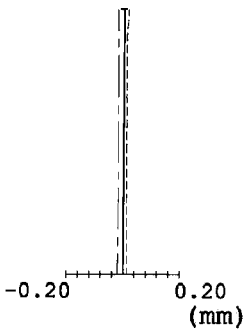
Figure 8F:
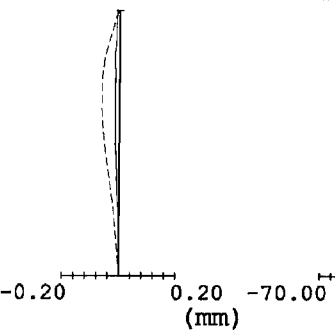
Figure 8G:
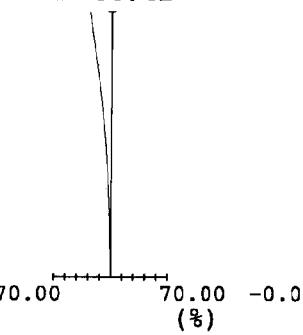
Figure 8H:
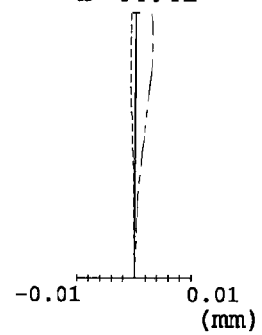
Figure 8I:
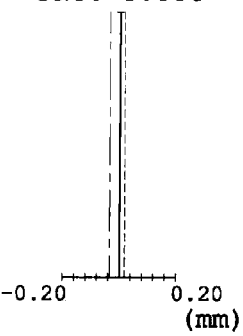
Figure 8J:
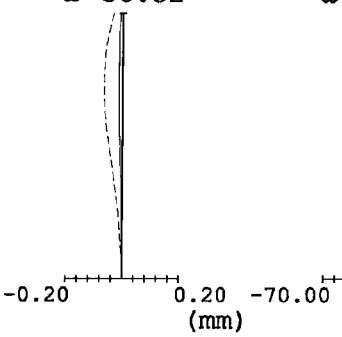
Figure 8K:
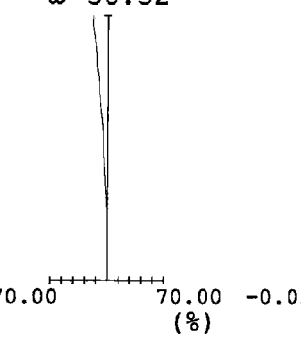
Figure 8L:
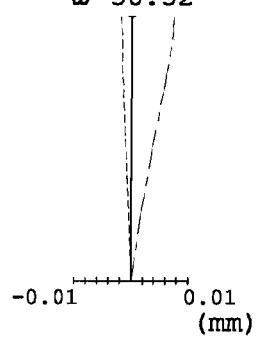

Besides, FIGS. 7A to 7C are sectional views showing a structure of optical systems provided for this observation apparatus according to an Embodiment 4 and directions in which the optical systems move respectively, taken along with the optical axis, FIG. 7A is a sectional view showing the normal observation state of the optical systems, FIG. 7B is a sectional view showing the middle observation state of the optical systems, and FIG. 7C is a sectional view showing the close-up observation state of the optical systems. FIGS. 8A to 8L are aberration diagrams showing spherical aberration, astigmatism, distortion, and chromatic aberration of magnification in the optical systems shown in FIGS. 7A to 7C, FIGS. 8A to 8D are aberration diagrams in the normal observation state of the optical systems, FIGS. 8E to 8H are aberration diagrams in the middle observation state of the optical systems, and FIGS. 8I to 8L are aberration diagrams in the close-up observation state of the optical systems.

As shown in FIGS. 7A to 7C, this observation apparatus includes: an objective optical system OL; a plano lens optical system PL which is arranged on the image side of the objective optical system OL and substantially has no refractive power, an aperture stop S which is arranged in the objective optical system OL; and an image pickup element like CCD, only the image plane IM of the image pickup element being shown in FIGS. 7A to 7C. Besides, all of these components are arranged on the optical axis Lc.

The objective optical system OL consists of: a first lens group $G_1$ having positive power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a plano-concave lens which has negative power and the concave surface of which faces the image side; a lens $L_{12}$ that is a plano lens; a lens $L_{13}$ that is a meniscus lens which has positive power and the convex surface of which faces the image side; a lens $L_{14}$ that is a meniscus lens which has negative power and the concave surface of which faces the image side; and a lens $L_{15}$ that is a biconvex lens which has positive power, these lenses being arranged in that order from the object side. Besides, the lens $L_{14}$ and the lens $L_{15}$ are joined to each other.

The second lens group $G_2$ consists of a lens $L_{21}$ that is a meniscus lens which has negative power and the concave surface of which faces the image side.

The third lens group $G_3$ consists of: a lens $L_{31}$ that is a biconvex lens which has positive power; a lens $L_{32}$ that is a biconvex lens which has positive power; and a lens $L_{33}$ that is a meniscus lens which has negative power and the convex surface of which faces the image side, these lenses being arranged in that order from the object side. Besides, the lens $L_{32}$ and the lens $L_{33}$ are joined to each other.

And, this observation apparatus is configured in such a way that movement of the second lens group $G_2$ to the image side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 4
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.102 | 1.02 | | |
| 3 | ∞ | 0.31 | 1.51400 | 73.43 |
| 4 | ∞ | 0.70 | | |
| 5 | −3.585 | 1.23 | 1.74951 | 35.33 |
| 6 | −2.641 | 0.45 | | |
| 7 | 4.735 | 0.30 | 1.92286 | 18.90 |
| 8 | 2.496 | 0.65 | 1.88300 | 40.76 |
| 9 | −9.184 | D9 | | |
| 10 | 4.876 | 0.30 | 1.80400 | 46.57 |
| 11 | 1.681 | D11 | | |
| 12 (Stop surface) | ∞ | 0.48 | | |
| 13 | 3.309 | 0.35 | 1.69680 | 55.53 |
| 14 | −9.254 | 0.94 | | |
| 15 | 2.751 | 1.07 | 1.48749 | 70.23 |
| 16 | −2.743 | 0.70 | 1.92286 | 18.90 |
| 17 | −10.460 | 0.72 | | |
| 18 | ∞ | 0.40 | 1.52300 | 58.50 |
| 19 | ∞ | 0.50 | | |
| 20 (Image plane) | ∞ | | | |

Various data on objective optical system
Zoom ratio: 1.26

| Observation state | Normal observation | Middle | Close-up observation |
|---|---|---|---|
| Focal length | 0.95 | 1.12 | 1.20 |
| F NUMBER | 8.85 | 8.36 | 8.00 |
| Angle of view (2ω) | 123.11 | 88.85 | 76.64 |
| Image height | 0.80 | 0.80 | 0.80 |

Numerical Data 4
Unit: mm

| | | | |
|---|---|---|---|
| Total length of lens (in air) | 12.18 | 11.93 | 11.74 |
| BF (in air) | 1.44 | 1.18 | 1.00 |

Surface distance

| Observation state | Normal observation | Middle | Close-up observation |
|---|---|---|---|
| D9 | 0.45 | 1.09 | 1.43 |
| D11 | 1.43 | 0.79 | 0.45 |

Data on lens group

| Group | The first surface of lens group | Focal length |
|---|---|---|
| 1 | 1 | 1.56 |
| 2 | 10 | −3.33 |
| 3 | 13 | 2.73 |

Data on conditions

Condition (1): $1.24 < |F_{lf}/F_n| < 1.8$: −1.309
Condition (2): $0.8 < |F_{lf}/F_c| < 1.7$: −1.037
Condition (3): $0.7 < |\theta_c/\theta_n| < 1.5$: 0.998
Condition (4): $\omega_{nP}/\omega_{nMax} < 0.7$: 0.649
Condition (5): $-3 < (r_{3lf} + r_{3lb})/(r_{3lf} - r_{3lb}) < 2$: −1.71
Condition (6): $|\Delta DT_n| < 8$: −4.351
Condition (7): $0.2 < |(1 - \beta_{c2} \cdot \beta_{c2}) \times \beta_{c3} \cdot \beta_{c3}| < 1.2$: 0.380
Condition (8): $0.9 < Fno_n/Fno_c$: 1.10

Embodiment 5

An observation apparatus provided with an objective lens according to an Embodiment 5 is explained in detail using FIGS. 9A to 9C and 10A to 10L, below.

Figure 9A:
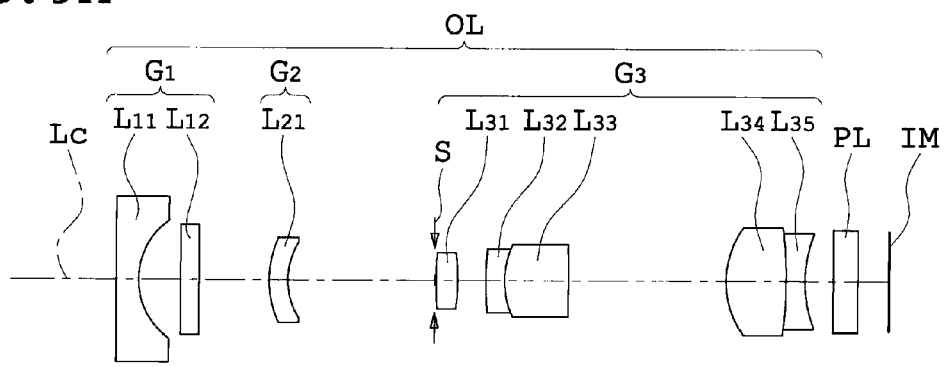
FIGS. 9A to 9C are sectional views showing a structure of optical systems provided for an observation apparatus according to an Embodiment 5 and directions in which the optical systems move respectively, taken along with the optical axis.
Figure 9B:
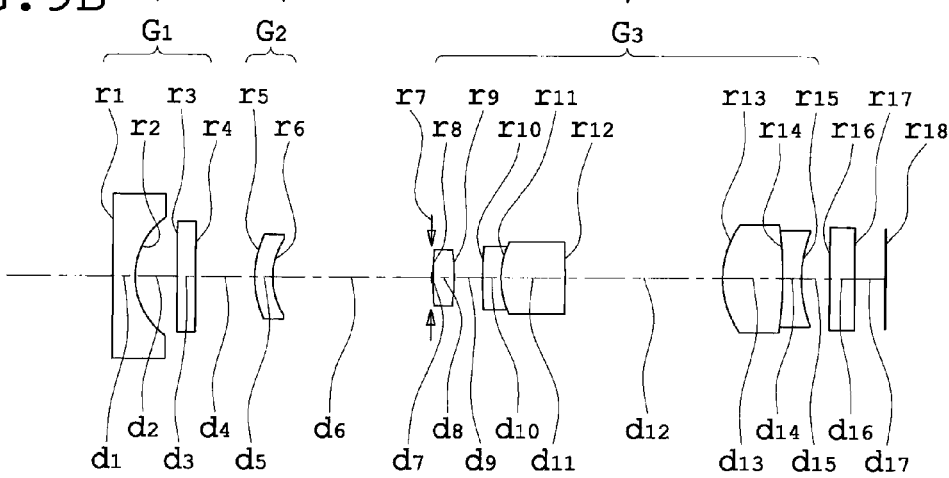
Figure 9C:
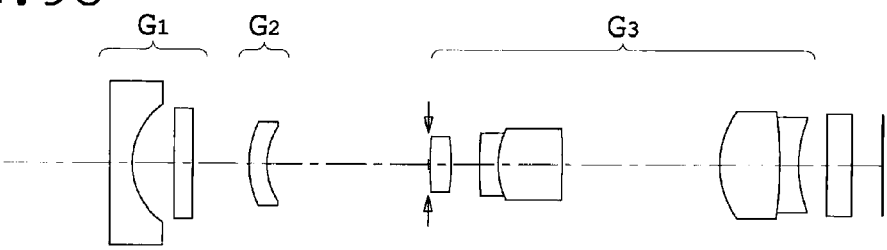
Figures 10A, 10B, 10C, 10D:
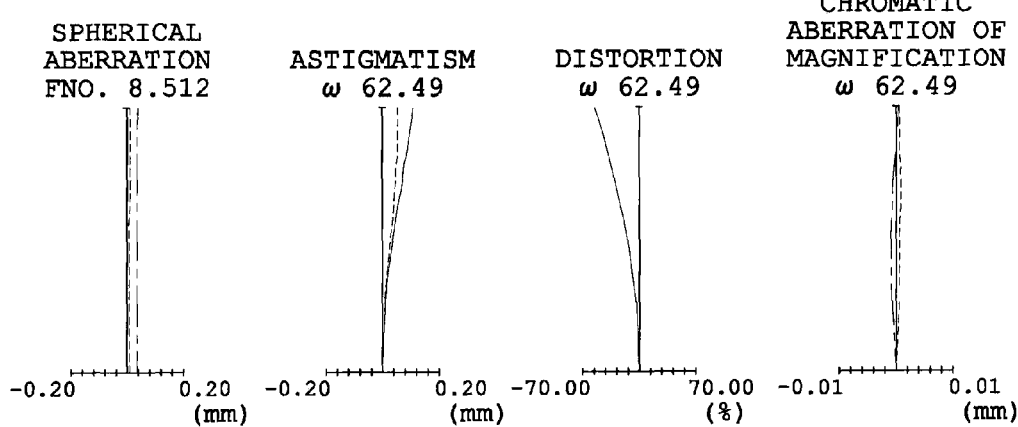
FIGS. 10A to 10L are aberration diagrams showing spherical aberration, astigmatism, distortion, and chromatic aberration of magnification in the optical systems shown in FIGS. 9A to 9C, FIGS. 10A to 10D are aberration diagrams in the normal observation state of the optical systems.
Figures 10E, 10F, 10G, 10H:
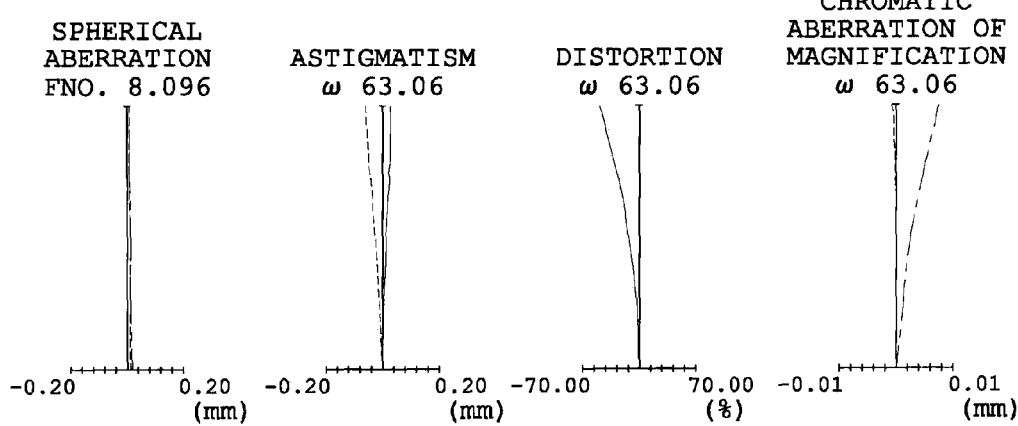
Figures 10I, 10J, 10K, 10L:
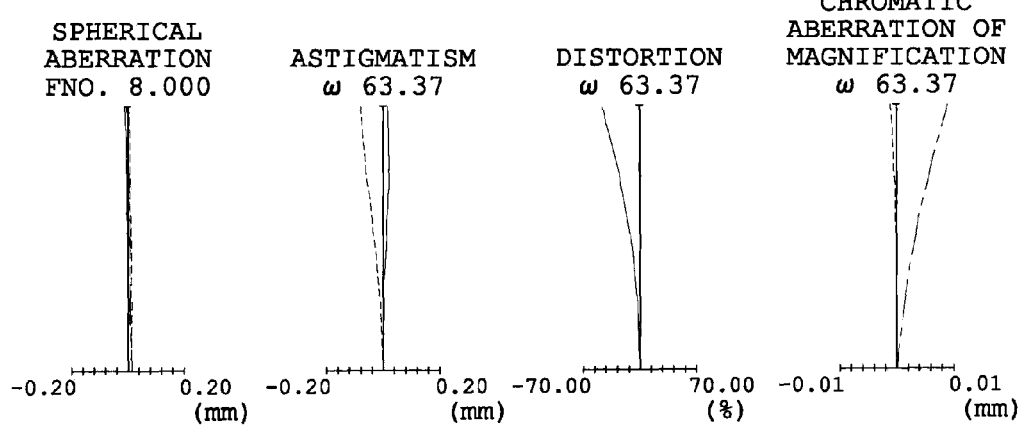

Besides, FIGS. 9A to 9C are sectional views showing a structure of optical systems provided for this observation apparatus according to an Embodiment 5 and directions in which the optical systems move respectively, taken along with the optical axis, FIG. 9A is a sectional view showing the normal observation state of the optical systems, FIG. 9B is a sectional view showing the middle observation state of the optical systems, and FIG. 9C is a sectional view showing the close-up observation state of the optical systems. FIGS. 10A to 10L are aberration diagrams showing spherical aberration, astigmatism, distortion, and chromatic aberration of magnification in the optical systems shown in FIGS. 9A to 9C, FIGS. 10A to 10D are aberration diagrams in the normal observation state of the optical systems, FIGS. 10E to 10H are aberration diagrams in the middle observation state of the optical systems, and FIGS. 10I to 10L are aberration diagrams in the close-up observation state of the optical systems.

As shown in FIGS. 9A to 9C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 9A to 9C. Besides, all of these components are arranged on the optical axis Lc.

The objective optical system OL consists of: a first lens group $G_1$ having negative power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a plano-concave lens which has negative power and the concave surface of which faces the image side; and a lens $L_{12}$ that is a plano lens, these lenses being arranged in that order from the object side.

The second lens group $G_2$ consists of a lens $L_{21}$ that is a meniscus lens which has negative power and the concave surface of which faces the image side.

The third lens group $G_3$ consists of: a lens $L_{31}$ that is a biconvex lens which has positive power; a lens $L_{32}$ that is a meniscus lens which has negative power and the concave surface of which faces the image side; a lens $L_{33}$ that is a biconvex lens which has positive power; a lens $L_{34}$ that is a biconvex lens which has positive power; and a lens $L_{35}$ that is a biconcave lens which has negative power; these lenses being arranged in that order from the object side. Besides, the lens $L_{32}$ and the lens $L_{33}$ are joined to each other, and the lens $L_{34}$ and the lens $L_{35}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 5
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.68 | | |
| 3 | ∞ | 0.31 | 1.51400 | 73.43 |
| 4 | ∞ | D4 | | |
| 5 | 1.575 | 0.30 | 1.92286 | 18.90 |
| 6 | 1.102 | D6 | | |
| 7 (Stop surface) | ∞ | 0.03 | | |
| 8 | 6.042 | 0.35 | 1.69895 | 30.13 |
| 9 | −3.072 | 0.45 | | |
| 10 | 5.578 | 0.30 | 1.92286 | 18.90 |
| 11 | 1.350 | 1.04 | 1.69895 | 30.13 |
| 12 | −20.059 | 2.55 | | |
| 13 | 1.438 | 0.98 | 1.48749 | 70.23 |
| 14 | −6.190 | 0.30 | 1.92286 | 18.90 |
| 15 | 2.046 | 0.45 | | |
| 16 | ∞ | 0.40 | 1.52300 | 58.50 |
| 17 | ∞ | 0.50 | | |
| 18 (Image plane) | ∞ | | | |

Various data on objective optical system
Zoom ratio: 0.93

| Observation state | Normal observation | Middle | Close-up observation |
|---|---|---|---|
| Focal length | 0.93 | 0.88 | 0.87 |
| F NUMBER | 8.51 | 8.10 | 8.00 |
| Angle of view (2ω) | 124.98 | 126.12 | 126.74 |
| Image height | 0.80 | 0.80 | 0.80 |
| Total length of lens (in air) | 12.32 | 12.14 | 12.10 |
| BF (in air) | 1.16 | 0.99 | 0.96 |

-continued

Numerical Data 5
Unit: mm

Surface distance

| Observation state | Normal observation | Middle | Close-up observation |
|---|---|---|---|
| D4 | 1.14 | 0.95 | 0.90 |
| D6 | 2.37 | 2.56 | 2.61 |

Data on lens group

| Group | The first surface of lens group | Focal length |
|---|---|---|
| 1 | 1 | −1.30 |
| 2 | 5 | −5.72 |
| 3 | 8 | 1.85 |

Data on conditions

Condition (1): $1.24 < |F_1/F_n| < 1.8$: −1.396
Condition (2): $0.8 < |F_1/F_c| < 1.7$: −1.500
Condition (3): $0.7 < |\theta_c/\theta_n| < 1.5$: 0.998
Condition (4): $\omega_{nP}/\omega_{nMax} < 0.7$: 0.650
Condition (5): $-3 < (r_{3lf} + r_{3lb})/(r_{3lf} - r_{3lb}) < 2$: 0.503
Condition (6): $|\Delta DT_n| < 8$: −0.632
Condition (7): $0.2 < |(1 - \beta_{c2} \cdot \beta_{c2}) \times \beta_{c3} \cdot \beta_{c3}| < 1.2$: 0.948
Condition (8): $0.9 < Fno_n/Fno_c$: 1.06

Embodiment 6

An observation apparatus provided with an objective lens according to an Embodiment 6 is explained in detail using FIGS. 11A to 11C and 12A to 12L, below.

Figure 11A:
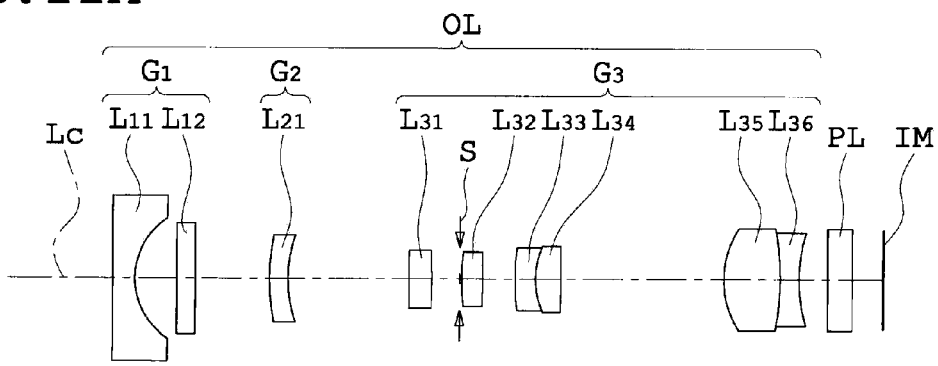
FIGS. 11A to 11C are sectional views showing a structure of optical systems provided for an observation apparatus according to an Embodiment 6 and directions in which the optical systems move respectively, taken along with the optical axis.
Figure 11B:
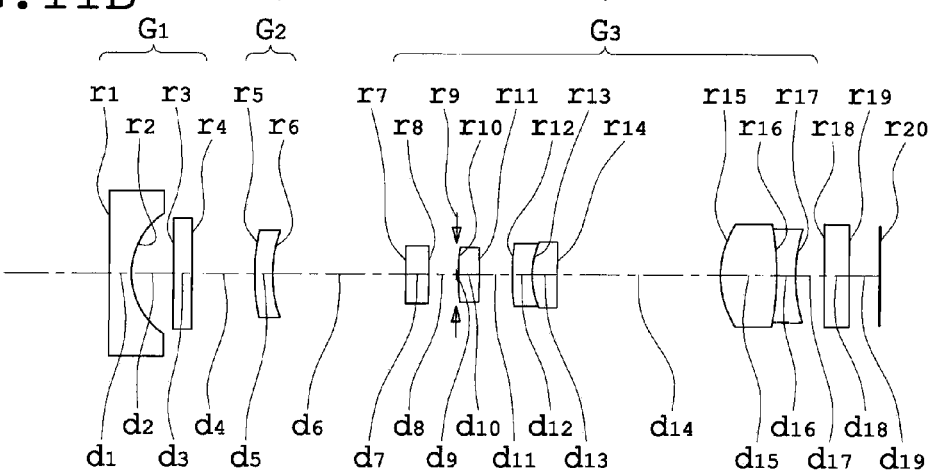
Figure 11C:
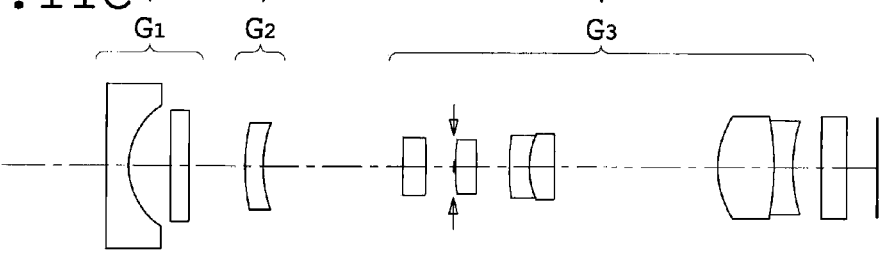

Besides, FIGS. 11A to 11C are sectional views showing a structure of optical systems provided for this observation apparatus according to an Embodiment 6 and directions in which the optical systems move respectively, taken along with the optical axis, FIG. 11A is a sectional view showing the normal observation state of the optical systems, FIG. 11B is a sectional view showing the middle observation state of the optical systems, and FIG. 11C is a sectional view showing the close-up observation state of the optical systems. FIGS. 12A to 12L are aberration diagrams showing spherical aberration, astigmatism, distortion, and chromatic aberration of magnification in the optical systems shown in FIGS. 11A to 11C, FIGS. 12A to 12D are aberration diagrams in the normal observation state of the optical systems, FIGS. 12E to 12H are aberration diagrams in the middle observation state of the optical systems, and FIGS. 12I to 12L are aberration diagrams in the close-up observation state of the optical systems.

As shown in FIGS. 11A to 11C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 11A to 11C. Besides, all of these components are arranged on the optical axis Lc.

The objective optical system OL consists of: a first lens group $G_1$ having negative power; a second lens group $G_2$ having negative power and capable of moving along the optical axis in changing magnification; and a third lens group $G_3$ having positive power, these lens groups being arranged in that order from the object side. Besides, the aperture stop S is arranged in the third lens group $G_3$.

The first lens group $G_1$ consists of a lens $L_{11}$ that is a plano-concave lens which has negative power and the concave surface of which faces the image side; and a lens $L_{12}$ that is a plano lens, these lenses being arranged in that order from the object side.

The second lens group $G_2$ consists of a lens $L_{21}$ that is a meniscus lens which has negative power and the concave surface of which faces the image side.

The third lens group $G_3$ consists of: a lens $L_{31}$ that is a biconvex lens which has positive power; a lens $L_{32}$ that is a biconvex lens which has positive power; a lens $L_{33}$ that is a meniscus lens which has negative power and the concave surface of which faces the image side; a lens $L_{34}$ that is a biconvex lens which has positive power; a lens $L_{35}$ that is a biconvex lens which has positive power; and a lens $L_{36}$ that is a biconcave lens which has negative power, these lenses being arranged in that order from the object side. Besides, the lens $L_{33}$ and the lens $L_{34}$ are joined to each other, and the lens $L_{35}$ and the lens $L_{36}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 6
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.156 | 0.68 | | |
| 3 | ∞ | 0.31 | 1.51400 | 73.43 |
| 4 | ∞ | D4 | | |
| 5 | 3.324 | 0.30 | 1.92286 | 18.90 |
| 6 | 2.052 | D6 | | |
| 7 | 181.427 | 0.37 | 1.58313 | 59.38 |
| 8 | −11.991 | 0.45 | | |
| 9 (Stop surface) | ∞ | 0.03 | | |
| 10 | 3.405 | 0.34 | 1.69895 | 30.13 |
| 11 | −13.877 | 0.53 | | |
| 12 | 4.040 | 0.33 | 1.92286 | 18.90 |
| 13 | 1.261 | 0.41 | 1.69895 | 30.13 |
| 14 | −106.024 | 2.65 | | |
| 15 | 1.517 | 0.92 | 1.48749 | 70.23 |
| 16 | −4.277 | 0.30 | 1.92286 | 18.90 |
| 17 | 2.561 | 0.46 | | |
| 18 | ∞ | 0.40 | 1.52300 | 58.50 |
| 19 | ∞ | 0.50 | | |
| 20 (Image plane) | ∞ | | | |

Various data on objective optical system
Zoom ratio: 0.94

| Observation state | Normal observation | Middle | Close-up observation |
|---|---|---|---|
| Focal length | 0.92 | 0.88 | 0.86 |
| F NUMBER | 8.48 | 8.16 | 8.00 |
| Angle of view (2ω) | 126.22 | 126.58 | 126.62 |
| Image height | 0.80 | 0.80 | 0.80 |
| Total length of lens (in air) | 12.31 | 12.18 | 12.11 |
| BF (in air) | 1.18 | 1.04 | 0.97 |

Numerical Data 6
Unit: mm

Surface distance

| Observation state | Normal observation | Middle | Close-up observation |
|---|---|---|---|
| D4 | 1.21 | 1.02 | 0.90 |
| D6 | 1.97 | 2.16 | 2.28 |

Data on lens group

| Group | The first surface of lens group | Focal length |
|---|---|---|
| 1 | 1 | −1.31 |
| 2 | 5 | −6.55 |
| 3 | 7 | 2.04 |

Data on conditions

Condition (1): $1.24 < |F_{1f}/F_n| < 1.8$: −1.427
Condition (2): $0.8 < |F_{1f}/F_c| < 1.7$: −1.522
Condition (3): $0.7 < |\theta_c/\theta_n| < 1.5$: 0.998
Condition (4): $\omega_{nP}/\omega_{nMax} < 0.7$: 0.651
Condition (5): $-3 < (r_{3lf} + r_{3lb})/(r_{3lf} - r_{3lb}) < 2$: 0.250
Condition (6): $|\Delta DT_n| < 8$: −1.113
Condition (7): $0.2 < |(1 - \beta_{c2} \cdot \beta_{c2}) \times (\beta_{c3} \cdot \beta_{c3})| < 1.2$: 0.693
Condition (8): $0.9 < Fno_n/Fno_c$: 1.05

Embodiment 7

An observation apparatus provided with an objective lens according to an Embodiment 7 is explained in detail using FIGS. 13A to 13C and 14A to 14L, below.

Figure 13A:
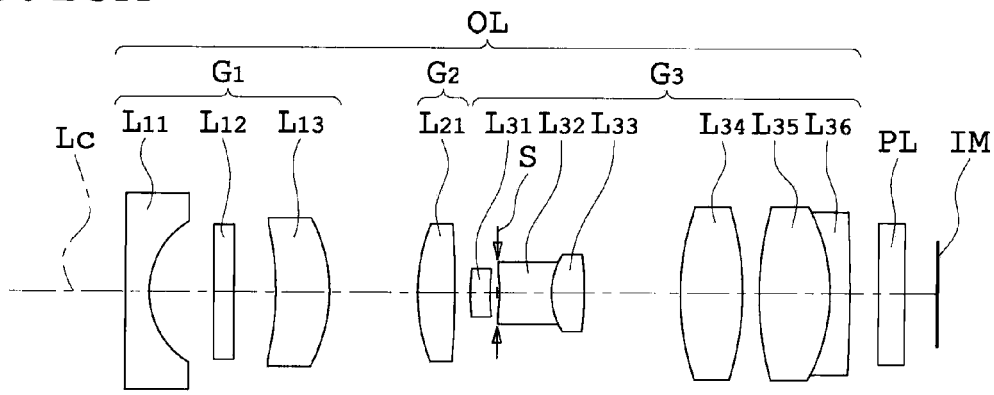
FIGS. 13A to 13C are sectional views showing a structure of optical systems provided for an observation apparatus according to an Embodiment 7 and directions in which the optical systems move respectively, taken along with the optical axis.
Figure 13B:
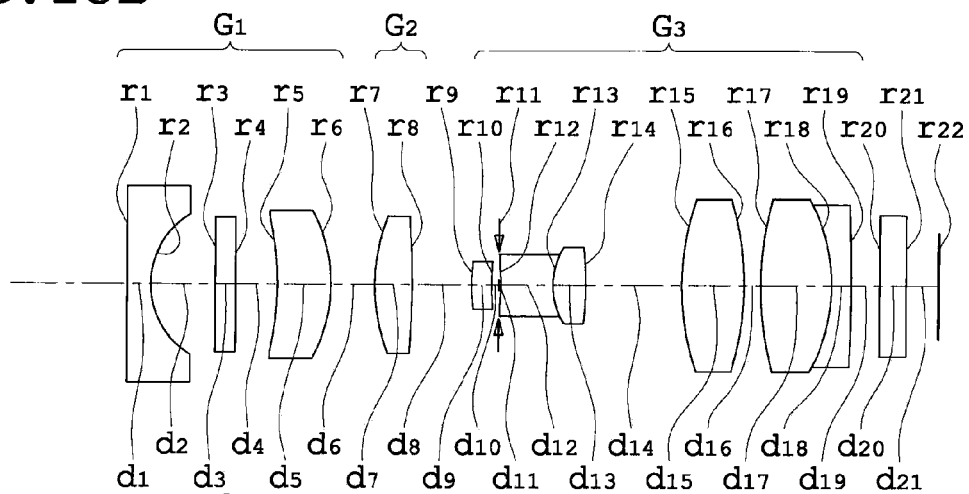
Figure 13C:
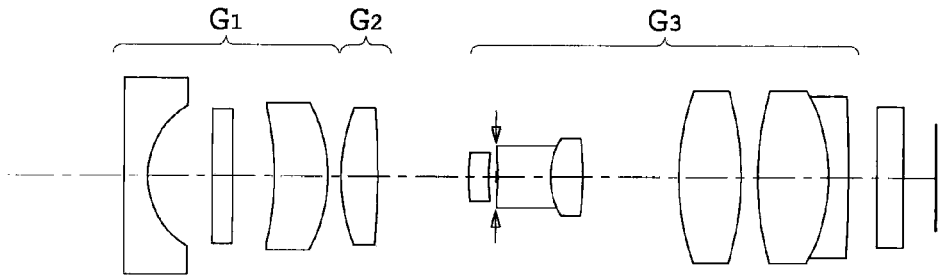

Besides, FIGS. 13A to 13C are sectional views showing a structure of optical systems provided for this observation apparatus according to an Embodiment 7 and directions in which the optical systems move respectively, taken along with the optical axis, FIG. 13A is a sectional view showing the normal observation state of the optical systems, FIG. 13B is a sectional view showing the middle observation state of the optical systems, and FIG. 13C is a sectional view showing the close-up observation state of the optical systems. FIGS. 14A to 14L are aberration diagrams showing spherical aberration, astigmatism, distortion, and chromatic aberration of magnification in the optical systems shown in FIGS. 13A to 13C, FIGS. 14A to 14D are aberration diagrams in the normal observation state of the optical systems, FIGS. 14E to 14H are aberration diagrams in the middle observation state of the optical systems, and FIGS. 14I to 14L are aberration diagrams in the close-up observation state of the optical systems.

As shown in FIGS. 13A to 13C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 13A to 13C. Besides, all of these components are arranged on the optical axis Lc.

The objective optical system OL consists of: a first lens group $G_1$ having negative power; a second lens group $G_2$ having positive power and capable of moving along the optical axis in changing magnification; and a third lens group $G_3$ having positive power, these lens groups being arranged in that order from the object side. Besides, the aperture stop S is arranged in the third lens group $G_3$.

The first lens group $G_1$ consists of: a lens $L_{11}$ that is a plano-concave lens which has negative power and the concave surface of which faces the image side; a lens $L_{12}$ that is a plano lens; and a lens $L_{13}$ that is a meniscus lens which has positive power and the convex surface of which faces the image side, these lenses being arranged in that order from the object side.

The second lens group $G_2$ consists of a lens $L_{21}$ that is a biconvex lens which has positive power.

The third lens group $G_3$ consists of: a lens $L_{31}$ that is a meniscus lens which has negative power and the concave surface of which faces the image side; a lens $L_{32}$ that is a biconcave lens which has negative power; a lens $L_{33}$ that is a biconvex lens which has positive power; a lens $L_{34}$ that is a biconvex lens which has positive power; a lens $L_{35}$ that is a biconvex lens which has positive power; and a lens $L_{36}$ that is a meniscus lens which has negative power and the convex surface of which faces the image side, these lenses being arranged in that order from the object side. Besides, the lens $L_{32}$ and the lens $L_{33}$ are joined to each other, and the lens $L_{35}$ and the lens $L_{36}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 7
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.230 | 1.00 | | |
| 3 | ∞ | 0.31 | 1.51400 | 73.43 |
| 4 | ∞ | 0.64 | | |
| 5 | −4.539 | 0.83 | 1.81600 | 46.62 |
| 6 | −2.328 | D6 | | |
| 7 | 2.832 | 0.57 | 1.58913 | 61.14 |
| 8 | −13.345 | D8 | | |
| 9 | 3.894 | 0.30 | 1.92286 | 18.90 |
| 10 | 3.265 | 0.11 | | |
| 11 (Stop surface) | ∞ | 0.03 | | |
| 12 | −2.862 | 0.80 | 1.59270 | 35.31 |
| 13 | 1.100 | 0.50 | 1.48749 | 70.23 |
| 14 | −5.306 | 1.47 | | |
| 15 | 4.016 | 0.96 | 1.58913 | 61.14 |
| 16 | −4.368 | 0.25 | | |
| 17 | 4.818 | 1.09 | 1.88300 | 40.76 |
| 18 | −2.669 | 0.30 | 1.92286 | 18.90 |
| 19 | −27.226 | 0.43 | | |
| 20 | ∞ | 0.40 | 1.52300 | 58.50 |
| 21 | ∞ | 0.50 | | |
| 22 (Image plane) | ∞ | | | |

Various data on objective optical system
Zoom ratio: 1.55

| Observation state | Normal observation | Middle | Close-up observation |
|---|---|---|---|
| Focal length | 0.93 | 1.18 | 1.44 |
| F NUMBER | 7.51 | 7.76 | 8.00 |

-continued

Numerical Data 7
Unit: mm

| | Normal observation | Middle | Close-up observation |
|---|---|---|---|
| Angle of view (2ω) | 124.67 | 92.77 | 76.42 |
| Image height | 0.80 | 0.80 | 0.80 |
| Total length of lens (in air) | 12.24 | 11.98 | 11.72 |
| BF (in air) | 1.15 | 0.89 | 0.62 |

Surface distance

| Observation state | Normal observation | Middle | Close-up observation |
|---|---|---|---|
| D6 | 1.35 | 0.67 | 0.20 |
| D8 | 0.24 | 0.92 | 1.39 |

Data on lens group

| Group | The first surface of lens group | Focal length |
|---|---|---|
| 1 | 1 | −7.15 |
| 2 | 7 | 4.02 |
| 3 | 9 | 2.01 |

Data on conditions

Condition (1): $1.24 < |F_{1f}/F_n| < 1.8$: −1.499
Condition (2): $0.8 < |F_{1f}/F_c| < 1.7$: −0.9652
Condition (3): $0.7 < |\theta_c/\theta_n| < 1.5$: 1.00
Condition (4): $\omega_{nP}/\omega_{nMax} < 0.7$: 0.6533
Condition (5): $-3 < (r_{3lf} + r_{3lb})/(r_{3lf} - r_{3lb}) < 2$: −1.21
Condition (6): $|ADT_n| < 8$: − 3.215
Condition (7): $0.2 < |(1 - \beta_{c2} \cdot \beta_{c2}) \times \beta_{c3} \cdot \beta_{c3}| < 1.2$: 0.203
Condition (8): $0.9 < Fno_n/Fno_c$: 0.939

Embodiment 8

An observation apparatus provided with an objective lens according to an Embodiment 8 is explained in detail using FIGS. 15A to 15C and 16A to 16L, below.

Figure 15A:
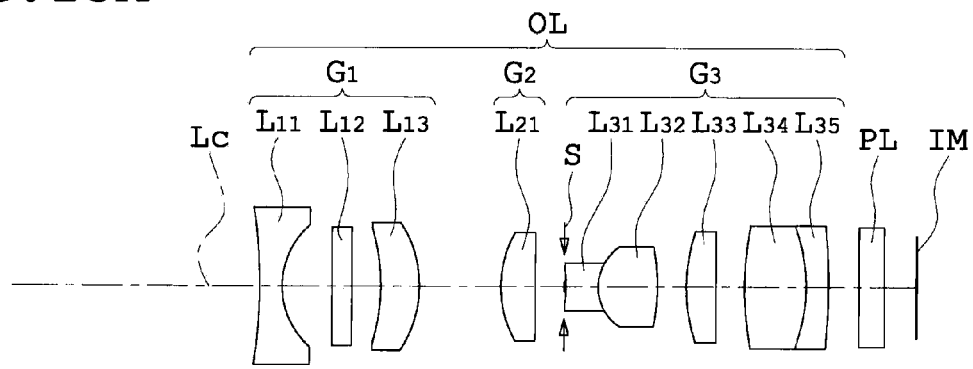
FIGS. 15A to 15C are sectional views showing a structure of optical systems provided for an observation apparatus according to an Embodiment 8 and directions in which the optical systems move respectively, taken along with the optical axis.
Figure 15B:
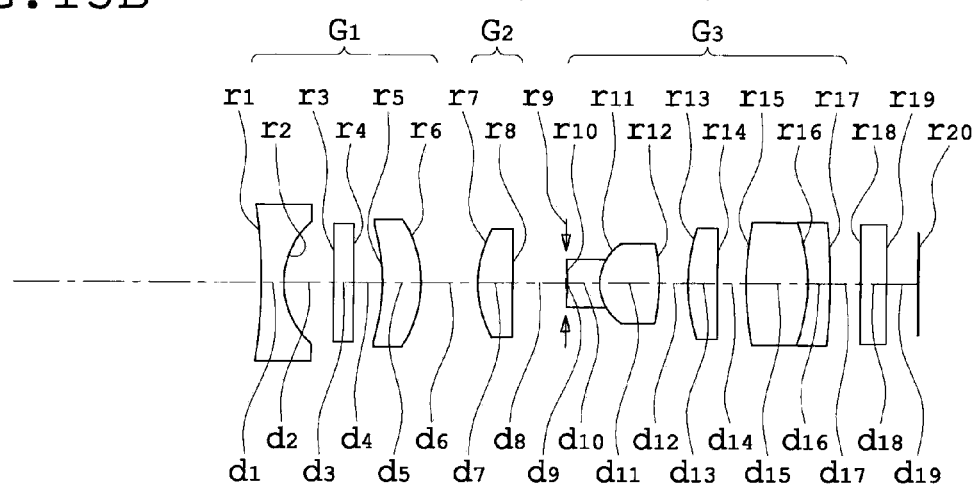
Figure 15C:
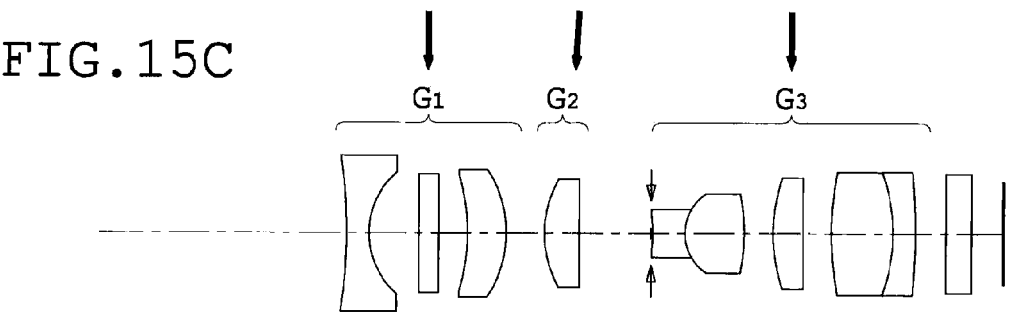

Besides, FIGS. 15A to 15C are sectional views showing a structure of optical systems provided for this observation apparatus according to an Embodiment 8 and directions in which the optical systems move respectively, taken along with the optical axis, FIG. 15A is a sectional view showing the normal observation state of the optical systems, FIG. 15B is a sectional view showing the middle observation state of the optical systems, and FIG. 15C is a sectional view showing the close-up observation state of the optical systems. FIGS. 16A to 16L are aberration diagrams showing spherical aberration, astigmatism, distortion, and chromatic aberration of magnification in the optical systems shown in FIGS. 15A to 15C, FIGS. 16A to 16D are aberration diagrams in the normal observation state of the optical systems, FIGS. 16E to 16H are aberration diagrams in the middle observation state of the optical systems, and FIGS. 16I to 16H are aberration diagrams in the close-up observation state of the optical systems.

As shown in FIGS. 15A to 15C, this observation apparatus includes: an objective optical system OL; a plano lens optical system PL which is arranged on the image side of the objective optical system OL and substantially has no refractive power; an aperture stop S arranged in the objective optical system OL; and an image pickup element like CCD, only the image plane IM of the image pickup element being shown in FIGS. 15A to 15C. Besides, all of these components are arranged on the optical axis Lc.

The objective optical system OL consists of: a first lens group $G_1$ having negative power; a second lens group $G_2$ having positive power and capable of moving along the optical axis in changing magnification; a third lens group $G_3$ having positive power, these lens groups being arranged in that order from the object side. Besides, the aperture stop S is arranged between the third lens group $G_2$ and the fourth lens group $G_3$.

The first lens group $G_1$ consists of: a lens $L_{11}$ that is a biconcave lens which has negative power; a lens $L_{12}$ that is a plano lens; and a lens $L_{13}$ that is a meniscus lens which has positive power and the convex surface of which faces the image side, these lenses being arranged in that order from the object side.

The second lens group $G_2$ consists of a lens $L_{21}$ that is a biconvex lens which has positive power.

The third lens group $G_3$ consists of: a lens $L_{31}$ that is a biconcave lens which has negative power; a lens $L_{32}$ that is a biconvex lens which has positive power; a lens $L_{33}$ that is a meniscus lens which has positive power and the concave surface of which faces the image side; a lens $L_{34}$ that is a biconvex lens which has positive power; and a lens $L_{35}$ that is a meniscus lens which has negative power and the convex surface of which faces the image side, these lenses being arranged in that order from the object side. Besides, the lens $L_{31}$ and the lens $L_{32}$ are joined to each other, and the lens $L_{34}$ and the lens $L_{35}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 8
Unit: mm

Surface Data

| Surface No. s | Radius of curvature r | Surface distance d | Refractive index nd | Abbe's number vd |
|---|---|---|---|---|
| 1 | −8.111 | 0.36 | 1.88300 | 40.76 |
| 2 | 1.258 | 0.78 | | |
| 3 | ∞ | 0.31 | 1.51400 | 73.43 |
| 4 | ∞ | 0.46 | | |
| 5 | −3.124 | 0.60 | 1.81600 | 46.62 |
| 6 | −1.836 | D6 | | |
| 7 | 1.719 | 0.55 | 1.58913 | 61.14 |
| 8 | −114.439 | D8 | | |
| 9 (Stop surface) | ∞ | 0.03 | | |
| 10 | −1.792 | 0.50 | 1.59270 | 35.31 |
| 11 | 0.744 | 0.94 | 1.48749 | 70.23 |
| 12 | −2.973 | 0.45 | | |
| 13 | 2.762 | 0.47 | 1.58913 | 61.14 |
| 14 | 138.170 | 0.45 | | |
| 15 | 5.220 | 0.97 | 1.88300 | 40.76 |
| 16 | −2.636 | 0.35 | 1.92286 | 18.90 |
| 17 | −9.384 | 0.47 | | |
| 18 | ∞ | 0.40 | 1.52300 | 58.50 |
| 19 | ∞ | 0.50 | | |
| 20 (Image plane) | ∞ | | | |

Numerical Data 8
Unit: mm

Various data on objective optical system
Zoom ratio: 1.33

| Observation state | Normal observation | Middle | Close-up observation |
|---|---|---|---|
| Focal length | 0.95 | 1.12 | 1.26 |
| F NUMBER | 8.20 | 8.09 | 8.00 |
| Angle of view (2ω) | 121.38 | 92.43 | 78.15 |
| Image height | 0.80 | 0.80 | 0.80 |
| Total length of lens (in air) | 10.13 | 9.88 | 9.68 |
| BF (in air) | 1.18 | 0.93 | 0.72 |

Surface distance

| Observation state | Normal observation | Middle | Close-up observation |
|---|---|---|---|
| D6 | 1.29 | 0.89 | 0.62 |
| D8 | 0.45 | 0.85 | 1.12 |

Data on lens group

| Group | The first surface of lens group | Focal length |
|---|---|---|
| 1 | 1 | −4.70 |
| 2 | 7 | 2.88 |
| 3 | 10 | 2.39 |

Data on conditions

Condition (1): $1.24 < |F_1/F_n| < 1.8$: −1.278
Condition (2): $0.8 < |F_1/F_c| < 1.7$: −0.9608
Condition (3): $0.7 < |\theta_c/\theta_n| < 1.5$: 0.999
Condition (4): $\omega_{nP}/\omega_{nMax} < 0.7$: −0.661
Condition (5): $-3 < (r_{3lf} + r_{3lb})/(r_{3lf} - r_{3lb}) < 2$: −1.78
Condition (6): $|ADT_n| < 8$: −3.927
Condition (7): $0.2 < |(1 - \beta_{c2} \cdot \beta_{c2}) \times \beta_{c3} \cdot \beta_{c3}| < 1.2$: 0.399
Condition (8): $0.9 < Fno_n/Fno_c$: 1.02

Embodiment 9

An observation apparatus provided with an objective lens according to an Embodiment 9 is explained in detail using FIGS. 17A to 17C and 18A to 18L, below.

Figure 17A:
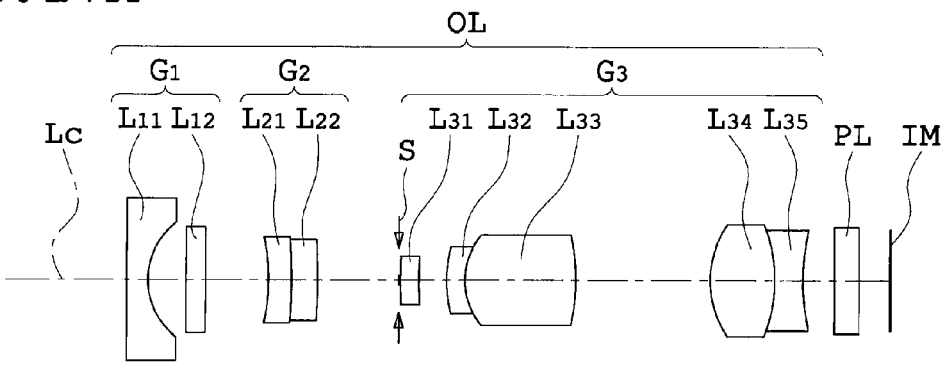
FIGS. 17A to 17C are sectional views showing a structure of optical systems provided for an observation apparatus according to an Embodiment 9 and directions in which the optical systems move respectively, taken along with the optical axis.
Figure 17B:
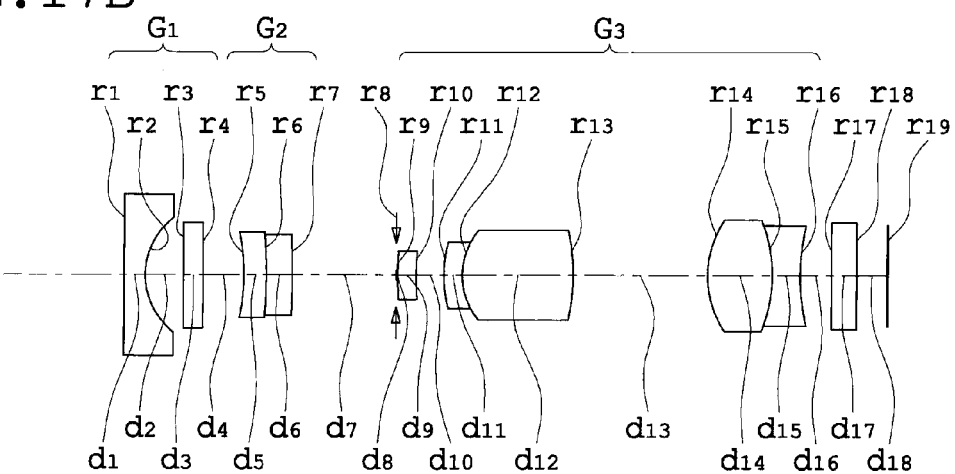
Figure 17C:
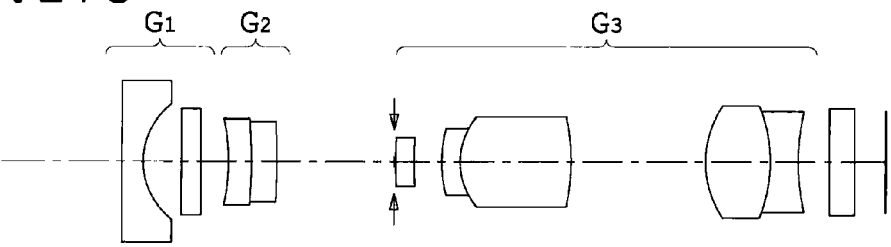
Figures 18A, 18B, 18C, 18D:
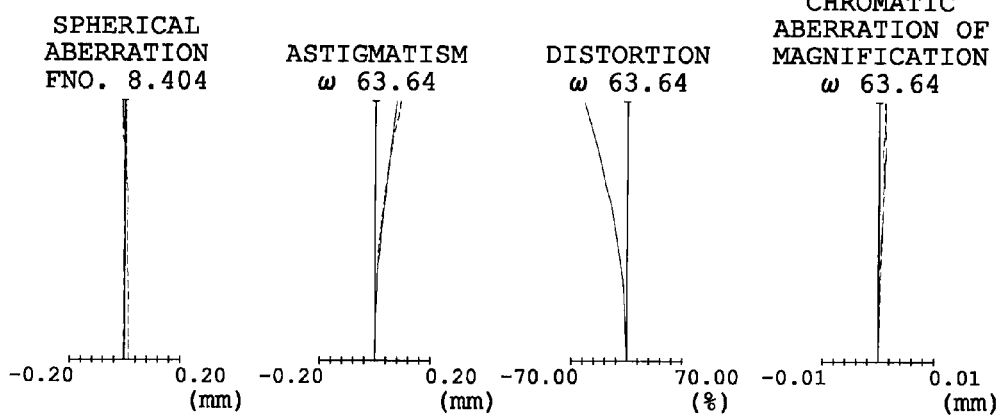
FIGS. 18A to 18L are aberration diagrams showing spherical aberration, astigmatism, distortion, and chromatic aberration of magnification in the optical systems shown in FIGS. 17A to 17C, FIGS. 18A to 18D are aberration diagrams in the normal observation state of the optical systems.
Figures 18E, 18F, 18G, 18H:
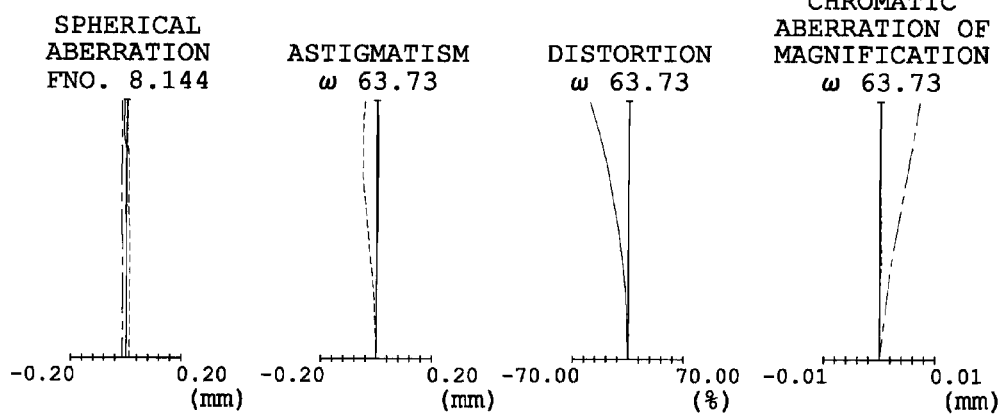
Figures 18I, 18J, 18K, 18L:
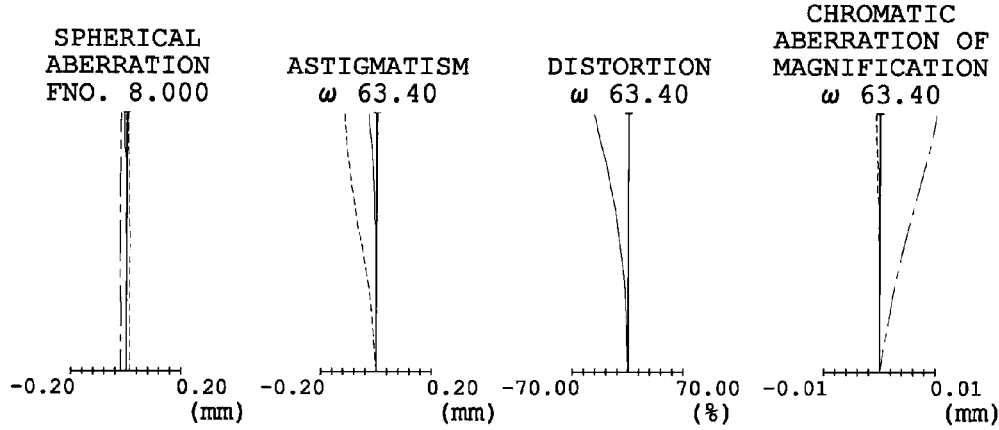

Besides, FIGS. 17A to 17C are sectional views showing a structure of optical systems provided for this observation apparatus according to an Embodiment 9 and directions in which the optical systems move respectively, taken along with the optical axis, FIG. 17A is a sectional view showing the normal observation state of the optical systems, FIG. 17B is a sectional view showing the middle observation state of the optical systems, and FIG. 17C is a sectional view showing the close-up observation state of the optical systems. FIGS. 18A to 18L are aberration diagrams showing spherical aberration, astigmatism, distortion, and chromatic aberration of magnification in the optical systems shown in FIGS. 17A to 17C, FIGS. 18A to 18D are aberration diagrams in the normal observation state of the optical systems, FIGS. 18E to 18H are aberration diagrams in the middle observation state of the optical systems, and FIGS. 18I to 18L are aberration diagrams in the close-up observation state of the optical systems.

As shown in FIGS. 17A to 17C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 17A to 17C. Besides, all of these components are arranged on the optical axis Lc.

The objective optical system OL consists of: a first lens group $G_1$ having negative power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a plano-concave negative lens $L_{11}$ the concave surface of which faces the image side; and a plano lens $L_{12}$, these lenses being arranged in that order from the object side.

The second lens group $G_2$ consists of: a negative meniscus lens $L_{21}$ the convex surface of which faces the image side; and a negative meniscus lens $L_{22}$ the convex surface of which faces the image side, these lenses being arranged in that order from the object side. Besides, the negative meniscus lens $L_{21}$ and the negative meniscus lens $L_{22}$ are jointed to each other.

The third lens group $G_3$ consists of: a positive meniscus lens $L_{31}$ the convex surface of which faces the object side; a negative meniscus lens $L_{32}$ the convex surface of which faces the object side, a positive biconvex lens $L_{33}$; a positive biconvex lens $L_{34}$; and a negative biconcave lens $L_{35}$, these lenses being arranged in that order from the object side. Besides, the negative meniscus lens $L_{32}$ and the positive biconvex lens $L_{33}$ are joined to each other. Also, the positive biconvex lens $L_{34}$ and the negative biconcave lens $L_{35}$ are joined to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 9
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.150 | 0.64 | | |
| 3 | ∞ | 0.31 | 1.51400 | 73.43 |
| 4 | ∞ | D4 | | |
| 5 | −3.393 | 0.38 | 1.48749 | 70.23 |
| 6 | −11.131 | 0.42 | 1.92286 | 18.90 |
| 7 | −16.191 | D7 | | |
| 8 (Stop surface) | ∞ | 0.03 | | |
| 9 | 8.463 | 0.30 | 1.69895 | 30.13 |
| 10 | 9.477 | 0.45 | | |
| 11 | 2.400 | 0.30 | 1.92286 | 18.90 |
| 12 | 1.155 | 1.80 | 1.69895 | 30.13 |
| 13 | −3.708 | 2.19 | | |
| 14 | 1.604 | 1.05 | 1.48749 | 70.23 |
| 15 | −2.464 | 0.46 | 1.92286 | 18.90 |
| 16 | 3.441 | 0.50 | | |
| 17 | ∞ | 0.40 | 1.52300 | 58.50 |
| 18 | ∞ | 0.50 | | |
| 19 (Image plane) | ∞ | | | |

Various data on objective optical system
Zoom ratio: 0.94

| Observation state | Normal observation | Middle | Close-up observation |
|---|---|---|---|
| Focal length | 0.90 | 0.86 | 0.85 |
| F NUMBER | 8.40 | 8.14 | 8.00 |
| Angle of view (2ω) | 127.27 | 127.46 | 126.81 |
| Image height | 0.80 | 0.80 | 0.80 |
| Total length of lens (in air) | 12.27 | 12.13 | 12.06 |
| BF (in air) | 1.23 | 1.09 | 1.02 |

Surface distance

| Observation state | Normal observation | Middle | Close-up observation |
|---|---|---|---|
| D4 | 1.04 | 0.68 | 0.45 |
| D7 | 1.32 | 1.68 | 1.91 |

Data on lens group

| Group | The first surface of lens group | Focal length |
|---|---|---|
| 1 | 1 | −1.30 |
| 2 | 5 | −8.14 |
| 3 | 8 | 2.11 |

Data on conditions

Condition (1): $1.24 < |F_1/F_n| < 1.8$: −1.453
Condition (2): $0.8 < |F_1/F_c| < 1.7$: −1.536
Condition (3): $0.7 < |\theta_c/\theta_n| < 1.5$: 0.999
Condition (4): $\omega_{nP}/\omega_{nMax} < 0.7$: −0.656
Condition (5): $-3 < (r_{3lf} + r_{3lb})/(r_{3lf} - r_{3lb}) < 2$: −0.165
Condition (6): $|ADT_n| < 8$: −1.802
Condition (7): $0.2 < |(1 - \beta_{c2} \cdot \beta_{c2}) \times \beta_{c3} \cdot \beta_{c3}| < 1.2$: 0.328
Condition (8): $0.9 < Fno_n/Fno_c$: 1.051

Embodiment 10

An observation apparatus provided with an objective lens according to an Embodiment 10 is explained in detail using FIGS. 19A to 19C and 20A to 20L, below.

Figure 19A:
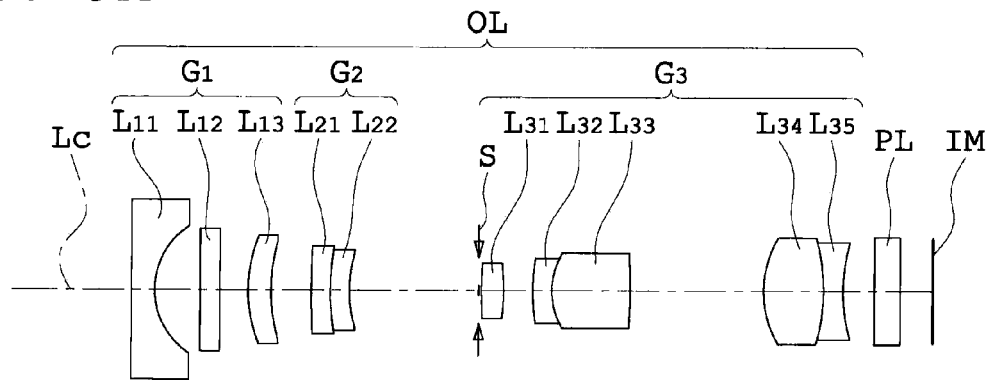
FIGS. 19A to 19C are sectional views showing a structure of optical systems provided for an observation apparatus according to an Embodiment 10 and directions in which the optical systems move respectively, taken along with the optical axis.
Figure 19B:
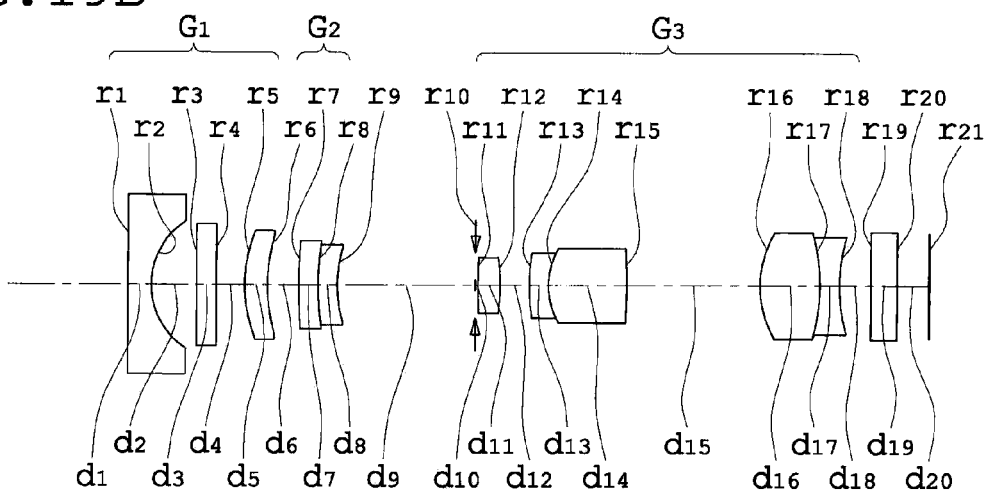
Figure 19C:
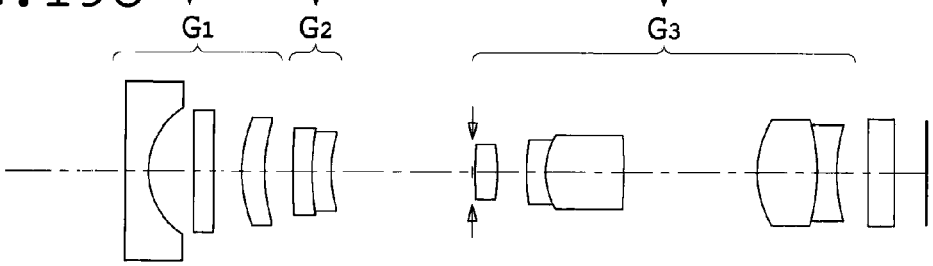

Besides, FIGS. 19A to 19C are sectional views showing a structure of optical systems provided for this observation apparatus according to an Embodiment 10 and directions in which the optical systems move respectively, taken along with the optical axis, FIG. 19A is a sectional view showing the normal observation state of the optical systems, FIG. 19B is a sectional view showing the middle observation state of the optical systems, and FIG. 19C is a sectional view showing the close-up observation state of the optical systems. FIGS. 20A to 20L are aberration diagrams showing spherical aberration, astigmatism, distortion, and chromatic aberration of magnification in the optical systems shown in FIGS. 19A to 19C, FIGS. 20A to 20D are aberration diagrams in the normal observation state of the optical systems, FIGS. 20E to 20H are aberration diagrams in the middle observation state of the optical systems, and FIGS. 20I to 20L are aberration diagrams in the close-up observation state of the optical systems.

As shown in FIGS. 19A to 19C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 19A to 19C. Besides, all of these components are arranged on the optical axis Lc.

The objective optical system OL consists of: a first lens group $G_1$ having negative power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens that is a negative plano-concave lens $L_{11}$ the concave surface of which faces the image side; a plano lens $L_{12}$; and a positive meniscus lens $L_{13}$ the convex surface of which faces the object side, these lenses being arranged in that order from the object side.

The second lens group $G_2$ consists of: a negative meniscus lens $L_{21}$ the convex surface of which faces the object side; and a negative meniscus lens $L_{22}$ the convex surface of which faces the object side, these lenses being arranged in that order from the object side. Besides, the negative meniscus lens $L_{21}$ and the negative meniscus lens $L_{22}$ are jointed to each other.

The third lens group $G_3$ consists of: a positive biconvex lens $L_{31}$; a lens that is a negative meniscus lens $L_{32}$ the convex surface of which faces the object side; a positive biconvex lens $L_{33}$; a positive biconvex lens $L_{34}$; and a negative biconcave lens $L_{35}$, these lenses being arranged in that order from the object side. Besides, the negative meniscus lens $L_{32}$ and the positive biconvex lens $L_{33}$ are jointed to each other. Also, the positive biconvex lens $L_{34}$ and the negative biconcave lens $L_{35}$ are jointed to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop stay immovable in this change in magnification.

Next, numerical data on the optical systems provided for this observation apparatus is shown.

Numerical Data 10
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.170 | 0.72 | | |
| 3 | ∞ | 0.31 | 1.51400 | 73.43 |
| 4 | ∞ | 0.45 | | |
| 5 | 2.297 | 0.36 | 1.80400 | 46.57 |
| 6 | 3.138 | D6 | | |
| 7 | 10.414 | 0.30 | 1.48749 | 70.23 |
| 8 | 3.897 | 0.03 | 1.92286 | 18.90 |
| 9 | 2.038 | D9 | | |
| 10 (Stop surface) | ∞ | 0.03 | | |
| 11 | 3.705 | 0.35 | 1.69895 | 30.13 |
| 12 | −4.842 | 0.45 | | |
| 13 | 3.989 | 0.30 | 1.92286 | 18.90 |
| 14 | 1.227 | 1.21 | 1.69895 | 30.13 |
| 15 | −23.098 | 2.09 | | |
| 16 | 1.565 | 0.94 | 1.48749 | 70.23 |
| 17 | −3.191 | 0.30 | 1.92286 | 18.90 |
| 18 | 2.996 | 0.47 | | |
| 19 | ∞ | 0.40 | 1.52300 | 58.50 |
| 20 | ∞ | 0.50 | | |
| 21 (Image plane) | ∞ | | | |

Various data on objective optical system
Zoom ratio: 0.98

| Observation state | Normal observation | Middle | Close-up observation |
|---|---|---|---|
| Focal length | 0.94 | 0.89 | 0.88 |
| F NUMBER | 8.48 | 8.10 | 8.00 |
| Angle of view (2ω) | 124.86 | 126.27 | 126.75 |
| Image height | 0.80 | 0.80 | 0.80 |
| Total length of lens (in air) | 12.31 | 12.15 | 12.11 |
| BF (in air) | 1.18 | 1.02 | 0.97 |

Surface distance

| Observation state | Normal observation | Middle | Close-up observation |
|---|---|---|---|
| D6 | 0.64 | 0.49 | 0.45 |
| D9 | 2.03 | 2.18 | 2.22 |

Data on lens group

| Group | The first surface of lens group | Focal length |
|---|---|---|
| 1 | 1 | −1.77 |
| 2 | 7 | −3.57 |
| 3 | 10 | 1.85 |

Data on conditions

Condition (1): $1.24 < |F_1/F_n| < 1.8$: −1.407
Condition (2): $0.8 < |F_1/F_c| < 1.7$: −1.513
Condition (3): $0.7 < |\theta_c/\theta_n| < 1.5$: 0.999
Condition (4): $\omega_{nP}/\omega_{nMax} < 0.7$: −0.646
Condition (5): $-3 < (r_{3lf} + r_{3lb})/(r_{3lf} - r_{3lb}) < 2$: 0.032
Condition (6): $|\Delta DT_n| < 8$: −0.690
Condition (7): $0.2 < |(1 - \beta_{c2} \cdot \beta_{c2}) \times \beta_{c3} \cdot \beta_{c3}| < 1.2$: 1.223
Condition (8): $0.9 < Fno_n/Fno_c$: 1.060

Embodiment 11

Figure 21A:
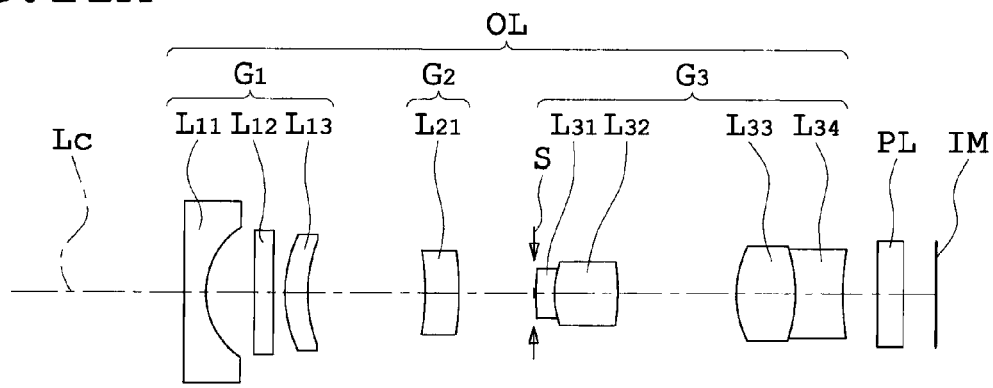
FIGS. 21A to 21C are sectional views showing a structure of optical systems provided for an observation apparatus according to an Embodiment 11 and directions in which the optical systems move respectively, taken along with the optical axis.
Figure 21B:
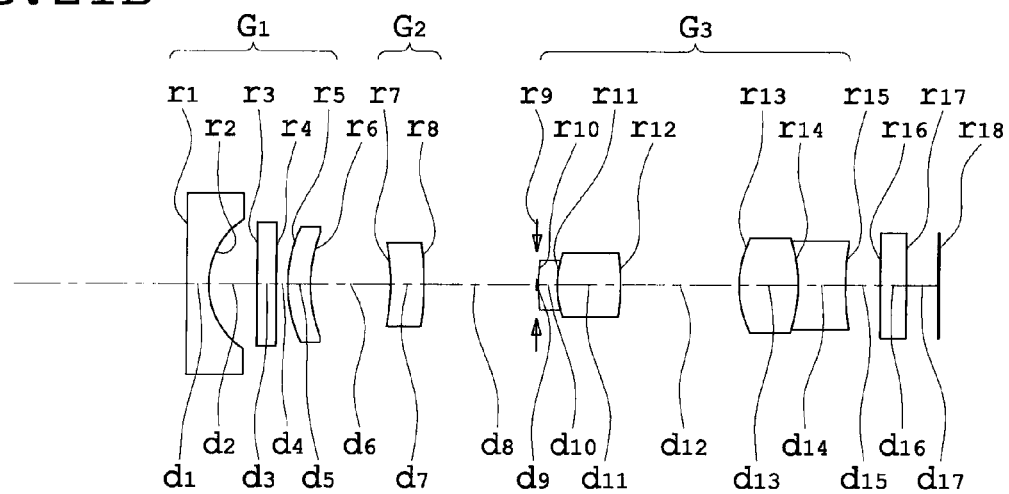
Figure 21C:
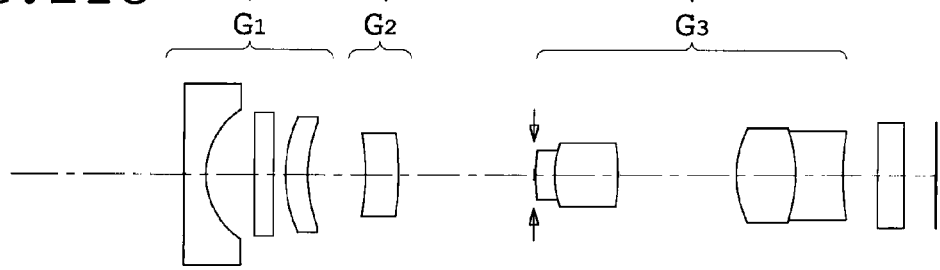

An observation apparatus provided with an objective lens according to an Embodiment 11 is explained in detail using FIGS. 21A to 21C and 22A to 22L, below. Besides, FIGS. 21A to 21C are sectional views showing a structure of optical systems provided for this observation apparatus according to an Embodiment 11 and directions in which the optical systems move respectively, taken along with the optical axis, FIG. 21A is a sectional view showing the normal observation state of the optical system, FIG. 21B is a sectional view showing the middle observation state of the optical systems, and FIG. 21C is a sectional view showing the close-up observation state of the optical systems. FIGS. 22A to 22L are aberration diagrams showing spherical aberration, astigmatism, distortion, and chromatic aberration of magnification in the optical systems shown in FIGS. 21A to 21C, FIGS. 22A to 22D are aberration diagrams in the normal observation state of the optical systems, FIGS. 22E to 22H are aberration diagrams in the middle observation state of the optical systems, and FIGS. 22I to 22L are aberration diagrams in the close-up observation state of the optical systems.

As shown in FIGS. 21A to 21C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 21A to 21C. Besides, all of these components are arranged on the optical axis Lc.

The objective optical system OL consists of a first lens group $G_1$ having negative power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a negative plano-concave lens the concave surface of which faces the image side; a lens $L_{12}$ that is a plano lens; and a lens $L_{13}$ that is a positive meniscus lens the convex surface of which faces the objective side, these lenses being arranged in that order from the object side.

The second lens group $G_2$ consists of: a lens $L_{21}$ that is a negative meniscus lens the convex surface of which faces the image side.

The third lens group $G_3$ consists of: a lens $L_{31}$ that is a negative meniscus lens the convex surface of which faces the object side; a lens $L_{32}$ that is a positive biconvex lens; a lens $L_{33}$ that is a positive biconvex lens; and a lens $L_{34}$ that is a negative biconcave lens, these lenses being arranged in that order from the object side. Besides, the negative meniscus lens $L_{31}$ and the positive biconvex lens $L_{32}$ are jointed to each other. Also, the positive biconvex lens $L_{33}$ and the negative concave lens $L_{34}$ are jointed to each other.

And, this observation apparatus is configured in such a way that movement of the second lens group $G_2$ to the object side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 11
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.193 | 0.77 | | |
| 3 | ∞ | 0.31 | 1.51400 | 73.43 |
| 4 | ∞ | 0.20 | | |
| 5 | 2.098 | 0.34 | 1.88300 | 40.76 |
| 6 | 2.235 | D6 | | |
| 7 | −3.023 | 0.53 | 1.69895 | 30.13 |
| 8 | −4.742 | D8 | | |
| 9 (Stop surface) | ∞ | 0.03 | | |
| 10 | 2.565 | 0.30 | 1.92286 | 18.90 |
| 11 | 1.490 | 1.00 | 1.64769 | 33.79 |
| 12 | −3.277 | 1.89 | | |
| 13 | 1.660 | 0.94 | 1.48749 | 70.23 |
| 14 | −2.547 | 0.75 | 1.92286 | 18.90 |
| 15 | 3.677 | 0.55 | | |
| 16 | ∞ | 0.40 | 1.52300 | 58.50 |
| 17 | ∞ | 0.50 | | |
| 18 (Image plane) | ∞ | | | |

Various data on objective optical system
Zoom ratio: 0.94

| Observation state | Normal observation | Middle | Close-up observation |
|---|---|---|---|
| Focal length | 0.94 | 0.90 | 0.88 |
| F NUMBER | 8.53 | 8.16 | 8.00 |
| Angle of view (2ω) | 124.77 | 125.39 | 124.74 |
| Image height | 0.80 | 0.80 | 0.80 |
| Total length of lens (in air) | 11.69 | 11.54 | 11.48 |
| BF (in air) | 1.26 | 1.12 | 1.05 |

Surface distance

| Observation state | Normal observation | Middle | Close-up observation |
|---|---|---|---|
| D6 | 1.87 | 1.26 | 0.93 |
| D8 | 1.17 | 1.78 | 2.11 |

Data on lens group

| Group | The first surface of lens group | Focal length |
|---|---|---|
| 1 | 1 | −1.45 |
| 2 | 7 | −13.65 |
| 3 | 9 | 2.11 |

Data on conditions

Condition (1): $1.24 < |F_1/F_n| < 1.8$: −1.434
Condition (2): $0.8 < |F_1/F_c| < 1.7$: −1.541
Condition (3): $0.7 < |\theta_c/\theta_n| < 1.5$: 0.999
Condition (4): $\omega_{nP}/\omega_{nMax} < 0.7$: −0.646
Condition (5): $-3 < (r_{3lf} + r_{3lb})/(r_{3lf} - r_{3lb}) < 2$: −0.182
Condition (6): $|\Delta DT_n| < 8$: −2.005
Condition (7): $0.2 < |(1 - \beta_{c2} \cdot \beta_{c2}) \times (\beta_{c3} \cdot \beta_{c3})| < 1.2$: 0.206
Condition (8): $0.9 < Fno_n/Fno_c$: 1.066

Embodiment 12

An observation apparatus provided with an objective lens according to an Embodiment 12 is explained in detail using FIGS. 23A to 23C and 24A to 24L, below.

Figure 23A:
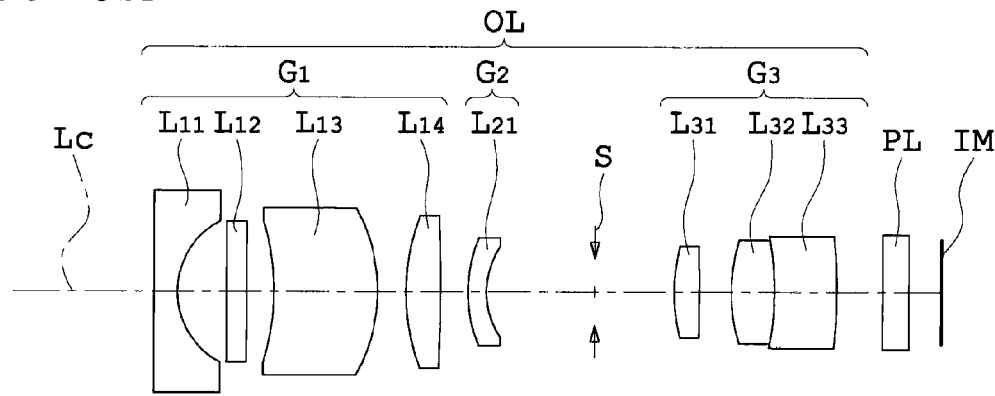
FIGS. 23A to 23C are sectional views showing a structure of optical systems provided for an observation apparatus according to an Embodiment 12 and directions in which the optical systems move respectively, taken along with the optical axis.
Figure 23B:
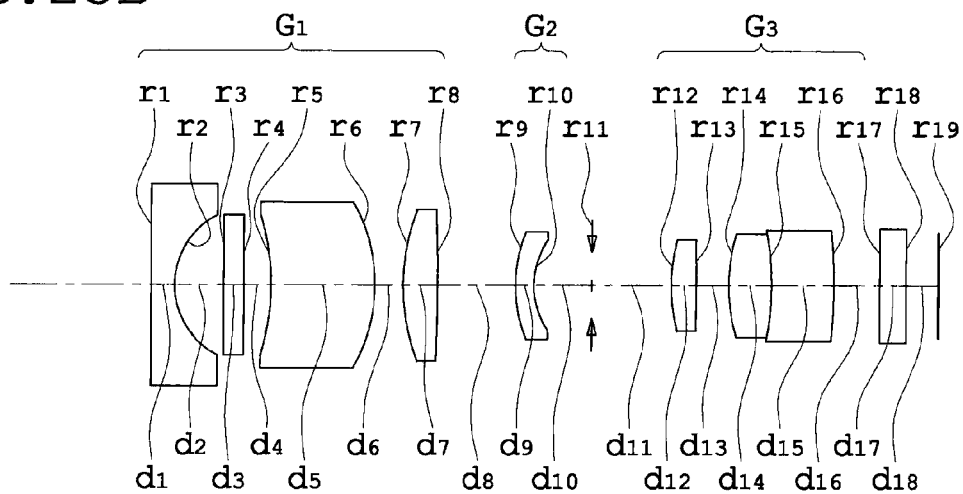
Figure 23C:
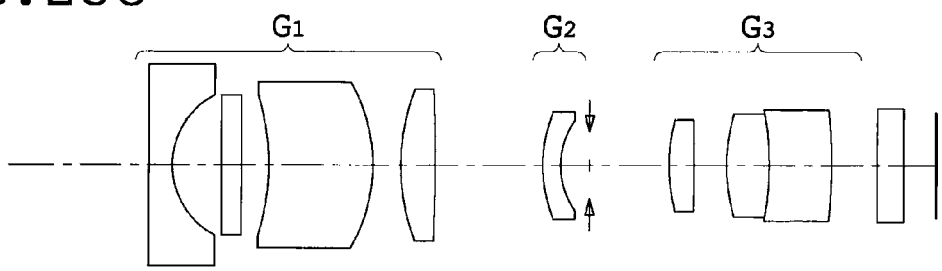
Figures 24A, 24B, 24C, 24D:
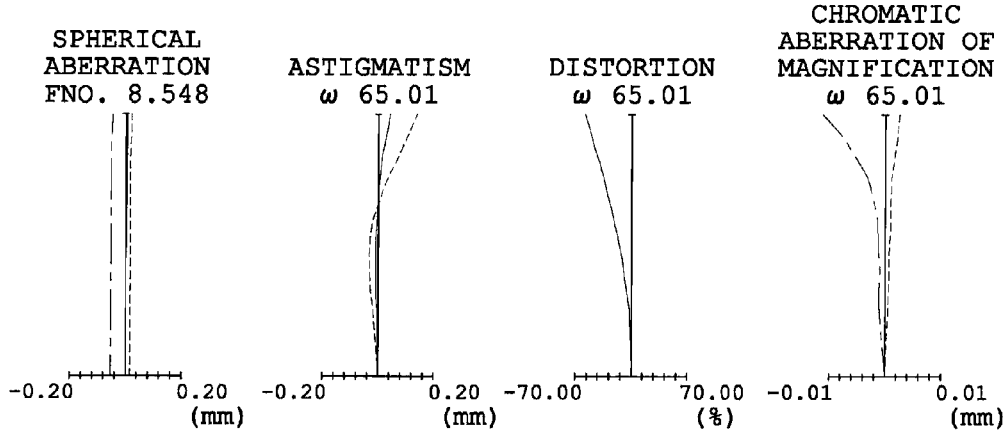
FIGS. 24A to 24L are aberration diagrams showing spherical aberration, astigmatism, distortion, and chromatic aberration of magnification in the optical systems shown in FIGS. 23A to 23C, FIGS. 24A to 24D are aberration diagrams in the normal observation state of the optical systems.
Figures 24E, 24F, 24G, 24H:
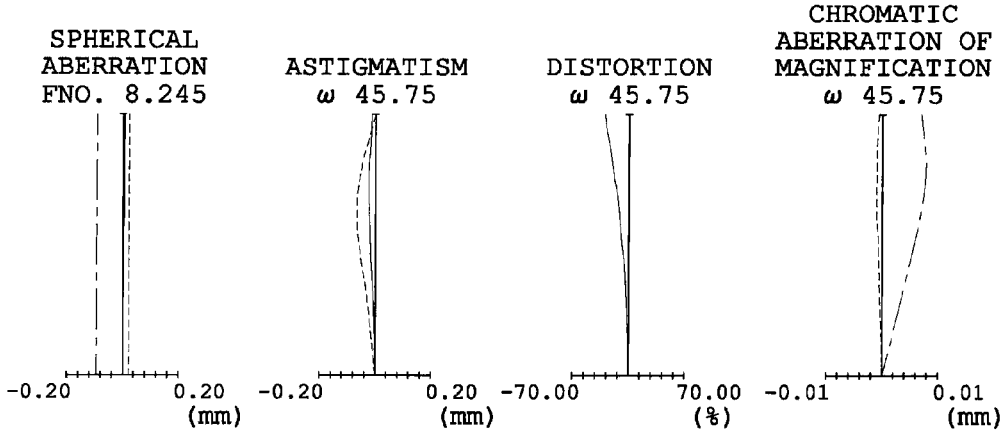
Figures 24I, 24J, 24K, 24L:
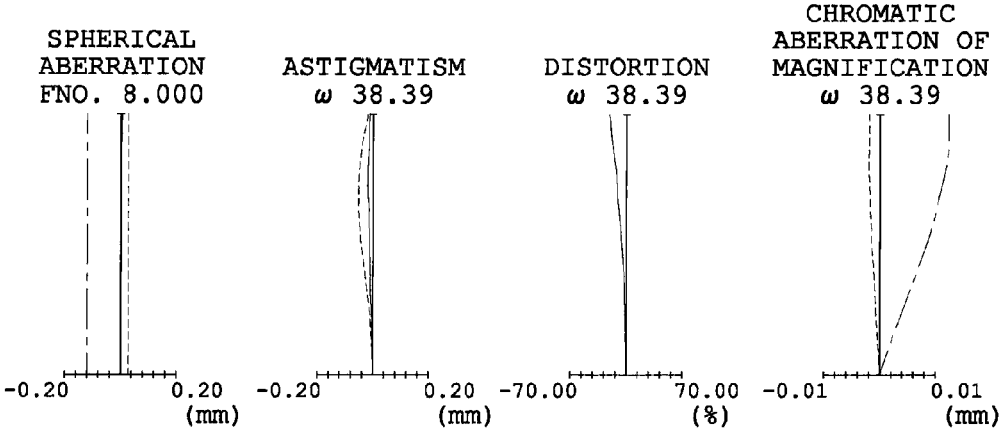

Besides, FIGS. 23A to 23C are sectional views showing a structure of optical systems provided for this observation apparatus according to an Embodiment 12 and directions in which the optical systems move respectively, taken along with the optical axis, FIG. 23A is a sectional view showing the normal observation state of the optical systems, FIG. 23B is a sectional view showing the middle observation state of the optical systems, and FIG. 23C is a sectional view showing the close-up observation state of the optical systems. FIGS. 24A to 24L are aberration diagrams showing spherical aberration, astigmatism, distortion, and chromatic aberration of magnification in the optical systems shown in FIGS. 23A to 23C, FIGS. 24A to 24D are aberration diagrams in the normal observation state of the optical system, FIGS. 24E to 24H are aberration diagrams in the middle observation state of the optical system, and FIGS.

24I to 24L are aberration diagrams in the close-up observation state of the optical systems.

As shown in FIGS. 23A to 23C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 23A to 23C. Besides, all of these components are arranged on the optical axis Lc.

The objective optical system OL consists of: a first lens group $G_1$ having positive power; a second lens group $G_2$ having negative power and capable of moving along the optical axis in changing magnification; a third lens group $G_3$ having positive power, these lens groups being arranged in that order from the object side. Besides, the aperture stop S is arranged in the third lens group $G_3$.

The first lens group $G_1$ consists of: a lens $L_{11}$ that is a negative plano-concave lens the concave surface of which faces the image side; a lens $L_{12}$ that is a plano lens; a lens $L_{13}$ that is a positive meniscus lens the convex surface of which faces the image side; and a lens $L_{14}$ that is a positive biconvex lens.

The second lens group $G_2$ consists of a lens $L_{21}$ that is a negative meniscus lens the convex surface of which faces the object side.

The third lens group $G_3$ consists of: a lens $L_{31}$ that is a positive biconvex lens; a lens $L_{32}$ that is a positive biconvex lens; and a lens $L_{33}$ that is a negative meniscus lens the convex surface of which faces the image side, these lenses being arranged in that order from the object side. Besides, the positive biconvex lens $L_{32}$ and the negative meniscus is lens $L_{33}$ are jointed to each other.

And, this observation apparatus is configured in such a way that movement of the second lens group $G_2$ to the image side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 12
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.228 | 0.79 | | |
| 3 | ∞ | 0.31 | 1.51400 | 73.43 |
| 4 | ∞ | 0.45 | | |
| 5 | −3.600 | 1.66 | 1.75500 | 52.32 |
| 6 | −2.753 | 0.45 | | |
| 7 | 3.617 | 0.55 | 1.88300 | 40.76 |
| 8 | −72.464 | D8 | | |
| 9 | 2.374 | 0.30 | 1.88300 | 40.76 |
| 10 | 1.323 | D10 | | |
| 11 (Stop surface) | ∞ | 1.24 | | |
| 12 | 2.908 | 0.41 | 1.71999 | 50.23 |
| 13 | −19.996 | 0.51 | | |
| 14 | 3.136 | 0.68 | 1.48749 | 70.23 |
| 15 | −4.487 | 1.00 | 1.92286 | 18.90 |
| 16 | −9.899 | 0.72 | | |
| 17 | ∞ | 0.40 | 1.52300 | 58.50 |
| 18 | ∞ | 0.50 | | |
| 19 (Image plane) | ∞ | | | |

Various data on objective optical system
Zoom ratio: 1.38

| Observation state | Normal observation | Middle | Close-up observation |
|---|---|---|---|
| Focal length | 0.95 | 1.18 | 1.31 |
| F NUMBER | 8.55 | 8.24 | 8.00 |
| Angle of view (2ω) | 130.01 | 91.50 | 76.77 |
| Image height | 0.80 | 0.80 | 0.80 |
| Total length of lens (in air) | 12.32 | 12.06 | 11.85 |
| BF(in air) | 1.45 | 1.18 | 0.97 |

Surface distance

| Observation state | Normal observation | Middle | Close-up observation |
|---|---|---|---|
| D8 | 0.45 | 1.25 | 1.72 |
| D10 | 1.72 | 0.92 | 0.45 |

Data on lens group

| Group | The first surface of lens group | Focal length |
|---|---|---|
| 1 | 1 | 1.84 |
| 2 | 9 | −3.91 |
| 3 | 11 | 2.59 |

Data on conditions

Condition (1): $1.24 < |F_1/F_n| < 1.8$: −1.460
Condition (2): $0.8 < |F_1/F_c| < 1.7$: −1.065
Condition (3): $0.7 < |\theta_c/\theta_n| < 1.5$: 0.999
Condition (4): $\omega_{nP}/\omega_{nMax} < 0.7$: −0.616
Condition (5): $-3 < (r_{3lf} + r_{3lb})/(r_{3lf} - r_{3lb}) < 2$: −2.658
Condition (6): $|\Delta DT_n| < 8$: −4.540
Condition (7): $0.2 < |(1 - \beta_{c2} \cdot \beta_{c2}) \times \beta_{c3} \cdot \beta_{c3}| < 1.2$: −0.267
Condition (8): $0.9 < Fno_n/Fno_c$: 1.069

Embodiment 13

An observation apparatus provided with an objective lens according to an Embodiment 13 is explained in detail using FIGS. 25A to 25C and 26A to 26L, below.

Figure 25A:
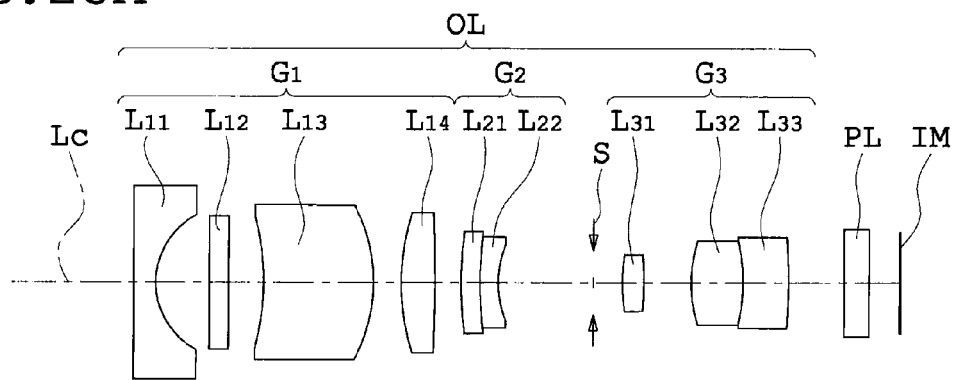
FIGS. 25A to 25C are sectional views showing a structure of optical systems provided for an observation apparatus according to an Embodiment 13 and directions in which the optical systems move respectively, taken along with the optical axis.
Figure 25B:
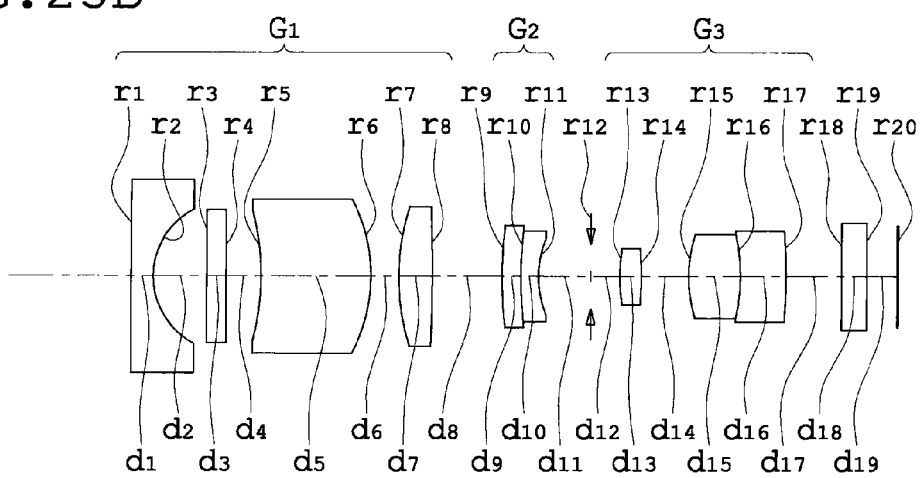
Figure 25C:
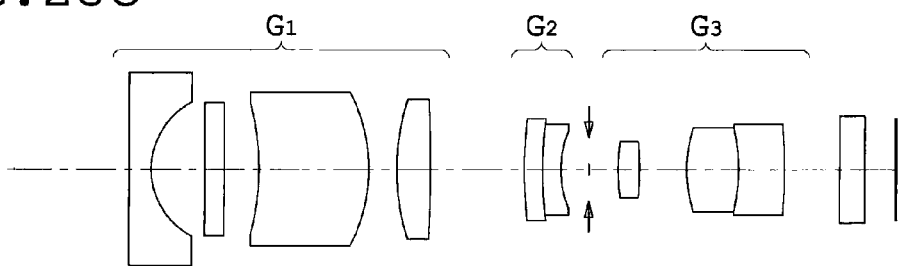

Besides, FIGS. 25A to 25C are sectional views showing a structure of optical systems provided for this observation apparatus according to an Embodiment 13 and directions in which the optical systems move respectively, taken along with the optical axis, FIG. 25A is a sectional view showing the normal observation state of the optical systems, FIG. 25B is a sectional view showing the middle observation state of the optical systems, and FIG. 25C is a sectional view showing the close-up observation state of the optical systems. FIGS. 26A to 26L are aberration diagrams showing spherical aberration, astigmatism, distortion, and chromatic aberration of magnification in the optical systems shown in FIGS. 25A to 25C, FIGS. 26A to 26D are aberration diagrams in the normal observation state of the optical systems, FIGS. 26E to 26H are aberration diagrams in the middle observation state of the optical systems, and FIGS. 26I to 26L are aberration diagrams in the close-up observation state of the optical systems.

As shown in FIGS. 25A to 25C, this observation apparatus includes: an objective optical system OL; a plano lens optical system PL which is arranged on the image side of the objective optical system OL and substantially has no refractive power; an aperture stop S which is arranged in the objective optical system OL; and an image pickup element like CCD, only the image plane IM of the image pickup element being shown in FIGS. 25A to 25C. Besides, all of these components are arranged on the optical axis Lc.

The objective optical system OL consists of a first lens group $G_1$ having positive power; a second lens group $G_2$ having negative power and capable of moving along the optical axis in changing magnification; and a third lens group $G_3$ having positive power, these lens groups being arranged in that order from the object side. Besides, the aperture stop S is arranged between the second lens group $G_2$ and the third lens group $G_3$.

The first lens group $G_1$ consists of: a lens $L_{11}$ that is a negative plano-concave lens the concave surface of which faces the image side; a lens $L_{12}$ that is a plano lens; a lens $L_{13}$ that is a positive meniscus lens the convex surface of which faces the image side; and a lens $L_{14}$ that is a positive biconvex lens, these lenses being arranged in that order from the object side.

The second lens group $G_2$ consists of: a lens $L_{21}$ that is a negative meniscus lens the convex surface of which faces the object side; and a lens $L_{22}$ that is a negative meniscus lens the convex surface of which faces the object side, these lenses being arranged in that order from the object side. Besides, the negative meniscus lens $L_{21}$ and the negative meniscus lens $L_{22}$ are jointed to each other.

The third lens group $G_3$ consists of: a lens $L_{31}$ that is a positive biconvex lens; a lens $L_{32}$ that is a positive biconvex lens; and a lens $L_{33}$ that is a negative meniscus lens the convex surface of which faces the image side; these lenses being arranged in that order from the object side. Besides, the positive biconvex lens $L_{32}$ and the negative meniscus lens $L_{33}$ are jointed to each other.

And, this observation apparatus is configured in such a way that movement of the second lens group $G_2$ to the image side along the optical axis can make an observation state of the objective optical system reversibly and continuously change from the normal observation state to the close-up observation state so as to be capable of changing magnification. Besides, the first lens group $G_1$, the third lens group $G_3$, and the aperture stop S stay immovable in this change in magnification.

Next, numerical data on the optical systems provided for this observation apparatus is shown.

Numerical Data 13
Unit: mm

Surface Data

| Surface No. s | Radius of curvature r | Surface distance d | Refractive index nd | Abbe's number vd |
|---|---|---|---|---|
| 1 | ∞ | 0.36 | 1.88300 | 40.76 |
| 2 | 1.192 | 0.89 | | |
| 3 | ∞ | 0.31 | 1.51400 | 73.43 |
| 4 | ∞ | 0.57 | | |
| 5 | −3.897 | 1.80 | 1.72916 | 54.68 |
| 6 | 2.754 | 0.45 | | |
| 7 | 3.633 | 0.54 | 1.78800 | 47.37 |
| 8 | −28.129 | D8 | | |
| 9 | 6.980 | 0.30 | 1.92286 | 18.90 |
| 10 | 6.037 | 0.130 | 1.78590 | 44.20 |
| 11 | 1.758 | D11 | | |
| 12 (Stop surface) | ∞ | 0.48 | | |
| 13 | 4.210 | 0.35 | 1.65160 | 58.55 |
| 14 | −5.197 | 0.77 | | |
| 15 | 2.728 | 0.84 | 1.51633 | 64.14 |
| 16 | −3.507 | 0.74 | 1.84666 | 23.78 |
| 17 | −14.269 | 0.90 | | |
| 18 | ∞ | 0.40 | 1.52300 | 58.50 |
| 19 | ∞ | 0.50 | | |
| 20 (Image plane) | | | | |

Various data on objective optical system
Zoom ratio: 1.35

| Observation state | Normal observation | Middle | Close-up observation |
|---|---|---|---|
| Focal length | 0.92 | 1.13 | 1.24 |
| F NUMBER | 8.86 | 8.38 | 8.00 |
| Angle of view (2ω) | 131.22 | 88.88 | 74.24 |
| Image height | 0.80 | 0.80 | 0.80 |
| Total length of lens (in air) | 12.33 | 12.08 | 11.88 |
| BF (in air) | 1.62 | 1.38 | 1.17 |

Surface distance

| Observation state | Normal observation | Middle | Close-up observation |
|---|---|---|---|
| D8 | 0.45 | 1.15 | 1.54 |
| D11 | 1.54 | 0.84 | 0.45 |

Data on lens group

| Group | The first surface of lens group | Focal length |
|---|---|---|
| 1 | 1 | 1.62 |
| 2 | 9 | −3.13 |
| 3 | 12 | 2.55 |

Data on conditions

Condition (1): $1.24 < |F_{1f}/F_n| < 1.8$: $-1.467$
Condition (2): $0.8 < |F_{1f}/F_c| < 1.7$: $-1.092$
Condition (3): $0.7 < |\theta_c/\theta_n| < 1.5$: $0.998$
Condition (4): $\omega_{nP}/\omega_{nMax} < 0.7$: $-0.625$
Condition (5): $-3 < (r_{3lf} + r_{3lb})/(r_{3lf} - r_{3lb}) < 2$: $-1.652$
Condition (6): $|ADT_n| < 8$: $-5.263$
Condition (7): $0.2 < |(1 - \beta_{c2} \cdot \beta_{c2}) \times \beta_{c3} \cdot \beta_{c3}| < 1.2$: $-0.337$
Condition (8): $0.9 < Fno_n/Fno_c$: $1.107$ Besides, lens groups constituting objective lenses according to the present invention are not limited to the shapes of the lenses shown in each of the above-described Embodiments. For example, the lens which is arranged nearest to the object side in the first lens group may be configured to have positive power.

Also, lens groups constituting objective lenses according to the present invention are limited to the shapes of or the number of the lenses shown in each of the above-described Embodiments.

Also, in the objective lens of each of the above-described Embodiments of the present invention, a lens which substantially has no refractive power is arranged in a lens group or out of lens groups (for example, such as: the lens $L_{12}$ which is arranged in the first lens group $G_1$ in the Embodiment 1; and the plano lens PL which is arranged on the image side of the objective lens OL). However, there is no necessity that these lenses should be arranged. Also, alternatively, a lens which substantially has no refractive power but is not shown in the drawings for the respective above-described Embodiments may be arranged in a lens group or out of lens groups. For example, a CCD cover glass or the like may be arranged on the image side of the plano lens that is arranged on the image side of the objective lens.

Figure 27:
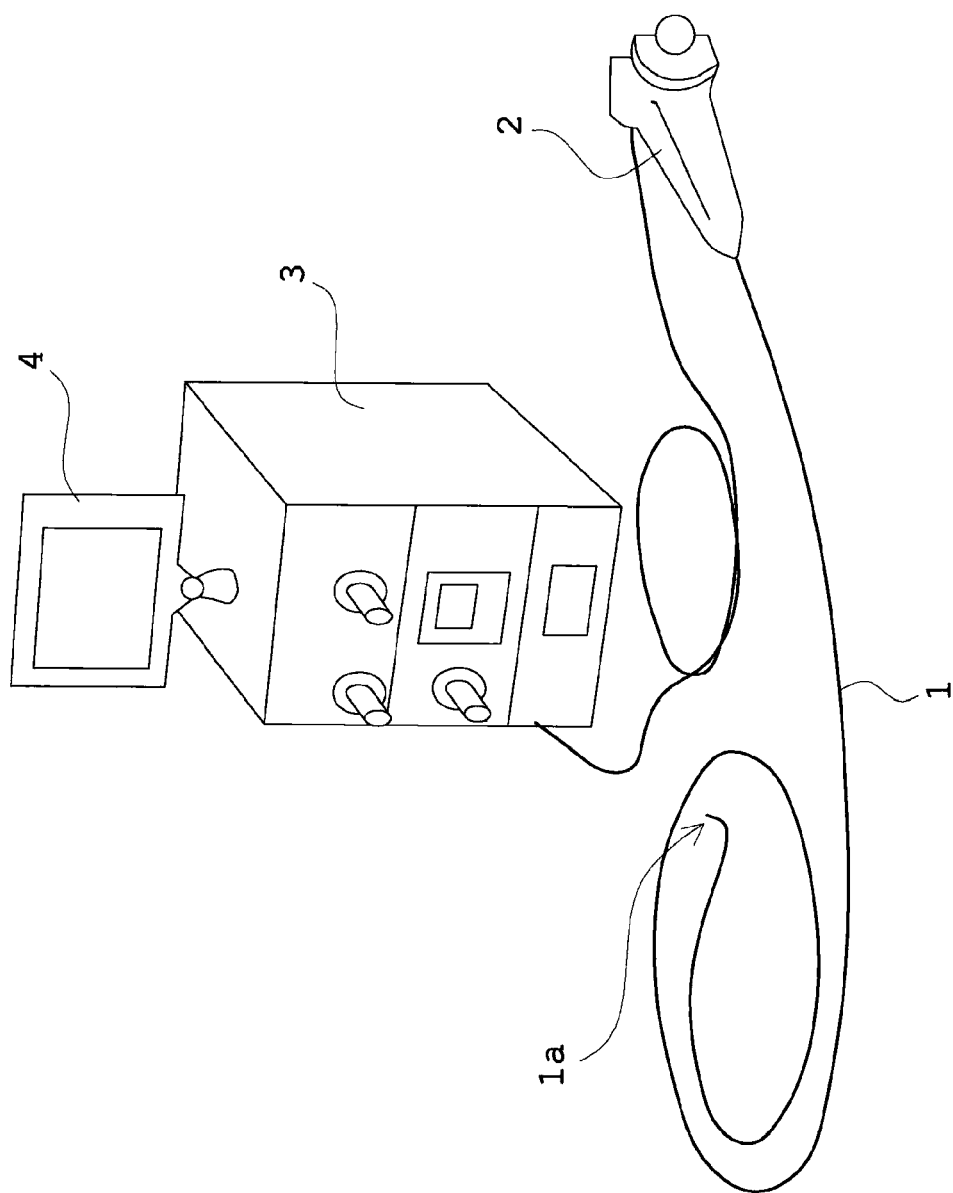
FIG. 27 is a view showing the whole of an endoscope apparatus which is an observation apparatus including an objective lens of an embodiment according to the present invention.

In addition, an objective lens according to the present invention may be used for an endoscope apparatus as shown in FIG. 27. Besides, the endoscope apparatus includes: an insertion unit 1 which is inserted into the body of a subject; an endoscope operating unit 2; a control unit 3 which includes a light source unit and an image processing unit that are placed in the control unit; and a monitor 4 for displaying an image outputted by the control unit 3. And, the top portion 1a of the insertion unit 1 includes an objective lens according to the present invention.

What is claimed is:

1. An objective lens comprising:
    a first lens group in which a lens having negative power is arranged nearest to the object side, the first lens group having negative power and being immovable in changing magnification from a normal observation state to a close-up observation state, where the normal observation state is a state in which magnification of the objective lens has the minimum value and the close-up observation state is a state in which magnification of the objective lens has the maximum value,
    a second lens group which is arranged nearer to the image side than the first lens group is, the second lens group having negative power and moving along the optical axis in the change of magnification from the normal observation state to the close-up observation state,
    a third lens group which is arranged nearer to the image side than the second lens group is, the third lens group having positive power and being immovable in the change of magnification from the normal observation state to the close-up observation state, and
    an aperture stop which is arranged between the second lens group and an image plane, the aperture stop being immovable in the change of magnification from the normal observation state to the close-up observation state,
    the objective lens including no lens group other than the first, second, and third lens groups, and the objective lens satisfying the following condition:

$1.24 < |F1f/Fn| < 1.8$ where F1f denotes a focal length of the lens that is placed nearest to the object side in the first lens group and Fn denotes a focal length of the whole system in the normal observation state.

2. An objective lens comprising
    a first lens group in which a lens having negative power is arranged nearest to the object side, the first lens group having positive power and being immovable in changing magnification from a normal observation state to a close-up observation state, where the normal observation state is a state in which magnification of the objective lens has the minimum value and the close-up observation state is a state in which magnification of the objective lens has the maximum value,
    a second lens group which is arranged nearer to the image side than the first lens group is, the second lens group having negative power and moving along the optical axis in the change of magnification from the normal observation state to the close-up observation state,
    a third lens group which is arranged nearer to the image side than the second lens group is, the third lens group having positive power and being immovable in the change of magnification from the normal observation state to the close-up observation state, and
    an aperture stop which is arranged between the second lens group and an image plane, the aperture stop being immovable in the change of magnification from the normal observation state to the close-up observation state,
    the objective lens including no lens group other than the first, second, and third lens groups, and the objective lens satisfying the following condition:

$1.24 < |F1f/Fn| < 1.8$ where F1f denotes a focal length of the lens that is placed nearest to the object side in the first lens group and Fn denotes a focal length of the whole system in the normal observation state.

3. The objective lens according to claim 1, wherein the objective lens satisfies the following condition:

$0.8 < |F1f/Fc| < 1.7$ where F1f denotes focal length of the lens that is arranged nearest to the object side in the first lens group and Fc denotes focal length of the whole system in the close-up observation state.

4. The objective lens according to claim 1, wherein the objective lens satisfies the following condition:

$0.7 < |\theta c/\theta n| < 1.5$ where $\theta c$ denotes an angle of incidence at which a principal ray enters the image plane in the close-up observation state, and $\theta n$ denotes an angle of incidence at which the principal ray enters the image plane in the normal observation state.

5. The objective lens according to claim 1, wherein the objective lens satisfies the following condition:

$\omega nP/\omega n\text{Max} < 0.8$ where $\omega nP$ denotes a paraxial angle of view in the normal observation state, and $\omega n\text{Max}$ denotes the largest angle of view in the normal observation state and paraxial angle of view in the normal observation state is a value determined by the following formula:

$In = Fn \times \tan|(\omega nP)|$ where In denotes the height of the maximum image plane in the normal observation state, and Fn denotes the focal length in the normal observation state.

6. The objective lens according to claim 1, wherein the objective lens satisfies the following condition:

$-4 < (r31f + r31b)/(r31f - r31b) < 2$ where r31f denotes a radius of curvature of the object-side surface of a lens that is arranged nearest to the image side in the third lens group, and r31b denotes a radius of curvature of the image-side surface of the lens that is arranged nearest to the image side in the third lens group.

7. The objective lens according to claim 1, wherein the objective lens satisfies the following condition:

$|\Delta DTn| < 8$ where $\Delta DTn$ denotes variations in distortion when the second lens group moves minutely in the close-up observation state, and an amount of this minute movement of the second lens group denotes an amount of movement of the second lens group along the optical axis which is necessary for making the image plane move by $\pm(F \text{ number} \times 0.005)$ mm.

8. The objective lens according to claim 1, wherein the objective lens satisfies the following condition:

$0.15 < |(1 - \beta c2 \cdot \beta c2) \times \beta c3 \cdot \beta c3| < 1.5$ where $\beta c2$ denotes transverse magnification of the second lens group in the close-up observation state, and $\beta c3$ denotes transverse magnification of the third lens group in the close-up observation state.

9. The objective lens according to claim 1, wherein the second lens group consists of a single lens component.

10. An objective lens comprising
a first lens group in which a lens having negative power is arranged nearest to the object side, the first lens group being immovable in changing magnification from a normal observation state to a close-up observation state, where the normal observation state is a state in which magnification of the objective lens has the minimum value and the close-up observation state is a state in which magnification of the objective lens has the maximum value,
a second lens group which is arranged nearer to the image side than the first lens group is, the second lens group moving along the optical axis in the change of magnification from the normal observation state to the close-up observation state,
a third lens group which is arranged nearer to the image side than the second lens group is, the third lens group being immovable in the change of magnification from the normal observation state to the close-up observation state and the third lens group including a negative lens which is placed nearest to the image side in the third lens group and which is joined to a lens adjacent to the negative lens on the object side of the negative lens, and
an aperture stop which is arranged between the second lens group and an image plane, the aperture stop being immovable in the change of magnification from the normal observation state to the close-up observation state,
the objective lens including no lens group other than the first, second, and third lens groups, and the objective lens satisfying the following condition:

$$1.24 < |F1f/Fn1| < 1.8$$

where F1f denotes a focal length of the lens that is placed nearest to the object side in the first lens group and Fn denotes a focal length of the whole system in the normal observation state.

11. An objective lens comprising
a first lens group in which a lens having negative power is arranged nearest to the object side, the first lens group being immovable in changing magnification from a normal observation state to a close-up observation state, where the normal observation state is a state in which magnification of the objective lens has the minimum value and the close-up observation state is a state in which magnification of the objective lens has the maximum value,
a second lens group which is arranged nearer to the image side than the first lens group is, the second lens group having negative refractive power and moving to the image side along the optical axis in the change of magnification from the normal observation state to the close-up observation state,
a third lens group which is arranged nearer to the image side than the second lens group is, the third lens group being immovable in the change of magnification from the normal observation state to the close-up observation state, and
an aperture stop which is arranged between the second lens group and an image plane, the aperture stop being immovable in the change of magnification from the normal observation state to the close-up observation state,
the objective lens including no lens group other than the first, second, and third lens groups, and the objective lens satisfying the following condition:

$$1.24 < |F1f/Fn| < 1.8$$

where F1f denotes a focal length of the lens that is placed nearest to the object side in the first lens group and Fn denotes a focal length of the whole system in the normal observation state.

12. The objective lens according to claim 2, wherein the objective lens satisfies the following condition:

$$0.8 < |F1f/Fc| < 1.7$$

where F1f denotes focal length of the lens that is arranged nearest to the object side in the first lens group and Fc denotes focal length of the whole system in the close-up observation state.

13. The objective lens according to claim 2, wherein the objective lens satisfies the following condition:

$$0.7 < |\theta c/\theta n| < 1.5$$

where $\delta c$ denotes an angle of incidence at which a principal ray enters the image plane in the close-up observation state, and $\theta n$ denotes an angle of incidence at which the principal ray enters the image plane in the normal observation state.

14. The objective lens according to claim 2, wherein the objective lens satisfies the following condition:

$$\omega nP/\omega n\mathrm{Max} < 0.8$$

where $\omega nP$ denotes a paraxial angle of view in the normal observation state, and $\omega_{nMax}$ denotes the largest angle of view in the normal observation state and the paraxial angle of view in the normal observation state is a value determined by the following formula:

$$In = Fn \times |\tan(\omega nP)|$$

where In denotes the height of the maximum image plane in the normal observation state, and Fn denotes the focal length in the normal observation state.

15. The objective lens according to claim 2, wherein the objective lens satisfies the following condition:

$$-4 < (r31f + r31b) < 2$$

where r31f denotes a radius of curvature of the object-side surface of a lens that is arranged nearest to the image side in the third lens group, and r31b denotes a radius of curvature of the image-side surface of the lens that is arranged nearest to the image side in the third lens group.

16. The objective lens according to claim 2, wherein the objective lens satisfies the following condition:

$$|\Delta DTn| < 8$$

where $\Delta DTn$ denotes variations in distortion when the second lens group moves minutely in the close-up observation state, and an amount of this minute movement of the second lens group denotes an amount of movement of the second lens group along the optical axis which is necessary for making the image plane move by $\pm(\text{F number} \times 0.005)$ mm.

17. The objective lens according to claim 2, wherein the objective lens satisfies the following condition:

$$0.15 < |(1 - \beta c2 \cdot \beta c2) \times \beta c3 \cdot \beta c3| < 1.5$$

where βc2 denotes transverse magnification of the second lens group in the close-up observation state, and βc3 denotes transverse magnification of the third lens group in the close-up observation state.

18. The objective lens according to claim 2, wherein the second lens group consists of a single lens component.

* * * * *